United States Patent
Oh et al.

(10) Patent No.: US 12,096,451 B2
(45) Date of Patent: Sep. 17, 2024

(54) METHOD AND APPARATUS FOR RESOURCE ALLOCATION IN TIME DOMAIN IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Jinhyun Park, Suwon-si (KR); Youngrok Jang, Suwon-si (KR); Hyoungju Ji, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 17/450,193

(22) Filed: Oct. 7, 2021

(65) Prior Publication Data

US 2022/0110148 A1    Apr. 7, 2022

(30) Foreign Application Priority Data

Oct. 7, 2020 (KR) ........................ 10-2020-0129613

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC ............ H04W 72/04; H04W 72/0446; H04W 72/20; H04W 72/23; H04W 72/231; H04W 72/232
See application file for complete search history.

(56) References Cited

U.S. PATENT DOCUMENTS

2019/0261337 A1    8/2019 Park et al.
2019/0313433 A1*  10/2019 Abedini ............ H04W 72/0446
(Continued)

FOREIGN PATENT DOCUMENTS

KR    10-2021-0157262 A    12/2021

OTHER PUBLICATIONS

International Search Report and Written Opinion of the International Searching Authority in connection with International Application No. PCT/KR2021/013655 issued Jan. 6, 2022, 7 pages.
(Continued)

*Primary Examiner* — Jeong S Park

(57) ABSTRACT

A method by a UE for time-domain resource allocation in a wireless communication system supporting a 5G or 6G communication system includes: receiving, from a base station, configuration information including first information for configuration of a time domain resource allocation table, which is applicable to a downlink data channel, and second information indicating a minimum scheduling offset related to scheduling of the downlink data channel; receiving, from the base station, downlink control information including time domain resource allocation information about the downlink data channel and information indicating whether to configure the minimum scheduling offset; and in case that the minimum scheduling offset is configured, identifying a first slot offset for scheduling of the downlink data channel, based on the configuration information and the time domain resource allocation information; and receiving data on the downlink data channel scheduled based on the first slot offset.

11 Claims, 15 Drawing Sheets

(56) References Cited

U.S. PATENT DOCUMENTS

| | | | | |
|---|---|---|---|---|
| 2020/0229081 A1* | 7/2020 | Ang | .................. | H04W 72/0453 |
| 2020/0229098 A1* | 7/2020 | Cheng | .................. | H04L 1/1812 |
| 2020/0236692 A1* | 7/2020 | Lin | .................... | H04W 72/535 |
| 2020/0252939 A1 | 8/2020 | Lin et al. | | |
| 2020/0314816 A1* | 10/2020 | Yi | ........................ | H04L 5/0094 |
| 2020/0374918 A1* | 11/2020 | Ang | ..................... | H04W 72/23 |
| 2022/0232611 A1* | 7/2022 | Hakola | ............ | H04W 52/0229 |
| 2022/0312367 A1* | 9/2022 | Xu | ....................... | H04W 68/005 |
| 2022/0312372 A1* | 9/2022 | Xu | ...................... | H04W 68/025 |
| 2023/0171073 A1* | 6/2023 | Gao | ..................... | H04L 5/0055 |
| | | | | 370/329 |

OTHER PUBLICATIONS

Mediatek Inc., "Remaining Issues on Cross-Slot Scheduling Adaptation", R1-2003665, 3GPP TSG RAN WG1 e-Meeting #101, May 25-Jun. 5, 2020, 9 pages.

3GPP TS 38.214 V16.3.0 (Sep. 2020); Technical Specification; 3rd Generation Partnership Project; Technical Specification Group Radio Access Network; NR; Physical layer procedures for data (Release 16), Sep. 2020, 166 pages.

\* cited by examiner

METHOD AND APPARATUS FOR RESOURCE ALLOCATION IN TIME DOMAIN IN WIRELESS COMMUNICATION SYSTEM

CROSS-REFERENCE TO RELATED APPLICATION

This application is based on and claims priority under 35 U.S.C. § 119 to Korean Patent Application No. 10-2020-0129613, filed on Oct. 7, 2020, in the Korean Intellectual Property Office, the disclosure of which is herein incorporated by reference in its entirety.

BACKGROUND

1. Field

The disclosure relates to an apparatus and a method for scheduling in a wireless communication system.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

SUMMARY

The disclosure provides an apparatus and a method for efficiently performing resource allocation in a time domain in a wireless communication system.

According to an embodiment of the disclosure, a method by a UE for time-domain resource allocation in a wireless communication system includes receiving, from a base station, configuration information including first information for configuration of a time domain resource allocation table, which is applicable to a downlink data channel, and second information indicating a minimum scheduling offset related to scheduling of the downlink data channel, receiving, from the base station, downlink control information including time domain resource allocation information about the downlink data channel and information indicating whether to configure the minimum scheduling offset, in case that the minimum scheduling offset is configured, identifying a first slot offset for scheduling of the downlink data channel, based on the configuration information and the time domain resource allocation information, and receiving data on the downlink data channel scheduled based on the first slot offset.

In addition, according to an embodiment of the disclosure, a UE in a wireless communication system includes a transceiver and a processor configured to receive, from a base station through the transceiver, configuration information including first information for configuration of a time domain resource allocation table, which is applicable to a downlink data channel, and second information indicating a minimum scheduling offset related to scheduling of the downlink data channel, receive, from the base station through the transceiver, downlink control information including time domain resource allocation information about the downlink data channel and information indicating whether to configure the minimum scheduling offset, in case that the minimum scheduling offset is configured, identify a first slot offset for scheduling of the downlink data channel, based on the configuration information and the time domain resource allocation information, and receive information on the downlink data channel scheduled based on the first slot offset, through the transceiver.

In addition, according to an embodiment of the disclosure, a method by a base station for time domain resource allocation in a wireless communication system includes transmitting, to a UE, configuration information including first information for configuration of a time domain resource allocation table, which is applicable to a downlink data channel, and second information indicating a minimum scheduling offset related to scheduling of the downlink data channel, transmitting, to the UE, downlink control information including time domain resource allocation information about the downlink data channel and information indicating whether to configure the minimum scheduling offset, in case that the minimum scheduling offset is configured, identifying a first slot offset for scheduling of the downlink data channel, based on the configuration information and the time domain resource allocation information, and transmitting data through on downlink data channel scheduled based on the first slot offset.

In addition, according to an embodiment of the disclosure, a base station in a wireless communication system includes a transceiver and a processor configured to transmit, to a UE through the transceiver, configuration information including first information for configuration of a time domain resource allocation table, which is applicable to a downlink data channel, and second information indicating a minimum scheduling offset related to scheduling of the downlink data channel, transmit, to the UE through the transceiver, downlink control information including time domain resource allocation information about the downlink data channel and information indicating whether to configure the minimum scheduling offset, in case that the minimum scheduling offset is configured, identify a first slot offset for scheduling of the downlink data channel, based on the configuration information and the time domain resource allocation information, and transmit data on the downlink data channel which is scheduled based on the first slot offset.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
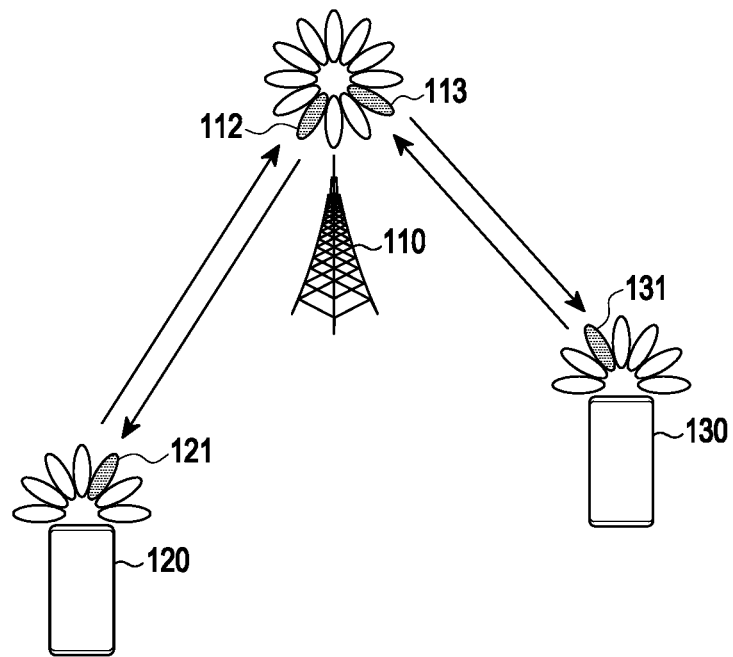
FIG. 1 illustrates a wireless communication system according to various embodiments of the disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and may not be intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems have been developed from wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, and 802.16e of IEEE.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (BS or eNodeB), and the DL refers to a wireless link through which a base station transmits data or a control signal to a terminal. The multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a future communication system after the LTE system, a 5G communication system has to be able to freely reflect various requirements of a user and a service provider, and thus services satisfying various requirements at the same time need to be supported. The services considered for the 5G communication system include enhanced mobile broadband (eMBB), massive machine-type communication (mMTC), ultra-reliability low latency communication (URLLC), and the like.

eMBB aims to provide a higher data transmission rate than a data transmission rate supported by the LTE, LTE-A, or LTE-Pro. For example, in the 5G communication system, eMBB may be able to provide a peak data rate of 20 Gbps in the DL and a peak data rate of 10 Gbps in the UL from the viewpoint of one base station. In addition, the 5G communication system may provide the increased user perceived data rate of the terminal simultaneously with providing the peak data rate. In order to satisfy such requirements, improvement of various transmitting/receiving technologies including a further improved multi input multi output (MIMO) transmission technology is needed. In addition, signals are transmitted using a transmission bandwidth of up to 20 MHz in a 2 GHz band used by the LTE, but the 5G communication system uses a bandwidth wider than 20 MHz in a frequency band of 3 to 6 GHz or more than 6 GHz, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km2) in a cell because it is attached to various sensors and devices to provide communication functions. In addition, because the terminals supporting mMTC are more likely to be positioned in shaded areas not covered by a cell, such as an underground of a building due to the nature of services, the terminals require a wider coverage than other services provided by the 5G communication system. The terminals that support mMTC may be configured as inexpensive terminals and require very long battery lifetime, such as 10 to 15 years, because it is difficult to frequently replace batteries of the terminals.

Finally, URLLC is a cellular-based wireless communication service used for mission-critical purposes. For example, a URLLC may be used in remote control for robots or machinery, industrial automation, unmanned aerial vehicles, remote health care, or emergency alerts. Accordingly, communication provided by URLLC may provide very low latency and very high reliability. For example, URLLC-supportive services need to meet an air interface latency of less than 0.5 milliseconds and simultaneously include requirements of a packet error rate of 75 or less. Accordingly, for URLLC-supportive services, the 5G system may be required to provide a transmit time interval (TTI) shorter than those for other services while securing reliable communication links by allocating a broad resource in a frequency band.

The three services, i.e., eMBB, URLLC, and mMTC, considered in the above 5G communication system may be multiplexed in one system and may be transmitted. Here, the services may use different transmission/reception techniques and transmission/reception parameters in order to satisfy different requirements. However, 5G is not limited to the above three services.

Detailed description of embodiments of the disclosure will be made mainly based on a wireless access network, new RAN (NR), in which 5G network standard is defined by 3GPP, and a packet core (5G system, 5G core network, or next generation core (NG core)), which is a core network. However, the subject matter of the disclosure may also be applicable to 5G or higher systems or other communication systems having a similar technical background after a little modification without departing from the scope of the disclosure, and this may be determined by those skilled in the art.

Hereinafter, terms and names defined by the 3GPP standard (5G, NR, LTE, or standards of systems similar thereto) may be partially used for convenience of description. However, the disclosure may not be limited by the terms and names, and may be equally applied to a system following another standard. Further, the terms for identifying access nodes, the terms that refer to network entities, the terms that refer to messages, the terms that refer to interfaces between the network entities, the terms that refer to various identification information, and the like, which are used in the following description, are exemplified for convenience of description. Accordingly, the terms used in the disclosure are not limited, and other terms that refer to objects having the equivalent technical meaning may be used.

FIG. 1 illustrates a wireless communication system according to various embodiments of the disclosure.

FIG. 1 illustrates a base station 110 and UEs 120 and 130, as a part of nodes using a wireless channel in a wireless communication system. FIG. 1 illustrates only one base station, but may further include another base station that is identical or similar to the base station 110.

The base station 110 may be a network infrastructure that provides the UEs 120 and 130 with wireless access. The base station 110 has a coverage defined by a predetermined geographic area based on the distance over which a signal may be transmitted. The base station 110 may be referred to as an "access point (AP)," an "eNodeB (eNB)," a "5th generation node (5G node)," a "next generation nodeB (gNB)," a "wireless point," a "transmission/reception point (TRP)," or other terms having an equivalent technical meaning.

Each of the UEs 120 and 130 is an apparatus used by a user, and performs communication with the base station 110 through a wireless channel. Each of the UEs 120 and 130 may be referred to as a terminal, a "mobile station," a "subscriber station," a "remote terminal," a "wireless terminal," a "user device," or other terms having an equivalent technical meaning. Further, in some cases, at least one of the UEs 120 and 130 may be operated without user involvement. Here, at least one of the UEs 120 and 130 is an apparatus that performs machine-type communication (MTC), and may not be carried by a user.

Figure 2:
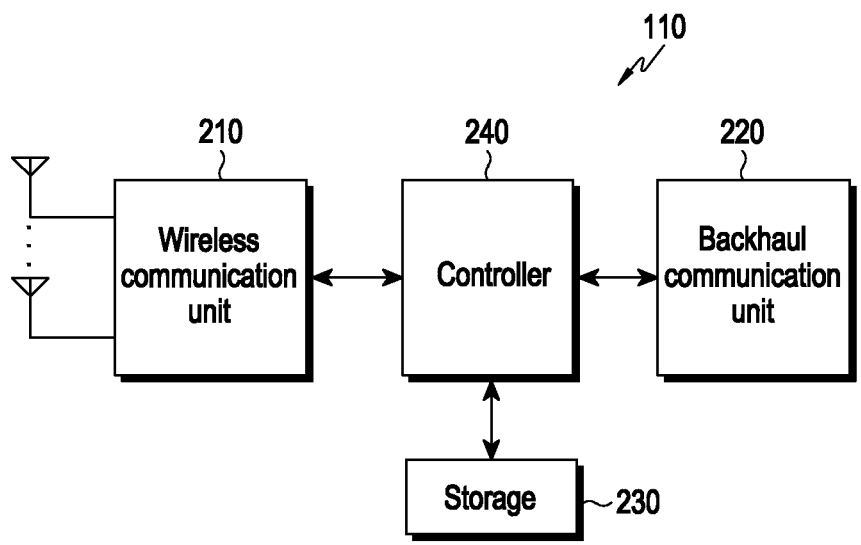
FIG. 2 illustrates a configuration of a base station in a wireless communication system according to various embodiments of the disclosure.

FIG. 2 illustrates a configuration of a base station in a wireless communication system according to various embodiments of the disclosure.

The configuration illustrated in FIG. 2 may be understood as a configuration of the base station 110. The terms "unit," "device," etc. used below refer to a unit for processing at least one function or operation, and may be implemented as hardware, software, or a combination of hardware and software.

Referring to FIG. 2, the base station may include a wireless communication unit 210, a backhaul communication unit 220, a storage 230, and a controller 240.

The wireless communication unit 210 may perform functions for transmitting or receiving a signal through a wireless channel. For example, the wireless communication unit 210 may perform a function of conversion between a baseband signal and a bit string according to the physical layer standard of a system. For example, in case of data transmission, the wireless communication unit 210 may generate complex symbols by encoding and modulating a transmission bit string. Further, in case of data reception, the wireless communication unit 210 may restore a reception bit string by demodulating and decoding a baseband signal.

In addition, the wireless communication unit 210 may up-convert a baseband signal to a radio frequency (RF) band signal, transmit the up-converted signal through an antenna, and down-convert an RF band signal received through the antenna to a baseband signal. To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include multiple transmission/reception paths. Further, the wireless communication unit 210 may include at least one antenna array including multiple antenna elements.

In terms of hardware, the wireless communication unit 210 may include a digital unit and an analog unit, and the analog unit may include multiple sub-units according to an operation power, an operation frequency, and the like. The digital unit may be implemented by at least one processor (e.g., a digital signal processor (DSP)).

The wireless communication unit 210 may transmit or receive a signal as described in the above. Accordingly, all or a part of the wireless communication unit 210 may be referred to as a "transmitter," a "receiver," or a "transceiver." In addition, in the following description, the transmission and reception performed through a wireless channel may be understood as the above-described processing being performed by the wireless communication unit 210.

The backhaul communication unit 220 may provide an interface for performing communication with other nodes within a network. In other words, the backhaul communication unit 220 may convert a bit string transmitted from the base station to another node, for example, another access node, another base station, an upper node, a core network, etc., into a physical signal, and may convert a physical signal received from another node into a bit string.

The storage 230 may store data, such as a basic program for operation of the base station, an application program, and configuration information. The storage 230 may include a volatile memory, a nonvolatile memory, or a combination of a volatile memory and a nonvolatile memory. Further, the storage 230 provides stored data in response to a request from the controller 240.

The controller 240 controls the overall operation of the base station according to embodiments of the disclosure which will be described later. For example, the controller 240 transmits or receives a signal through the wireless communication unit 210 or the backhaul communication unit 220. In addition, the controller 240 records data in the storage 230 and reads the data therefrom. Further, the controller 240 may perform functions of a protocol stack required by the communication standard. In an embodiment, the protocol stack may be included in the wireless communication unit 210. To this end, the controller 240 may include at least one processor.

For example, the base station may be implemented by including a transceiver, and a processor configured to: transmit configuration information including information for configuration of a time domain resource allocation table, which will be described later, applicable to a downlink data channel, and second information indicating a minimum scheduling offset, which will be described later, related to scheduling of the downlink data channel to a UE through the transceiver; transmit downlink control information including time domain resource allocation information about the downlink data channel and information indicating whether to configure the minimum scheduling offset to the UE through the transceiver; and in case that the minimum scheduling offset is configured, identify a first slot offset for scheduling of the downlink data channel based on the configuration information and the time domain resource allocation information, and transmit data through the downlink data channel which is scheduled based on the first slot offset.

Here, the time domain resource allocation table includes position information of a start symbol in a slot in which the downlink data channel is scheduled, symbol length information, and a second slot offset which is configured as a default slot offset. The first slot offset may be determined based on at least one of the minimum scheduling offset and the second slot offset according to various embodiments of the disclosure to be described later.

Figure 3:
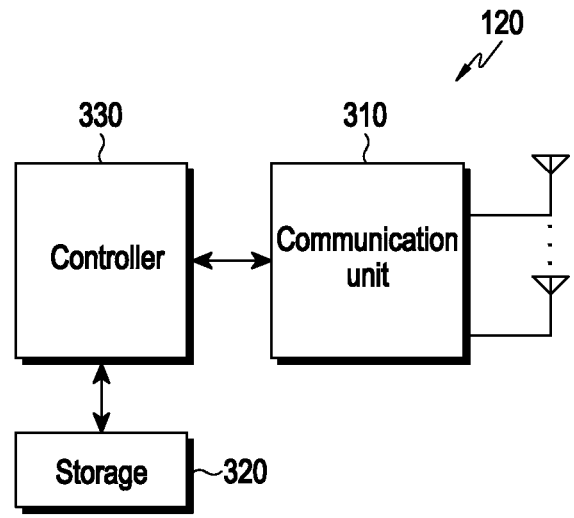
FIG. 3 illustrates a configuration of a UE in a wireless communication system according to various embodiments of the disclosure.

FIG. 3 illustrates a configuration of a UE in a wireless communication system according to various embodiments of the disclosure.

The configuration illustrated in FIG. 3 may be understood as a configuration of the UE 120. The terms "~ unit," "~ device," etc. used below refer to a unit for processing at least one function or operation, and may be implemented as hardware, software, or a combination of hardware and software.

Referring to FIG. 3, the UE includes a communication unit 310, a storage 320, and a controller 330.

The communication unit 310 may perform functions for transmitting or receiving a signal through a wireless channel. For example, the communication unit 310 may perform a function of conversion between a baseband signal and a bit string according to the physical layer standard of a system. For example, in case of data transmission, the communication unit 310 may generate complex symbols by encoding and modulating a transmission bit string. Further, in case of data reception, the communication unit 310 may restore a reception bit string by demodulating and decoding a baseband signal. In addition, the communication unit 310 may up-convert a baseband signal to an RF band signal, transmit the up-converted signal through an antenna, and down-convert an RF band signal received through the antenna to a baseband signal. For example, the communication unit 310 may include a transmission filter, a reception filter, an amplifier, a mixer, an oscillator, a DAC, an ADC, and the like.

In addition, the communication unit 310 may include multiple transmission/reception paths. Further, the communication unit 310 may include at least one antenna array including multiple antenna elements. In terms of hardware, the communication unit 310 may include a digital circuit and an analog circuit (e.g., a radio frequency integrated circuit (RFIC)). Here, the digital circuit and the analog circuit may be implemented as a single package. In addition, the communication unit 310 may perform beamforming.

The communication unit 310 may transmit or receive a signal as described in the above. Accordingly, all or a part of the communication unit 310 may be referred to as a "transmitter," a "receiver," or a "transceiver." In addition, in the following description, the transmission and reception performed through a wireless channel may be understood as the above-described processing being performed by the communication unit 310.

The storage 320 stores data, such as a basic program for operation of the UE, an application program, and configuration information. The storage 320 may include a volatile memory, a nonvolatile memory, or a combination of a volatile memory and a nonvolatile memory. Further, the storage 320 provides stored data in response to a request from the controller 330.

The controller 330 controls the overall operation of a UE according to embodiments of the disclosure to be described later. For example, the controller 330 transmits or receives a signal through the communication unit 310. In addition, the controller 330 records data in the storage 320 and reads data therefrom. Further, the controller 330 may perform functions of a protocol stack required by the communication standard. To this end, the controller 330 may include at least one processor or a microprocessor, or may be part of a processor. To this end, the controller 330 may include at least one processor. Further, the controller 330 and a part of the communication unit 310 may be referred to as a communication processor (CP).

For example, the UE may be implemented by including a transceiver, and a processor configured to: receive configuration information including information for configuration of a time domain resource allocation table, which will be described later, applicable to a downlink data channel, and second information indicating a minimum scheduling offset, which will be described later, related to scheduling of the downlink data channel, from a base station through the transceiver; receive downlink control information including time domain resource allocation information about the downlink data channel and information indicating whether to configure the minimum scheduling offset from the base station through the transceiver; and in case that the minimum scheduling offset is configured, identify a first slot offset for scheduling of the downlink data channel based on the configuration information and the time domain resource allocation information, and receive, through the transceiver, data on the downlink data channel which is scheduled based on the first slot offset.

Here, the time domain resource allocation table includes position information of a start symbol in a slot in which the downlink data channel is scheduled, symbol length information, and a second slot offset which is configured as a default slot offset. The first slot offset may be determined based on at least one of the minimum scheduling offset and the second slot offset according to various embodiments of the disclosure to be described later.

Figure 4:
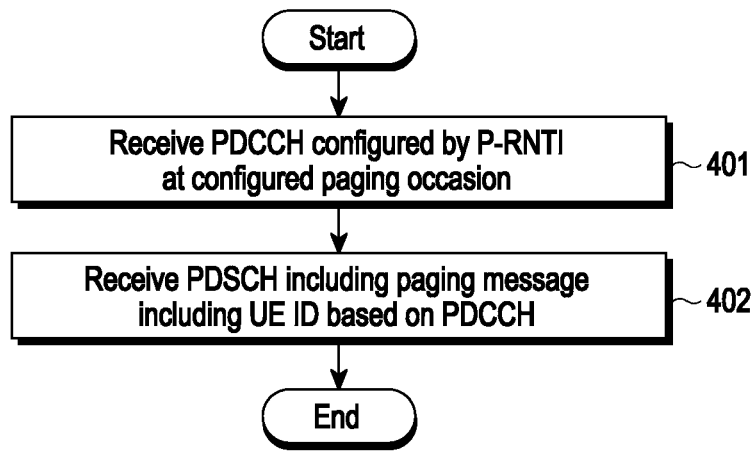
FIG. 4 is a flowchart illustrating an operation of a UE in a wireless communication system according to various embodiments of the disclosure.

FIG. 4 is a flowchart illustrating an operation of a UE in a wireless communication system according to various embodiments of the disclosure. FIG. 4 illustrates an operation method of the UE 120.

Referring to FIG. 4, in operation 401, a UE receives a physical downlink control channel (PDCCH) configured by a paging-radio network temporary identifier (P-RNTI) at a configured paging occasion. A paging procedure may be used to notify of when an incoming call to a UE in the IDLE or INACTIVE state occurs and to initiate network access to the UEs, or to notify the UEs in the CONNECTED state that system information has been changed (the IDLE state or INACTIVE state may denote a state in which the UE is camped on a predetermined cell and has not establish an RRC connection, and the CONNECTED state may denote a state in which the UE is in RRC connected after performing an initial access procedure thereof).

An access and mobility management function (AMF), which is a network entity configured to perform paging control and mobility control for the UE in a core network, initiates paging, and the paging is transmitted to the UE through the base station. More specifically, paging is initiated from the AMF and is transmitted to the base station via S1 application protocol (S1AP) signaling, and then is transmitted to the UE via RRC signaling. Here, the UE may know whether a paging message exists by monitoring a PDCCH configured by P-RNTI on a paging occasion. The paging occasion may be determined based on the DRX cycle configured in the UE by the base station.

In operation 402, the UE receives a physical downlink shared channel (PDSCH) including a paging message including the UE identifier based on the PDCCH. Upon receiving the PDCCH configured by the P-RNTI, the UE may receive a paging message through the PDSCH. The paging message may include UE identifier (UE ID) information of a UE to be awakened by the base station.

Hereinafter, the frame structure of the 5G system will be described in more detail with reference to the drawings.

Figure 5:
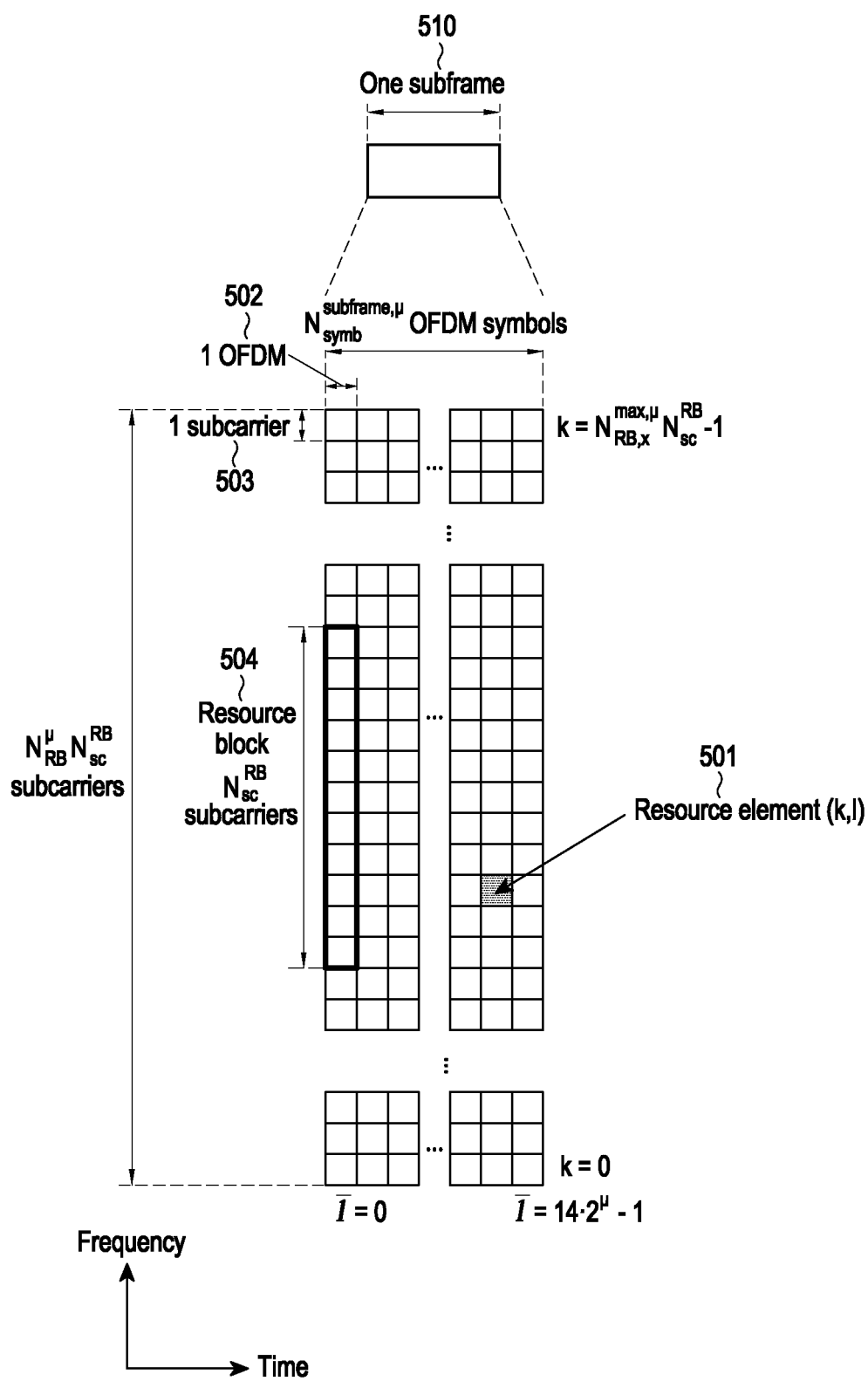
FIG. 5 illustrates a resource structure of a wireless communication system according to various embodiments of the disclosure.

FIG. 5 illustrates a resource structure of a wireless communication system according to various embodiments of the disclosure. Specifically, FIG. 5 illustrates the basic structure of a time-frequency domain, which is a radio resource domain in which data or a control channel is transmitted in a 5G system.

Referring to FIG. 5, the horizontal axis represents a time domain, and the vertical axis represents a frequency domain. A basic unit of resources in the time-frequency domain may be a resource element (RE) 501. The resource element 501 may be defined by 1 orthogonal frequency division multiplexing (OFDM) symbol 502 in a time domain and 1 subcarrier 503 in a frequency domain. In the frequency domain, $N_{sc}^{RB}$ (for example, 12) consecutive REs may configure one resource block (RB) 504. In FIG. 5, $N_{symb}^{subframe,\mu}$ is the number of OFDM symbols for each subframe 510 for subcarrier spacing configuration $\mu$, and in relation to a more detailed description of the resource structure in the 5G system, refer to TS 38.211 section 4 standard.

Figure 6:
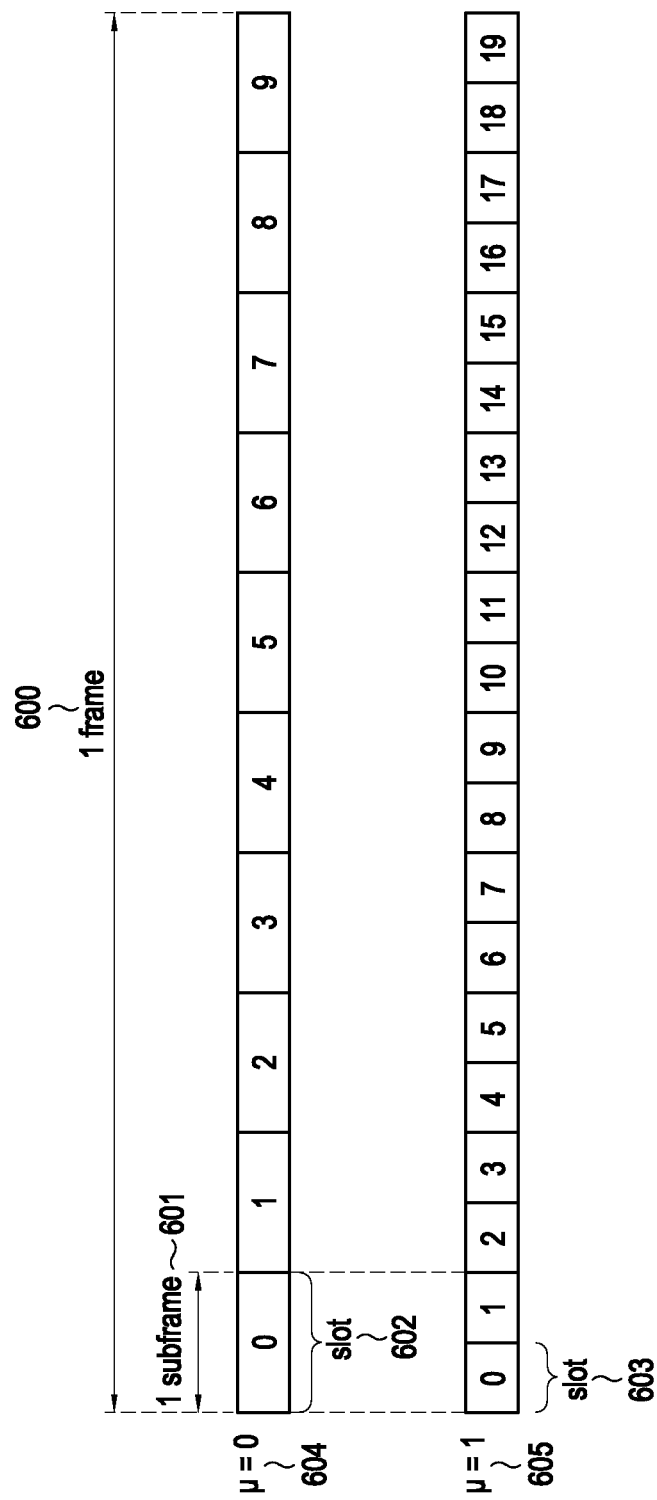
FIG. 6 illustrates a resource structure of a wireless communication system according to various embodiments of the disclosure.

FIG. 6 illustrates a resource structure of a wireless communication system according to various embodiments of the disclosure. Specifically, FIG. 6 illustrates a slot structure considered in a 5G system.

Referring to FIG. 6, an example of a structure of a frame 600, a subframe 601, and a slot 602 is illustrated. One frame 600 may be defined as 10 ms. One subframe 601 may be defined as 1 ms, and thus one frame 600 may be configured by a total of 10 subframes 601. One slot 602 or 603 may be defined as 14 OFDM symbols (i.e., the number of symbols per slot ($N_{symb}^{slot}$)=14). One subframe 601 may include one or multiple slots 602 and 603, and the number of slots 602 and 603 per one subframe 601 may differ according to configuration values ($\mu$) 604 and 605 for a subcarrier spacing.

In the example of FIG. 6, a case in which the subcarrier spacing configuration value is $\mu$=0 (indicated by reference numeral 604) and $\mu$=1 (indicated by reference numeral 605) is illustrated. If $\mu$=0 (indicated by reference numeral 604), one subframe 601 may include one slot 602, and if $\mu$=1 (indicated by reference numeral 605), one subframe 601 may include two slots 603. That is, the number of slots per one subframe ($N_{slot}^{subframe,\mu}$) may differ according to a subcarrier spacing configuration value $\mu$, and accordingly, the number of slots per one frame ($N_{slot}^{frame,\mu}$) may differ. According to each subcarrier spacing configuration $\mu$, $N_{slot}^{subframe,\mu}$ and $N_{slot}^{frame,\mu}$ may be defined in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, the BWP configuration in the 5G communication system will be described in detail with reference to the drawings.

Figure 7:
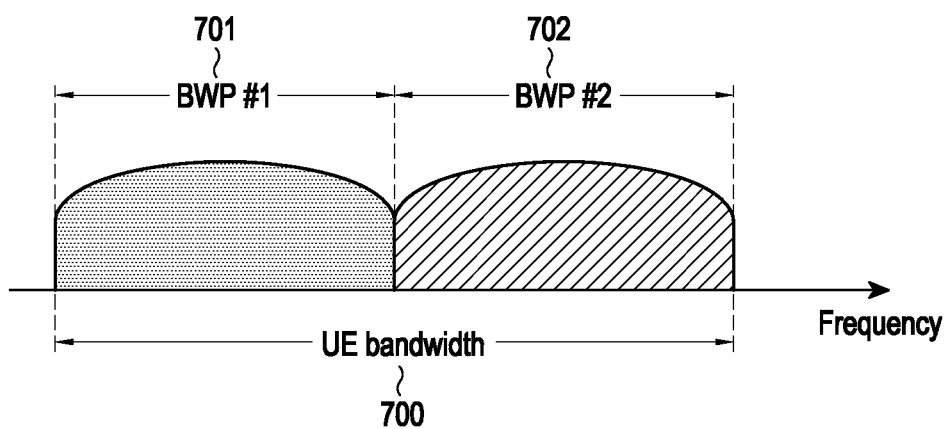
FIG. 7 illustrates a structure of a bandwidth part in a wireless communication system according to various embodiments of the disclosure.

FIG. 7 illustrates a structure of a BWP in a wireless communication system according to various embodiments of the disclosure. Specifically, FIG. 7 illustrates an example of configuration about a BWP in a 5G communication system.

Referring to FIG. 7, an example, in which a UE bandwidth 700 is configured by two BWPs, that is, BWP #1 701 and BWP #2 702, is shown. The base station may configure one or multiple BWPs for the UE, and may configure pieces of information as shown in Table 2 below for each bandwidth part.

TABLE 2

```
BWP ::=                         SEQUENCE {
      bwp-Id                          BWP-Id,
    (Bandwidth part identifier)
      locationAndBandwidth            INTEGER (1..65536),
    (Bandwidth part location)
      subcarrierSpacing               ENUMERATED {n0, n1, n2, n3, n4,
n5},
    (Subcarrier spacing)
      cyclicPrefix                    ENUMERATED { extended }
    (Cyclic prefix)
}
```

In Table 2, "locationAndBandwidth" indicates the location and bandwidth in the frequency domain of the bandwidth part, "cyclicPrefix" indicates whether an extended cyclic prefix (CP) is used for the bandwidth part, and "subcarrierSpacing" indicates a subcarrier spacing to be used in the bandwidth part.

Various embodiments of the disclosure are not limited to the above example, and in addition to the configuration information, various parameters related to a BWP may be configured in the UE. The pieces of information may be transmitted by the base station to the UE via higher layer signaling, for example, radio resource control (RRC) signaling. At least one BWP among the configured one or multiple BWPs may be activated. Whether to activate the configured BWP may be semi-statically transmitted from the base station to the UE via RRC signaling or may be dynamically transmitted through downlink control information (DCI).

According to an embodiment, a UE before radio resource control (RRC) connection may be configured with an initial bandwidth part (BWP) for initial access from a base station through a master information block (MIB). More specifically, the UE may receive configuration information about a search apace and a control resource set (CORESET) through which the PDCCH for reception of system information required for initial access (which may correspond to remaining system information (RMSI) or system information block 1 (SIB 1)) may be transmitted through the MIB in an initial access operation. The control resource set (CORESET) and search space, which are configured through the MIB, may be regarded as identity (ID) 0, respectively. The control resource set and search space configured through the MIB may be a common control resource set and a common search space, respectively. The base station may notify the UE of configuration information, such as frequency allocation information, time allocation information, and numerology for the control resource set #0 through the MIB. In addition, the base station may notify the UE of configuration information regarding the monitoring periodicity and paging occasion for the control resource set #0, that is, configuration information regarding the search space #0, through the MIB. The UE may regard the frequency domain configured as the control resource set #0, obtained from the MIB, as an initial BWP for initial access. Here, the ID of the initial BWP may be regarded as zero.

The configuration of the BWP supported by 5G may be used for various purposes.

According to an embodiment, a case, in which a bandwidth supported by the UE is less than a system bandwidth, may be supported through the BWP configuration. For example, the base station configures, in the UE, a frequency location of the BWP to enable the UE to transmit or receive data at a specific frequency location within the system bandwidth.

According to an embodiment, the base station may configure a plurality of BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed, and when attempting to transmit or receive data at a specific subcarrier spacing, the BWP configured with the corresponding subcarrier spacing may be activated.

According to an embodiment, the base station may configure, in the UE, the BWPs having bandwidths of different sizes for the purpose of reducing power consumption of the UE. For example, when the UE supports a very large bandwidth, for example, a bandwidth of 100 MHz, and always transmits or receives data at the corresponding bandwidth, the transmission or reception may cause very high power consumption in the UE. In particular, when the UE performs monitoring on an unnecessary downlink control channels of a large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 MHz. In a situation without traffic, the UE may perform a monitoring operation on a BWP of 20 MHz. When data to be transmitted or received has occurred, the UE may transmit or receive data in a BWP of 100 MHz according to an indication of the base station.

In a method of configuring the BWP, the UEs before the RRC connection may receive configuration information about the initial BWP through the master information block (MIB) in the initial connection operation. More specifically, the UE may be configured with a control resource set (CORESET) for a downlink control channel through which downlink control information (DCI) for scheduling a system information block (SIB) may be transmitted from a MIB of a physical broadcast channel (PBCH). The bandwidth of the control resource set configured through the MIB may be regarded as the initial BWP. The UE may receive, through the configured initial BWP, the SIB on a physical downlink shared channel (PDSCH). The initial BWP may be used for other system information (OSI), paging, and random access as well as the reception of the SIB.

When one or more BWPs have been configured in the UE, the base station may indicate the UE to switch the BWP by using a BWP indicator field in DCI. For example, in FIG. 7, when the currently active BWP of the UE is BWP #1 701, the base station may indicate BWP #2 302 to the UE by using the BWP indicator in DCI, and the UE may perform a BWP switch to the BWP #2 702 indicated through the BWP indicator in the received DCI.

As described above, the DCI-based BWP switch may be indicated by the DCI scheduling the PDSCH or physical uplink shared channel (PUSCH). Therefore, when the UE receives a request to switch the BWP, it is needed to receive or transmit the PDSCH or the PUSCH scheduled by the corresponding DCI without difficulty in the switched BWP. To this end, the standard stipulates requirements for a delay time (TBWP) required when switching the BWP and may be defined as shown in Table 3 below.

TABLE 3

| | NR Slot | BWP switch delay $T_{BWP}$ (slots) | |
|---|---|---|---|
| μ | length (ms) | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1
Depends on UE capability.

Note 2:
If the BWP switch involves changing of SCS, the BWP switch delay is determined by the larger one between the SCS before BWP switch and the SCS after BWP switch.

The requirements for the BWP switch delay time support type 1 or type 2 depending on UE capability. The UE may report a BWP delay time type that is supportable to the base station.

When the UE receives the DCI including the BWP switch indicator in slot n according to the requirements for the BWP switch delay time described above, the UE may complete a switch to a new BWP indicated by the BWP switch indicator at a time point not later than slot n+TBWP, and may perform transmission or reception for a data channel scheduled by the corresponding DCI in the switched new BWP. When the base station intends to schedule the data channel to the new BWP, the base station may determine a time domain resource allocation (TDRA) for a data channel by considering the BWP switch delay time (TBWP) of the UE. That is, when the base station schedules the data channel to the new BWP, in relation to a method of determining the time domain resource allocation for the data channel, the base station may schedule the corresponding data channel after the BWP switch delay time. Accordingly, the UE may not expect the DCI indicating the BWP switch to indicate a slot offset (K0 or K2) value less than the BWP switch delay time (TBWP).

If the UE receives the DCI (for example, DCI format 1_1 or 0_1) indicating the BWP switch, the UE may not perform transmission or reception during a time interval from a third symbol of the slot where the PDCCH including the DCI is received to a start point of the slot indicated by the slot offset (K0 or K2) value indicated by the time domain resource allocation indicator field in the DCI. For example, when the UE has received the DCI indicating the BWP switch in slot n and the slot offset value indicated by the DCI is K, the UE may not perform transmission or reception from the third symbol of the slot n to the symbol prior to slot n+K (i.e., the last symbol of slot n+K−1).

Next, a synchronization signal (SS)/PBCH block (referred to as a synchronization signal block (SSB)) in 5G will be described.

The SS/PBCH block may refer to a physical layer channel block including a primary SS (PSS), a secondary SS (SSS), and a physical broadcast channel (PBCH). Specifically, the configuration of SS/PBCH block is as follows:

PSS: A signal that serves as a reference for downlink time/frequency synchronization and provides some information of a cell ID;

SSS: A signal that serves as a reference for downlink time/frequency synchronization, and provides the remaining cell ID information that is not provided by the PSS. In addition, the SSS may serve as a reference signal for demodulation of the PBCH; and PBCH: A channel that provides essential system information required for transmission or reception of a data channel and a control channel of a UE. The essential system information may include search space related control information indicating radio resource mapping information of a control channel, scheduling control information for a separate data channel for transmission of system information, and the like.

The SS/PBCH block includes a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may obtain the MIB from the PBCH, and may be configured with the control resource set (CORESET) #0 (which may correspond to the control resource set having the CORESET index or identify (ID) of 0) and search space #0 (which may correspond to the search space having the search space index or ID of 0) therefrom. The UE may monitor the control resource set #0 under the assumption that a demodulation reference signal (DMRS) transmitted in the selected SS/PBCH block and the control resource set #0 is quasi-co-located (QCLed). The UE may receive system information based on downlink control information transmitted from the control resource set #0. The UE may obtain, from the received system information, configuration information related to a random access channel (RACH) required for initial access. The UE may transmit a physical RACH (PRACH) to the base station by considering the selected SS/PBCH index, and the base station having received the PRACH may obtain information about an SS/PBCH block index selected by the UE. The base station may know which block is selected among the SS/PBCH blocks by the UE, and may know that the control resource set #0 associated therewith is monitored.

Next, downlink control information (DCI) in a 5G system will be described in detail.

In the 5G system, scheduling information about uplink data (or physical uplink shared channel (PUSCH) or downlink data (or physical downlink shared channel (PDSCH)) is transmitted from the base station to the UE through the DCI. The UE may monitor a fallback DCI format and a non-fallback DCI format with regard to the PUSCH or the PDSCH. The fallback DCI format may include a fixed field predefined between the base station and the UE, and the non-fallback DCI format may include a configurable field.

The DCI may be transmitted through a physical downlink control channel (PDCCH) after channel coding and modulation is performed thereon. A cyclic redundancy check (CRC) may be attached to a DCI message payload. The CRC may be scrambled by a radio network temporary identifier (RNTI) corresponding to the identification information of the UE. Different RNTIs may be used according to the purpose of the DCI message, for example, a UE-specific data transmission, a power control command, or a random access response. That is, the RNTI is not explicitly transmitted, but is included in a CRC calculation process and then transmitted. When receiving a DCI transmitted through the PDCCH, the UE may check a CRC by using an assigned RNTI. When a CRC check result is correct, the UE may know that the corresponding DCI has been transmitted to the UE.

For example, a DCI that schedules a PDSCH for system information (SI) may be scrambled by an SI-RNTI. A DCI that schedules a PDSCH for a random access response (RAR) message may be scrambled by an RA-RNTI. A DCI that schedules a PDSCH for a paging message may be scrambled by a P-RNTI. A DCI that notifies a slot format indicator (SFI) may be scrambled by an SFI-RNTI. A DCI that notifies transmit power control (TPC) may be scrambled by a TPC-RNTI. A DCI that schedules UE-specific PDSCH or PUSCH may be scrambled by a cell RNTI (C-RNTI), a modulation coding scheme C-RNTI (MCS-C-RNTI), or a configured scheduling RNTI (CS-RNTI).

DCI format 0_0 may be used as a fallback DCI that schedules a PUSCH. Here, a CRC may be scrambled by a C-RNTI. The DCI format 0_0 in which the CRC is scrambled by the C-RNTI may include, for example, pieces of information of Table 4 below.

TABLE 4

Identifier for DCI formats - 1 bit
The value of this bit field is always set to 0, indicating an UL DCI format
Frequency domain resource assignment -
$\lceil\log_2(N_{RB}^{UL, BWP}(N_{RB}^{UL, BWP} + 1)/2)\rceil$ bits where $N_{RB}^{UL, BWP}$ is defined in subclause 7.3.1.0
For PUSCH hopping with resource allocation type 1:
$N_{UL\_hop}$ MSB bits are used to indicate the frequency offset according to Subclause 6.3 of [6, TS 38.214], where
$N_{UL\_hop}$ = 1 if the higher layer parameter
frequencyHoppingOffsetLists contains two offset values and
$N_{UL\_hop}$ = 2 if the higher layer parameter
frequencyHoppingOffsetLists contains four offset values
$\lceil\log_2(N_{RB}^{UL, BWP}(N_{RB}^{UL, BWP} + 1)/2)\rceil - N_{UL\_hop}$ bits provides the frequency domain resource allocation according to Subclause 6.1.2.2.2 of [6, TS 38.214]
For non-PUSCH hopping with resource allocation type 1:
$\lceil\log_2(N_{RB}^{UL, BWP}(N_{RB}^{UL, BWP} + 1)/2)\rceil$ bits provides the frequency domain resource allocation according to Subclause 6.1.2.2.2 of [6, TS 38.214]
Time domain resource assignment - 4 bits as defined in Subclause 6.1.2.1 of [6, TS 38.214]
Frequency hopping flag - 1 bit according to Table 7.3.1.1.1-3, as defined in Subclause 6.3 of [6, TS 38.214]
Modulation and coding scheme - 5 bits as defined in Subclause 6.1.4.1 of [6, TS 38.214]
New data indicator - 1 bit
Redundancy version - 2 bits as defined in Table 7.3.1.1.1-2
HARQ process number - 4 bits
TPC command for scheduled PUSCH - 2 bits as defined in Subclause 7.1.1 of [5, TS 38.213]
Padding bits, if required
UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s). If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
If the UL/SUL indicator is not present in DCI format 0_0 and pucch-Config is configured, the corresponding PUSCH scheduled by the DCI format 0_0 is for the UL or SUL for which high layer parameter pucch-Config is configured.
If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as a non-fallback DCI that schedules a PUSCH. Here, a CRC may be scrambled by a C-RNTI. The DCI format 0_1 in which the CRC is scrambled by the C-RNTI may include, for example, pieces of information of Table 5a to Table 5b below. Table 5a to Table 5d show a series of fields (pieces of information) included in DCI format 0_1 in a separate manner for convenience.

TABLE 5a

Identifier for DCI formats - 1 bit
The value of this bit field is always set to 0, indicating an UL DCI format
Carrier indicator - 0 or 3 bits, as defined in Subclause 10.1 of [5, TS38.213].
UL/SUL indicator - 0 bit for UEs not configured with supplementaryUplink in ServingCellConfig in the cell or UEs configured with supplementaryUplink in ServingCellConfig in the cell but only one carrier in the cell is configured for PUSCH transmission; otherwise, 1 bit as defined in Table 7.3.1.1.1-1.
Bandwidth part indicator - 0, 1 or 2 bits as determined by the number of UL BWPs $n_{BWP, RRC}$ configured by higher layers, excluding the initial UL bandwidth part. The bitwidth for this field is determined as $\lceil\log_2(n_{BWP})\rceil$ bits, where
$n_{BWP} = n_{BWP, RRC} + 1$ $n_{BWP, RRC} \leq 3$, in which case the bandwidth part indicator is equivalent to the ascending order of the higher layer parameter BWP-Id;
otherwise $n_{BWP} = n_{BWP, RRC}$, in which case the bandwidth part indicator is defined in Table 7.3.1.1.2-1;
If a UE does not support active BWP change via DCI, the UE ignores this bit field.
Frequency domain resource assignment - number of bits determined by the following, where $N_{RB}^{UL, BWP}$ is the size of the active UL bandwidth part:
$N_{RBG}$ bits if only resource allocation type 0 is configured, where $N_{RBG}$ is defined in Subclause 6.1.2.2.1 of [6, TS 38.214],
$\lceil\log_2(N_{RB}^{UL, BWP}(N_{RB}^{UL, BWP} + 1)/2)\rceil$ bits if only resource allocation type 1 is configured, or
$\max(\lceil\log_2(N_{RB}^{UL, BWP}(N_{RB}^{UL, BWP} + 1)/2)\rceil, N_{RBG}) + 1$ bits if both resource allocation type 0 and 1 are configured.
If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as defined in Subclause 6.1.2.2.1 of [6, TS 38.214].
For resource allocation type 1, the
$\lceil\log_2(N_{RB}^{UL, BWP}(N_{RB}^{UL, BWP} + 1)/2)\rceil$ LSBs provide the resource allocation as follows:
For PUSCH hopping with resource allocation type 1:
$N_{UL\_hop}$ MSB bits are used to indicate the frequency offset according to Subclause 6.3 of [6, TS 38.214J, where
$N_{UL\_hop}$ = 1 if the higher layer parameter
frequencyHoppingOffsetLists contains two offset values and $N_{UL\_hop}$ = 2 if the higher layer parameter
frequencyHoppingOffsetLists contains four offset values
$\lceil\log_2(N_{RB}^{UL, BWP}(N_{RB}^{UL, BWP} + 1)/2)\rceil - N_{UL\_hop}$ bits provides the frequency domain resource allocation according to Subclause 6.1.2.2.2 of [6, TS 38.214]
For non-PUSCH hopping with resource allocation type 1:
$\lceil\log_2(N_{RB}^{UL, BWP}(N_{RB}^{UL, BWP} + 1)/2)\rceil$ bits provides the frequency domain resource allocation according to Subclause 6.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

TABLE 5b

Time domain resource assignment-0, 1, 2, 3, or 4 bits as defined in Subclause 6.1.2.1 of [6, TS38.214]. The bidwidth for this field is determined as $\lceil \log_2 (I) \rceil$ bits, where I is the number of entries in the higher layer parameter pusch-TimeDomainAllocationList if the higher layer parameter is configured; otherwise I is the number of entries in the default table.
Frequency hopping flag-0 or 1 bit:
  0 bit if only resource allocation type 0 is configured or if the higher layer parameter frequencyHopping is not configured;
  1 bit according to Table 7.3.1.1.1-3 otherwise, only applicable to resource allocation type 1, as defined in Subclause 6.3 of [6, TS 38.214].
Modulation and coding scheme-5 bits as defined in Subclause 6.1.4.1 of [6, TS 38.214]
New data indicator-1 bit
Redundancy version-2 bits as defined in Table 7.3.1.1.1-2
HARQ process number-4 bits
$1^{st}$ downlink assignment index-1 or 2 bits:
  1 bit for semi-static HARQ-ACK codebook;
  2 bits for dynamic HARQ-ACK codebook.
$2^{nd}$ downlink assignment index-0 or 2 bits:
  2 bits for dynamic HARQ-ACK codebook with two HARQ-ACK sub-codebooks;
  0 bit otherwise.
TPC command for scheduled PUSCH-2 bits as defined in Subclause 7.1.1 of [5, TS38.213]

$$SRS \text{ resource indicator-} \left\lceil \log_2 \left( \sum_{k=1}^{\min\{L_{max}, N_{SRS}\}} \binom{N_{SRS}}{k} \right) \right\rceil \text{ or }$$

$\lceil \log_2 (N_{SRS}) \rceil$ bits, where $N_{SRS}$ is the number of configured SRS resources in the SRS resource set associated with the higher layer parameter usage of value 'codeBook' or 'nonCodeBook', $$\left\lceil \log_2 \left( \sum_{k=1}^{\min\{L_{max}, N_{SRS}\}} \binom{N_{SRS}}{k} \right) \right\rceil \text{ bits according to Tables 7.3.1.1.2-}$$

28/29/30/31 if the higher layer parameter txConfig = nonCodebook, where $N_{SRS}$ is the number of configured SRS resources in the SRS resource set associated with the higher layer parameter usage of value 'nonCodeBook' and if UE supports operation with maxMIMO-Layers and the higher layer parameter maxMIMO-Layers of PUSCH-ServingCellConfig of the serving cell is configured, $L_{max}$ is given by that parameter
  otherwise, $L_{max}$ is given by the maximum number of layers for PUSCH supported by the UE for the serving cell for non-codebook based operation.

$\lceil \log_2 (N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.
Precoding information and number of layers-number of bits determined by the following:
  0 bits if the higher layer parameter txConfig = nonCodeBook;
  0 bits for 1 antenna port and if the higher layer parameter txConfig = codebook;

TABLE 5c 4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;
2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset;
2 or 4 bits according to Table 7.3.1.1.2-4 for 2 antenna ports, if txConfig = codebook, and according to whether transform

TABLE 5c-continued precoder is enabled or disabled, and the values of higher layer parameters maxRank and codebookSubset;
1 or 3 bits according to Table 7.3.1.1.2-5 for 2 antenna ports, if txConfig = codebook, and according to whether transform precoder is enabled or disabled, and the values of higher layer parameters maxRank and codebookSubset.
Antenna ports - number of bits determined by the following
2 bits as defined by Tables 7.3.1.1.2-6, if transform precoder is enabled, dmrs-Type = 1, and maxLength = 1;
4 bits as defined by Tables 7.3.1.1.2-7, if transform precoder is enabled, dmrs-Type = 1, and maxLength = 2;
3 bits as defined by Tables 7.3.1.1.2-8/9/10/11, if transform precoder is disabled, dmrs-Type = 1, and maxLength = 1, and the value of rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-16/17/18/19, if transform precoder is disabled, dmrs-Type = 2, and maxLength = 1, and the value of rank is determined according to the SRS resource indicator field if the higher layer parameter txConfig = nonCodebook and according to the Precoding information and number of layers field if the higher layer parameter txConfig = codebook;
5 bits as defined by Tables 7.3.1.1.2-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook.
where the number of CDM groups without data of values 1, 2, and 3 in Tables 7.3.1.1.2-6 to 7.3.1.1.2-23 refers to CDM groups {0}, {0, 1}, and {0, 1, 2} respectively.
If a UE is configured with both dmrs-UplinkForPUSCH-MappingTypeA and dmrs-UplinkForPUSCH-MappingTypeB, the bitwidth of this field equals max $\{x_A, x_B\}$, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.
SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].

TABLE 5d

CSI request - 0, 1, 2, 3, 4, 5, or 6 bits determined by higher layer parameter reportTriggerSize.
CBG transmission information (CBGTI) - 0 bit if higher layer parameter codeBlockGroupTransmission for PUSCH is not configured, otherwise, 2, 4, 6, or 8 bits determined by higher layer parameter maxCodeBlockGroupsPerTransportBlock for PUSCH.
PTRS-DMRS association - number of bits determined as follows
0 bit if PTRS-UplinkConfig is not configured and transform precoder is disabled, or if transform precoder is enabled, or if maxRank = 1;
2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field.

TABLE 5d-continued

If "Bandwidth part indicator" field indicates a bandwidth part other
than the active bandwidth part and the "PTRS-DMRS association"
field is present for the indicated bandwidth part but not present for
the active bandwidth part, the UE assumes the "PTRS-DMRS
association" field is not present for the indicated bandwidth part.
beta_offset indicator - 0 if the higher layer parameter betaOffsets =
semiStatic; otherwise 2 bits as defined by Table 9.3-3 in [5, TS
38.213].
DMRS sequence initialization - 0 bit if transform precoder is
enabled; 1 bit if transform precoder is disabled.
UL-SCH indicator - 1 bit. A value of "1" indicates UL-SCH shall be
transmitted on the PUSCH and a value of "0" indicates UL-SCH
shall not be transmitted on the PUSCH. Except for DCI format 0_1
with CRC scrambled by SP-CSI-RNTI, a UE is not expected to
receive a DCI format 0_1 with UL-SCH indicator of "0" and CSI
request of all zero(s).

DCI format 1_0 may be used as a fallback DCI that schedules a PDSCH. Here, a CRC may be scrambled by a C-RNTI. The DCI format 1_0 in which the CRC is scrambled by the C-RNTI may include, for example, the following pieces of information of Table 6 below.

TABLE 6

Identifier for DCI formats - 1 bits
The value of this bit field is always set to 1, indicating a DL DCT
format
Frequency domain resource assignment -
$\lceil \log_2(N_{RB}^{DL,\ BWP}(N_{RB}^{UL,\ BWP} + 1)/2) \rceil$ bits where $N_{RB}^{DL,\ BWP}$ is given by
subclause 7.3.1.0
If the CRC of the DCI format 1_0 is scrambled by C-RNTI and the
"Frequency domain resource assignment" field are of all ones, the DCI
format 1_0 is for random access procedure initiated by a PDCCH order,
with all remaining fields set as follows:
Random Access Preamble index - 6 bits according to ra-
PreambleIndex in Subclause 5.1.2 of [8, TS38.321]
UL/SUL indicator - 1 bit. Tf the value of the "Random Access
Preamble index" is not all zeros and if the UE is configured with
supplementaryUplink in ServingCellConfig in the cell, this field
indicates which UL carrier in the cell to transmit the PRAC.H
according to Table 7.3.1.1.1-1; otherwise, this field is reserved
SS/PBCH index - 6 bits. If the value of the "Random Access
Preamble index" is not all zeros, this field indicates the SS/PBCH
that shall be used to determine the RACH occasion for the PRACH
transmission; otherwise, this field is reserved.
PRACH Mask index - 4 bits. If the value of the "Random Access
Preamble index" is not all zeros, this field indicates the RACH
occasion associated with the SS/PBCH indicated by "SS/PBCH
index" for the PRACH transmission, according to Subclause 5.1.1 of
[8, TS38.321]; otherwise, this field is reserved
Reserved bits - 10 bits
Otherwise, all remaining fields are set as follows:
Time domain resource assignment - 4 bits as defined in Subclause
5.1.2.1 of [6, TS 38.214]
VRB-to-PRB mapping - 1 bit according to Table 7.3.1.2.2-5
Modulation and coding scheme - 5 bits as defined in Subclause 5.1.3
of [6, TS 38.214]
New data indicator - 1 bit
Redundancy version - 2 bits as defined in Table 7.3.1.1.1-2
HARQ process number - 4 bits
Downlink assignment index - 2 bits as defined in Subclause 9.1.3 of
[5, TS 38.213], as counter DAI
TPC command for scheduled PUCCH - 2 bits as defined in
Subclause 7.2.1 of [5, TS 38.213]
PUCCH resource indicator - 3 bits as defined in Subclause 9.2.3 of
[5, TS 38.213]
PDSCH-to-HARQ_feedback timing indicator - 3 bits as defined in
Subclause 9.2.3 of [5, TS38.213]

DCI format 1_1 may be used as a non-fallback DCI that schedules a PDSCH. Here, a CRC may be scrambled by a C-RNTI. The DCI format 1_1 in which the CRC is scrambled by the C-RNTI may include, for example, pieces of information of Table 7a to Table 7c below. Table 7a to Table 7c show a series of fields (pieces of information) included in DCI format 1_1 in a separate manner for convenience.

TABLE 7a

Identifier for DCI formats - 1 bits
The value of this bit field is always set to 1, indicating a DL DCI
format
Carrier indicator - 0 or 3 bits as defined in Subclause 10.1 of [5, TS
38.213],
Bandwidth part indicator - 0, 1 or 2 bits as determined by the
number of DL BWPs $n_{BWP,\ RRC}$ configured by higher layers,
excluding the initial DL bandwidth part. The bitwidth for this field is
determined as $\lceil \log_2(n_{BWP}) \rceil$ bits, where
$n_{BXP} = n_{BWP,\ RRC} + 1$ if $n_{BWP,\ RRC} \leq 3$, in which case the bandwidth
part indicator is equivalent to the ascending order of the higher
layer parameter BWP-Id;
otherwise $n_{BWP} = n_{BWP,\ RRC}$, in which case the bandwidth part
indicator is defined in Table 7.3.1.1.2-1;
If a UE does not support active BWP change via DCI, the UE
ignores this bit field.
Frequency domain resource assignment - number of bits determined
by the following, where $N_{RB}^{DL,\ BWP}$ is the size of the active DL
bandwidth part:
$N_{RBG}$ bits if only resource allocation type 0 is configured, where
$N_{RBG}$ is defined in Subclause 5.1.2.2.1 of [6, TS38.214],
$\lceil \log_2(N_{RB}^{DL,\ BWP}(N_{RB}^{DL,\ BWP} + 1)/2) \rceil$ bits if only resource allocation
type 1 is configured, or
max ($\lceil \log_2(N_{RB}^{DL,\ BWP} (N_{RB}^{DL,\ BWP} + 1)/2) \rceil$, $N_{RBG}$) + 1 bits if both
resource allocation type 0 and 1 are configured.
If both resource allocation type 0 and 1 are configured, the MSB
bit is used to indicate resource allocation type 0 or resource
allocation type 1, where the bit value of 0 indicates resource
allocation type 0 and the bit value of 1 indicates resource
allocation type 1.
For resource allocation type 0, the $N_{RBG}$ LSBs provide the
resource allocation as defined in Subclause 5.1.2.2.1 of [6, TS
38.214],
For resource allocation type 1, the
$\lceil \log_2(N_{RB}^{DL,\ BWP}(N_{RB}^{DL,\ BWP} + 1)/2) \rceil$ LSBs provide the resource
allocation as defined in Subclause 5.1.2.2.2 of [6, TS 38.214]
If "Bandwidth part indicator" field indicates a bandwidth part other
than the active bandwidth part and if both resource allocation type 0
and 1 are configured for the indicated bandwidth part, the UE
assumes resource allocation type 0 for the indicated bandwidth part
if the bitwidth of the "Frequency domain resource assignment" field
of the active bandwidth part is smaller than the bitwidth of the
"Frequency domain resource assignment" field of the indicated
bandwidth part.
Time domain resource assignment - 0, 1, 2, 3, or 4 bits as defined in
Subclause 5.1.2.1 of [6, TS 38.214]. The bitwidth for this field is
determined as $\lceil \log_2(I) \rceil$ bits, where I is the number of entries in the
higher layer parameter pdsch-TimeDomainAllocationList if the
higher layer parameter is configured; otherwise I is the number of
entries in the default table.
VRB-to-PRB mapping - 0 or 1 bit:
0 bit if only resource allocation type 0 is configured or if
interleaved VRB-to-PRB mapping is not configured by high
layers;
1 bit according to Table 7.3.1.2.2-5 otherwise, only applicable to
resource allocation type 1, as defined in Subclause 7.3.1.6 of [4,
TS 38.211].
PRB bundling size indicator - 0 bit if the higher layer parameter prb-
BundlingType is not configured or is set to 'staticBundling', or 1 bit if
the higher layer parameter prb-BundlingType is set to
'dynamicBundling' according to Subclause 5.1.2.3 of [6, TS 38.214].

TABLE 7b

Rate matching indicator - 0, 1, or 2 bits according to higher layer
parameters rateMatchPatternGroup1 and rateMatchPatternGroup2,
where the MSB is used to indicate rateMatchPatternGroup1 and the
LSB is used to indicate rateMatchPatternGroup2 when there are two
groups.
ZP CSI-RS trigger - 0, 1, or 2 bits as defined in Subclause 5.1.4.2 of
[6, TS 38.214]. The bitwidth for this field is determined as
$\lceil \log_2(n_{ZP} + 1) \rceil$ bits, where $n_{ZP}$ is the number of aperiodic ZP CSI-
RS resource sets configured by higher layer.

TABLE 7b-continued

For transport block 1:
Modulation and coding scheme - 5 bits as defined in Subclause
5.1.3.1 of [6, TS 38.214]
New data indicator - 1 bit
Redundancy version - 2 bits as defined in Table 7.3.1.1.1-2
For transport block 2 (only present if
maxNrofCodeWordsScheduledByDCI equals 2):
Modulation and coding scheme - 5 bits as defined in Subclause
5.1.3.1 of [6, TS 38.214]
New data indicator - 1 bit
Redundancy version - 2 bits as defined in Table 7.3.1.1.1-2
If "Bandwidth part indicator" field indicates a bandwidth part other
than the active bandwidth part and the value of
maxNrofCodeWordsScheduledByDCI for the indicated bandwidth
part equals 2 and the value of maxNrofCodeWordsScheduledByDCI
for the active bandwidth part equals 1, the UE assumes zeros are
padded when interpreting the "Modulation and coding scheme",
"New data indicator", and "Redundancy version" fields of transport
block 2 according to Subclause 12 of [5, TS38.213], and the UE
ignores the "Modulation and coding scheme", "New data indicator",
and "Redundancy version" fields of transport block 2 for the
indicated bandwidth part.
HARQ process number - 4 bits
Downlink assignment index - number of bits as defined in the
following
4 bits if more than one serving cell are configured in the DL and
the higher layer parameter pdsch-HARQ-ACK-
Codebook = dynamic, where the 2 MSB bits are the counter DAI
and the 2 LSB bits are the total DAI;
2 bits if only one serving cell is configured in the DL and the
higher layer parameter pdsch-HARQ-ACK-Codebook = dynamic,
where the 2 bits are the counter DAI;
0 bits otherwise.
TPC command for scheduled PUCCH - 2 bits as defined in
Subclause 7.2.1 of [5, TS 38.213]
PUCCH resource indicator - 3 bits as defined in Subclause 9.2.3 of
[5, TS 38.213]
PDSCH-to-HARQ_feedback timing indicator - 0, 1, 2, or 3 bits as
defined in Subclause 9.2.3 of [5, TS 38.213]. The bitwidth for this
field is determined as $\lceil \log_2(I) \rceil$ bits, where I is the number of entries
in the higher layer parameter dl-DataToUL-ACK.
Antenna port(s) - 4, 5, or 6 bits as defined by Tables 7.3.1.2.2-
1/2/3/4, where the number of CDM groups without data of values 1,
2, and 3 refers to CDM groups {0}, {0, 1}, and {0, 1, 2} respectively.
The antenna ports $\{p_0, \ldots, p_{v-1}\}$ shall be determined according to the
ordering of DMRS port(s) given by Tables 7.3.1.2.2-1/2/3/4.
If a UE is configured with both dmrs-DownlinkForPDSCH-
MappingTypeA and dmrs-DownlinkForPDSCH-MappingTypeB, the
bitwidth of this field equals max$\{x_A, x_B\}$, where $x_A$ is the
"Antenna ports" bitwidth derived according to dmrs-
DownlinkForPDSCH-MappingTypeA and $x_B$ is the "Antenna
ports" bitwidth derived according to dmrs-DownlinkForPDSCH-
MappingTypeB. A number of $|x_A - x_B|$ zeros are padded in the
MSB of this field, if the mapping type of the PDSCH corresponds to
the smaller value of $x_A$ and $x_B$.

TABLE 7c

Transmission configuration indication - 0 bit if higher layer
parameter tci-PresentInDCI is not enabled; otherwise 3 bits as

TABLE 7c-continued defined in Subclause 5.1.5 of [6, TS38.214].
If "Bandwidth part indicator" field indicates a bandwidth part other
than the active bandwidth part,
if the higher layer parameter tci-PresentInDCI is not enabled for
the CORESET used for the PDCCH carrying the DCI format
1_1,
the UE assumes tci-PresentInDCI is not enabled for all
CORESETs in the indicated bandwidth part;
otherwise.
the UE assumes tci-PresentInDCI is enabled for all
CORESETs in the indicated bandwidth part.
SRS request - 2 bits as defined by Table 7.3.1.1.2-24 for UEs not
configured with supplementaryUplink in ServingCellConfig in the
cell; 3 bits for UEs configured with supplementaryUplink in
ServingCellConfig in the cell where the first bit is the non-SUL/SUL
indicator as defined in Table 7.3.1.1.1-1 and the second and third bits
are defined by Table 7.3.1.1.2-24. This bit field may also indicate the
associated CSI-RS according to Subclause 6.1.1.2 of [6, TS 38.214].
CBG transmission information (CBGTI) - 0 bit if higher layer
parameter codeBlockGronpTransmissioit for PDSCH is not
configured, otherwise, 2, 4, 6, or 8 bits as defined in Subclause 5.1.7
of [6, TS38.214], determined by the higher layer parameters
maxCodeBlockGroupsPerTransportBlock and
maxNrofCodeWordsScheduledByDCI for the PDSCH.
CBG flushing out information (CBGFI) - 1 bit if higher layer
parameter codeBlockGroupFlushIndicator is configured as "TRUE",
0 bit otherwise.
DMRS sequence initialization - 1 bit.

Hereinafter, a method for time domain resource allocation for a data channel in a 5G communication system will be described.

The base station may configure, in the UE, a table for time domain resource allocation information for a physical downlink shared channel (PDSCH) and a physical uplink shared channel (PUSCH) via higher layer signaling (e.g., RRC signaling). With regard to the PDSCH, a table including up to 16 entries (maxNrofDL-Allocations=16) may be configured. With regard to the PUSCH, a table including up to 16 entries (maxNrofUL-Allocations=16) may be configured. The time domain resource allocation information may include, for example, a PDCCH-to-PDSCH slot timing (corresponding to a time interval in units of slots between a time point at which a PDCCH is received and a time point at which a PDSCH scheduled by the received PDCCH is transmitted, and represented by K0), a PDCCH-to-PUSCH slot timing (K2) (corresponding to a time interval in units of slots between a time point at which a PDCCH is received and a time point at which a PUSCH scheduled by the received PDCCH is transmitted, and represented by K2), information about the location of a start symbol for which a PDSCH or a PUSCH is scheduled in a slot and the length of the scheduled symbol, a PDSCH or PUSCH mapping type, and the like. For example, pieces of information shown in the following Table 8 and Table 9 may be notified of from the base station to the UE via higher layer signaling (e.g., RRC signaling) or L1 signaling (e.g., DCI).

TABLE 8

PDSCH-TimeDomainResourceAllocationList information element

PDSCH-TimeDomainResourceAllocationList ::= SEQUENCE (SIZE(1..maxNrofDL-
Allocations)) OF PDSCH-TimeDomainResourceAllocation
PDSCH-TimeDomainResourceAllocation ::=     SEQUENCE {
   k0                                                                    INTEGER(0..32)
OPTIONAL,   -- Need S
   (PDCCH-to-PDSCH timing, slot unit)
mappingType                                           ENUMERATED {typeA, typeB},
   (PDSCH mapping type)

TABLE 8-continued

PDSCH-TimeDomainResourceAllocationList information element startSymbolAndLength        INTEGER (0..127)
(start symbol and length of PDSCH)
}

TABLE 9

PUSCH-TimeDomainResourceAllocation information element

PUSCH-TimeDomainResourceAllocationList ::= SEQUENCE (SIZE(1..maxNrofUL-
Allocations)) OF PUSCH-TimeDomainResourceAllocation
PUSCH-TimeDomainResourceAllocation ::= SEQUENCE {
   k2                          INTEGER(0..32)   OPTIONAL,
-- Need S
    (PDCCH-to-PUSCH timing, slot unit)
    mappingType                 ENUMERATED {typeA, typeB},
    (PUSCH mapping type)
    startSymbolAndLength        INTEGER (0..127)
    (start symbol and length of PUSCH)
}

The base station may notify the UE of one of the entries in the table for the time domain resource allocation information via L1 signaling (e.g., DCI) (for example, this may be indicated by a "time domain resource allocation" field in the DCI). The UE may obtain the time domain resource allocation information for the PDSCH or the PUSCH based on the DCI received from the base station.

Hereinafter, a method for frequency domain resource allocation for a downlink control channel in a 5G communication system will be described in more detail with reference to the accompanying drawings.

In 5G, two types, for example, resource allocation type 0 and resource allocation type 1 may be supported as a method for indicating frequency domain resource allocation information for a physical downlink data channel (PDSCH) and a physical uplink data channel (PUSCH).

Resource Allocation Type 0

RB allocation information may be notified of from the base station to the UE in the form of a bitmap for a resource block group (RBG). Here, the RBG may include a set of consecutive virtual RBs (VRBs), and the size P of the RBG may be determined based on a value configured as a higher layer parameter (rbg-Size) and a BWP size value defined in Table 10 below.

TABLE 10

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

The total number of RBGs ($N_{RBG}$) of BWP i having the size of $N_{BWP,i}^{size}$ may be defined as the following equation: $N_{RBG} = \lceil (N_{BWP,i}^{size} + (N_{BWP,i}^{start} \bmod P))/P \rceil$, where the size of the first RBG is $RBG_0^{size} = P - N_{BWP,i}^{start} \bmod P$, the size of the last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$, and the sizes of all other RBGs are P.

Each of bits of the bitmap with the size of $N_{RBG}$ bits may correspond to each RBG. RBGs may be indexed in the order of increasing frequency, starting from the lowest frequency position of the BWP. In relation to $N_{RBG}$ RBGs in the BWP, RBG #0 to RBG #($N_{RBG}$-1) may be mapped from the MSB to the LSB of the RBG bitmap. When a specific bit value in the bitmap is 1, the UE may determine that the RBG corresponding to the corresponding bit value is allocated, and when a specific bit value in the bitmap is 0, the UE may determine that the RBG corresponding to the corresponding bit value is not allocated.

Resource Allocation Type 1

RB allocation information may be notified of from the base station to the terminal as information about the start position and length of the consecutively allocated VRBs. Here, interleaving or non-interleaving may be additionally applied to the consecutively allocated VRBs. The resource allocation field of resource allocation type 1 may include a resource indication value (RIV), and the RIV may include the start point ($RB_{start}$) of the VRB and the length ($L_{RBs}$) of the consecutively allocated RB. More specifically, the RIV in the BWP with the size of $N_{BWP}^{size}$ may be defined as follows:

if $(L_{RBs}-1) \le \lfloor N_{BWP}^{size}/2 \rfloor$ then $RIV = N_{BWP}^{size}(N_{BWP}^{size} - L_{RBs} - 1) + (N_{BWP}^{size} - 1 - RB_{start})$ else $RIV = N_{BWP}^{size}(N_{BWP}^{size} - L_{RBs} + 1)(N_{BWP}^{size} - 1 - RB_{start})$ The base station may configure the resource allocation type in the UE via higher layer signaling (e.g., higher layer parameter resourceAllocation may be configured as one value among resourceAllocationType0, resourceAllocationType1, or dynamicSwitch). If the UE is configured with both resource allocation types 0 and 1 (or if the higher layer parameter resourceAllocation is configured as dynamicSwitch in the same way), the UE may indicate a bit corresponding to the most significant bit (MSB) of the field indicating resource allocation in the DCI format indicating scheduling is either resource allocation type 0 or resource allocation type 1, and resource allocation information may be indicated through the remaining bits except for the bit corresponding to the MSB based on the indicated resource allocation type, and the UE may interpret the resource allocation field information of the DCI field based on the indicated resource allocation information. If the UE is configured with one of resource allocation type 0 and resource allocation type 1 (or if the higher layer parameter resourceAllocation is configured as one value among resourceAllocationType0 and resourceAllocationType1), resource allocation information may be indicated based on a resource allocation type for which a field indicating resource allocation in the DCI format indicating scheduling is configured, and the UE may interpret resource allocation field information of the DCI field based on the indicated resource allocation information.

Hereinafter, a downlink control channel in a 5G communication system will be described in more detail with reference to the drawings.

Figure 8:
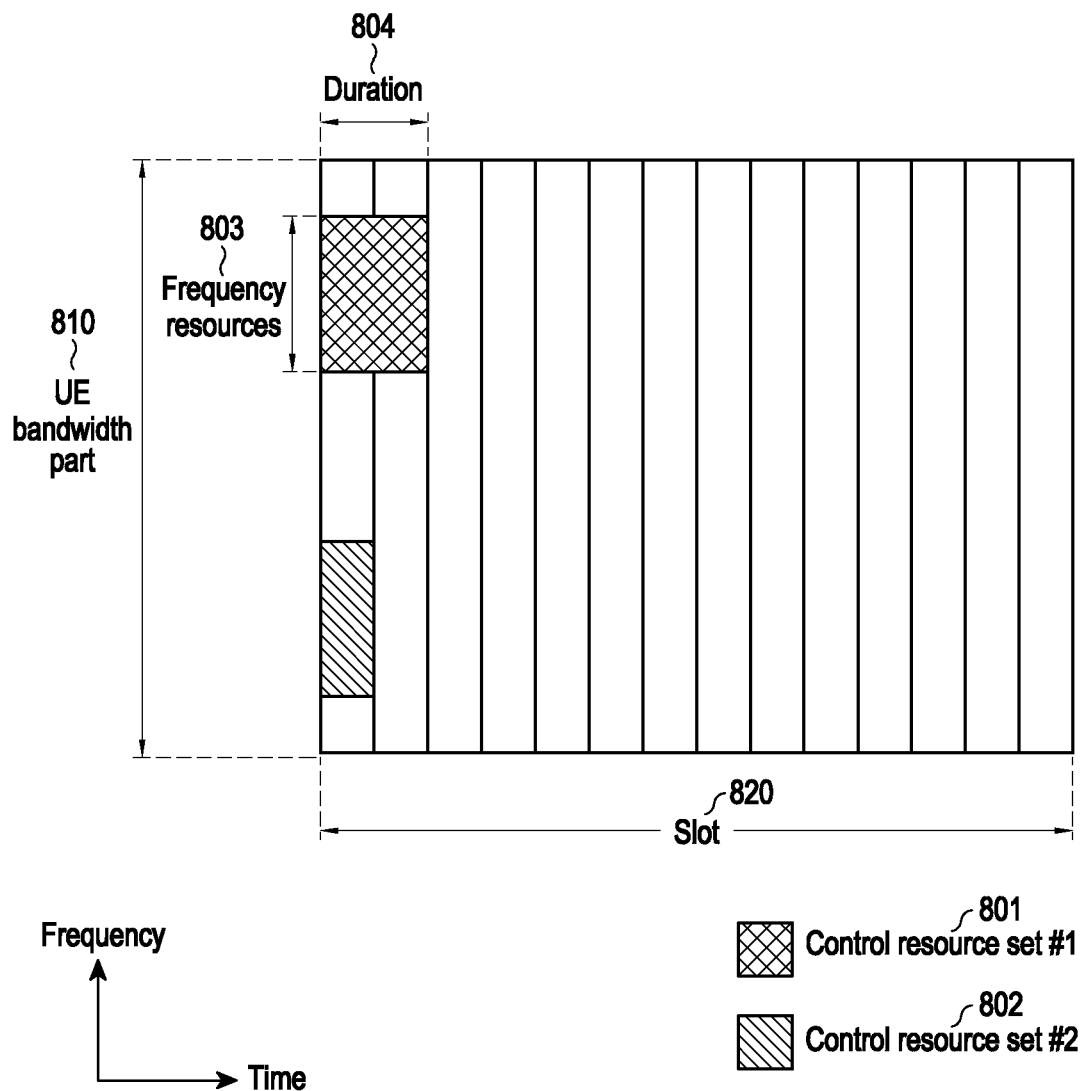
FIG. 8 illustrates a structure of a control resource set in a wireless communication system according to various embodiments of the disclosure.

FIG. 8 illustrates a structure of a control resource set in a wireless communication system according to various embodiments of the disclosure.

Referring to FIG. 8, the control resource set #1 801 is configured with the control resource set duration of two symbols, and the control resource set #2 802 is configured with the control resource set duration of one symbol.

The base station may configure, for the UE, the above described control resource set of 5G via higher layer signaling (e.g., system information, master information block (MIB), radio resource control (RRC) signaling) or DCI. Configuring the control resource set for the UE may be understood as providing information such as a control resource set identity, a frequency location of the control resource set, a symbol length of the control resource set, and the like. The configuration information regarding the control resource set may include, for example, pieces of information of Table 11 below.

TABLE 11

```
ControlResourceSet ::=                              SEQUENCE {
        -- Corresponds to L1 parameter 'CORESET-ID'
        controlResourceSetId
        ControlResourceSetId,
    (Control Resource Set Identity))
        frequencyDomainResources         BIT STRING (SIZE (45)),
    (Frequency domain resources allocation information)
        duration                              INTEGER
(1..maxCoReSetDaration),
    (Time domain resources allocation information)
        cce-REG-MappingType                      CHOICE {
    (CCE-to-REG mapping type)
            interleaved
            SEQUENCE {
                    reg-BundleSize
            ENUMERATED {n2, n3, n6},
            (REG bundle size)
                    precoderGranularity
            ENUMERATED {sameAsREG-bundle, allContiguousRBs},
                    interleaverSize
            ENUMERATED {n2, n3, n6}
                    (interleaver size)
                    shiftIndex
            INTEGER(0..maxNrofPhysicalResourceBlocks-1)
                            OPTIONAL
                (interleaver shift)
        },
            nonInterleaved                          NULL
        },
        tci-StatesPDCCH
        SEQUENCE(SIZE (1..maxNrofTCI-StatesPDCCH)) OF TCI-StateId
                OPTIONAL,
    (QCL configuration information)
        tci-PresentInDCI                         ENUMERATED
{enabled}
                            OPTIONAL,     -- Need S
}
```

Specifically, FIG. 8 illustrates an example of a control resource set (CORESET) through which a downlink control channel is transmitted in a 5G wireless communication system. FIG. 8 illustrates an example in which a UE BWP 810 is configured on a frequency axis and two control resource sets (control resource set #1 801 and control resource set #2 802) are configured in one slot 820 on a time axis. The control resource sets may be configured in specific frequency resources within the entire UE BWP 810 on the frequency axis. In FIG. 8, specific frequency resources 803 show an example of a frequency resource configured in the control resource set #1 801. The control resource set may be configured with one or multiple OFDM symbols on the time axis, and this may be defined as a control resource set duration 804.

In Table 11, tci-StatesPDCCH (simply referred to as transmission configuration indication (TCI) state) configuration information may include information about one or multiple synchronization signal (SS)/physical broadcast channel (PBCH) block (that is, synchronization signal block (SSB)) indices having a quasi-co-located (QCLed) relationship with a DMRS transmitted in the corresponding control resource set or a channel state information reference signal (CSI-RS) index.

Figure 9:
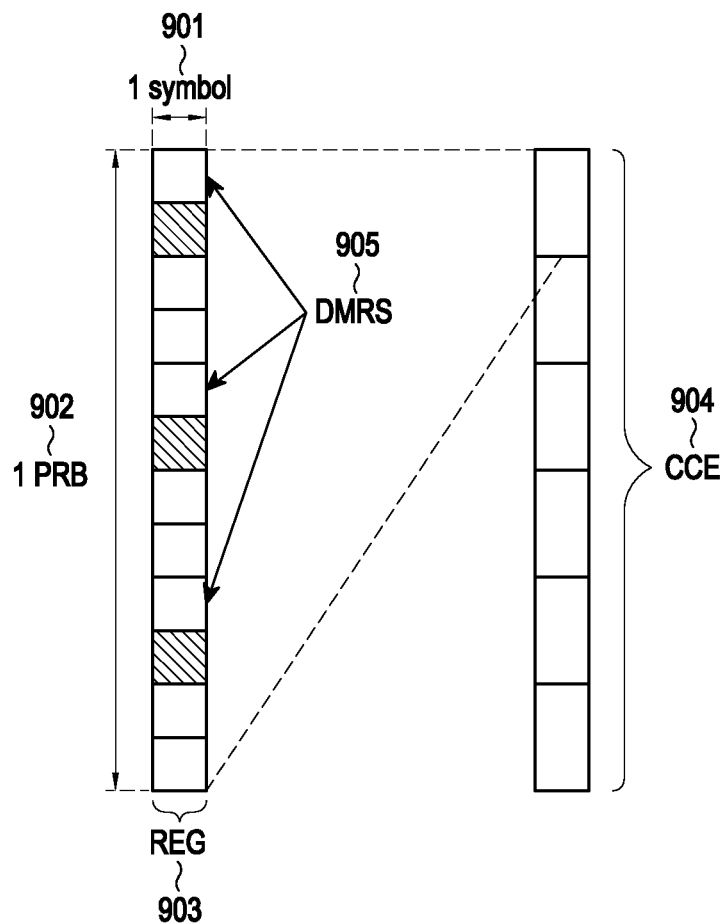
FIG. 9 illustrates a resource structure in a wireless communication system according to various embodiments of the disclosure.

FIG. 9 illustrates a resource structure in a wireless communication system according to various embodiments of the disclosure.

Specifically, FIG. 9 shows an example of a basic unit of time and frequency resources configuring a downlink control channel that can be used in 5G.

Referring to FIG. 9, the basic unit of time and frequency resources configuring a downlink control channel (e.g., PDCCH) may be referred to as a resource element group (REG) 903. The REG 903 may be defined by one OFDM symbol 901 on a time axis and one physical resource block (PRB) 902, that is, 12 subcarriers, on a frequency axis. The base station may concatenate the REG 903 to configure a downlink control channel allocation unit.

Referring to FIG. 9, when a basic unit to which a downlink control channel is allocated in 5G is referred to as a control channel element (CCE) 904, one CCE 904 may include a plurality of REGs 903. When describing the REG 903 illustrated in FIG. 9 as an example, the REG 903 may include 12 resource elements (REs), and when one CCE 904 includes six REGs 903, one CCE 904 may include 72 REs. When the downlink control resource set is configured, the corresponding region may include a plurality of CCEs 904. A specific downlink control channel may be transmitted after being mapped to one or more CCEs 904 according to an aggregation level (AL) in the control resource set. The CCEs 904 in the control resource set are distinguished by numbers. Here, the numbers of the CCEs 904 may be assigned according to a logical mapping scheme.

Referring to FIG. 9, the basic unit of the downlink control channel, that is, the REG 903 may include both REs to which DCI is mapped and a region to which a DMRS 905 which is a reference signal for decoding the DCI is mapped. As illustrated in FIG. 9, three DMRSs 905 may be transmitted in one REG 903. The number of CCEs required for transmission of the PDCCH may be 1, 2, 4, 8, or 16 according to the aggregation level (AL). A different number of CCEs may be used to implement link adaptation of the downlink control channel. For example, if AL=L, one downlink control channel may be transmitted through L CCEs. The UE needs to detect a signal in a state in which the UE does not know information about the downlink control channel, and a search space representing a set of CCEs has been defined for blind decoding. The search space is a set of downlink control channel candidates including CCEs that the UE has to attempt to decode at a given AL. Since there are various ALs that make one bundle of 1, 2, 4, 8, or 16 CCEs, the UE may have a plurality of search spaces. A search space set may be defined as a set of search spaces at all configured ALs.

The search space may be classified into a common search space and a UE-specific search space. A predetermined group of UEs or all the UEs may examine the common search space of the PDCCH so as to receive cell common control information such as dynamic scheduling of system information or a paging message. For example, PDSCH scheduling allocation information for transmission of the SIB including cell operator information and the like may be received by examining the common search space of the PDCCH. In a case of the common search space, since a predetermined group of UEs or all the UEs need to receive the PDCCH, the common search space may be defined as a set of previously appointed CCEs. Scheduling allocation information about the UE-specific PDSCH or PUSCH may be received by examining the UE-specific search space of the PDCCH. The UE-specific search space may be UE-specifically defined as a function of the UE identity and various system parameters.

In 5G, the parameter for the search space of the PDCCH may be configured for the UE by the base station via higher layer signaling (e.g., SIB, MIB, RRC signaling, etc.). For example, the base station may configure, in the UE, the number of PDCCH candidates at each aggregation level L, the monitoring periodicity for the search space, the monitoring occasion of symbol units in the slots for the search space, the search space type (common search space or UE-specific search space), the combination of RNTI and DCI format to be monitored in the search space, the control resource set index to monitor the search space, and the like. For example, the configuration information for the search space of the PDCCH may include the following pieces of information.

TABLE 12

```
SearchSpace ::=                                    SEQUENCE {
            -- Identity of the search space. SearchSpaceId = 0 identifies the
SearchSpace configured via PBCH (MIB) or ServingCellConfigCommon.
            searchSpaceId                          SearchSpaceId,
        (search space ID)
            controlResourceSetId
            ControlResourceSetId,
        (control resource set ID)
            monitoringSlotPeriodicityAndOffset     CHOICE {
        (monitoring slot periodicity and offset)
                sl1
            NULL,
                sl2
            INTEGER (0..1),
                sl4
            INTEGER (0..3),
                sl5
            INTEGER (0..4),
                sl8
            INTEGER (0..7),
                sl10
            INTEGER (0..9),
                sl16
            INTEGER (0..15),
                sl20
            INTEGER (0..19)
            }
```

TABLE 12-continued

```
                                        OPTIONAL,
    duration(monitoring length)         INTEGER {2..2559}
        monitoringSymbolsWithinSlot     BIT STRING
(SIZE (14))
            OPTIONAL,
    (monitoring symbols within slot)
        nrofCandidates                  SEQUENCE {
    (number of PDCCH candidates per aggregation level)
        aggregationLevel1               ENUMERATED
{n0, n1, n2, n3, n4, n5, n6, n8},
        aggregationLevel2               ENUMERATED
{n0, n1, n2, n3, n4, n5, n6, n8},
        aggregationLevel4               ENUMERATED
{n0, n1, n2, n3, n4, n5, n6, n8},
        aggregationLevel8               ENUMERATED
{n0, n1, n2, n3, n4, n5, n6, n8},
        aggregationLevel16              ENUMERATED
{n0, n1, n2, n3, n4, n5, n6, n8}
        },
        searchSpaceType                 CHOICE {
        (search space type)
            -- Configures this search space as common search space (CSS) and
DCI formats to monitor.
            common
            SEQUENCE {
            (common search space)
            }
            ue-Specific
            SEQUENCE {
            (UE-specific search space)
                -- Indicates whether the UE monitors in this USS for DCI
formats 0-0 and 1-0 or for formats 0-1 and 1-1.
                formats
                ENUMERATED {formats0-0-And-1-0, formats0-1-And-1-1},
                ...
            }
```

The base station may configure one or more search space sets in the UE according to configuration information. According to an embodiment of the disclosure, the base station may configure search space set 1 and search space set 2 in the UE. The base station may configure the search space set 1 in the UE so that DCI format A scrambled by an X-RNTI is monitored in the common search space. The base station may configure the search space set 2 in the UE so that DCI format B scrambled by a Y-RNTI is monitored in the UE-specific search space. In the X-RNTI and Y-RNTI, "X" and "Y" may correspond to one of various RNTIs to be described later.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

In the common search space, the following combinations of the DCI format and the RNTI may be monitored, however, the disclosure is not limited thereto:
DCI format 0_0/1_0 with CRC scrambled by C-RNTI, CS-RNTI, MCS-C-RNTI, SP-CSI-RNTI, RA-RNTI, TC-RNTI, P-RNTI, or SI-RNTI;
DCI format 2_0 with CRC scrambled by SFI-RNTI;
DCI format 2_1 with CRC scrambled by INT-RNTI;
DCI format 2_2 with CRC scrambled by TPC-PUSCH-RNTI, TPC-PUCCH-RNTI; and/or
DCI format 2_3 with CRC scrambled by TPC-SRS-RNTI.

In the UE-specific search space, the following combinations of the DCI format and the RNTI may be monitored, however, the disclosure is not limited thereto:
DCI format 0_0/1_0 with CRC scrambled by C-RNTI, CS-RNTI, TC-RNTI; and/or
DCI format 1_0/1_1 with CRC scrambled by C-RNTI, CS-RNTI, TC-RNTI.

The specified RNTIs may follow the definitions and usages described below:
C-RNTI (Cell RNTI): For UE-specific PDSCH scheduling,
Modulation coding scheme C-RNTI (MCS-C-RNTI): For UE-specific PDSCH scheduling,
Temporary Cell RNTI (TC-RNTI): For UE-specific PDSCH scheduling,
Configured Scheduling RNTI (CS-RNTI): For semi-statically configured UE-specific PDSCH scheduling,
Random access RNTI (RA-RNTI): For PDSCH scheduling in random access operation,
Paging RNTI (P-RNTI): For scheduling of PDSCH through which paging is transmitted,
System information RNTI (SI-RNTI): For PDSCH scheduling in which system information is transmitted,
Interruption RNTI (INT-RNTI): For notifying of whether to puncture PDSCH,
Transmit power control for PUSCH RNTI (TPC-PUSCH-RNTI): For indication of power control command for PUSCH,
Transmit Power Control for PUCCH RNTI (TPC-PUCCH-RNTI): For indication of power control command for PUCCH, and/or
Transmit Power Control for SRS RNTI (TPC-SRS-RNTI): For indication of power control command for SRS.

The above-described specified DCI formats may follow the definitions shown in Table 13 below.

TABLE 13

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 2_0 | Scheduling of PDSCH in one ceil |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be expressed by the following Equation 1.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i$$ [Equation 1]

L: Aggregation level,
$n_{CI}$: Carrier index,
$N_{CCE,p}$: Total number of CCEs existing in the control resource set p,
$n_{s,f}^\mu$: Slot index,
$M_{p,s,max}^{(L)}$: Number of PDCCH candidates of aggregation level L,
$m_{s,n_{CI}} = 0, \ldots, M_{p,s,max}^{(L)} - 1$: PDCCH candidate group index of aggregation level L,
$i = 0, \ldots, L-1$, $$-Y_{p,n_{s,f}^\mu} = \left( A_p \cdot Y_{p,n_{s,f}^\mu - 1} \right) \bmod D,$$

$$Y_{p,-1} = n_{RNTI} \neq 0,$$

$$A_0 = 39827,$$

$$A_1 = 39829,$$

$$A_2 = 39839,$$

$$D = 65537,$$

and
$n_{RNTI}$: UE identifier.
The $$Y_-\left(p, n_{s,f}^\mu\right)$$

value may correspond to zero in the common search space.
In a case of the UE-specific search space, the $$Y_-\left(p, n_{s,f}^\mu\right)$$

value may correspond to a value that changes according to the UE identity (C-RNTI or ID configured by the base station for the UE) and the time index.

Figure 10:
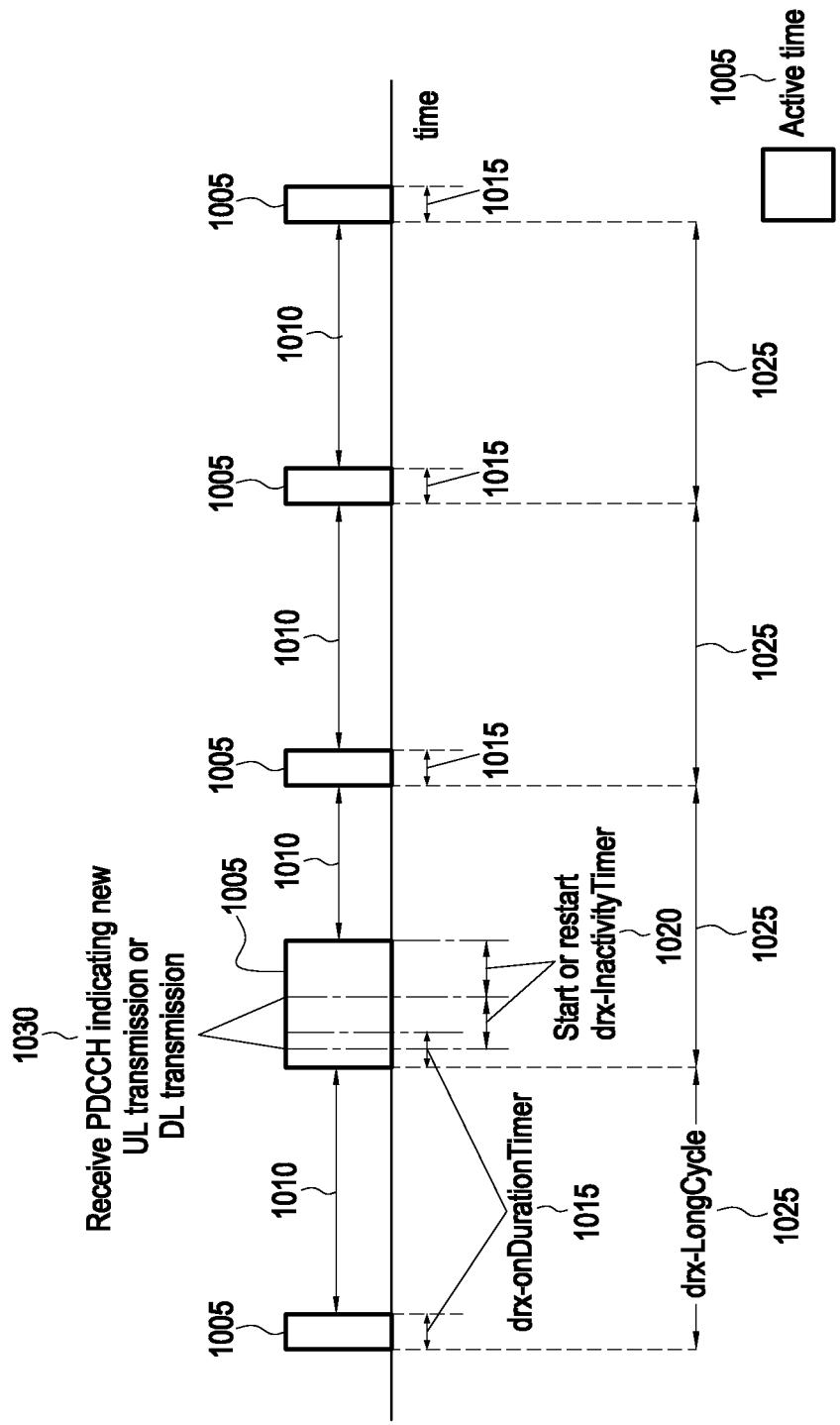
FIG. 10 illustrates a process of discontinuous reception (DRX) in a wireless communication system according to various embodiments of the disclosure.

FIG. 10 illustrates a process of discontinuous reception (DRX) in a wireless communication system according to various embodiments of the disclosure.

Specifically, FIG. 10 illustrates a discontinuous reception (DRX) operation. The discontinuous reception (DRX) is an operation in which the UE that is using a service discontinuously receives data in an RRC connected state in which a radio link is established between the base station and the UE. This DRX operation may be referred to as DRX operation (that is C-DRX) in the RRC connected state. When the DRX is applied, the UE turns on a receiver at a specific time point to monitor a control channel and turns off the receiver when no data is received during a predetermined period, and thus the power consumption of the UE may be reduced. The DRX operation may be controlled by an MAC layer device based on various parameters and a timer.

Referring to FIG. 10, an active time 1005 is a time when the UE wakes up every DRX cycle and monitors the PDCCH. The active time 1005 may be defined as follows:
drx-onDurationTimer, drx-InactivityTimer, drx-RetransmissionTimerDL, drx-RetransmissionTimerUL, or ra-ContentionResolutionTimer is running;
a scheduling request is sent on PUCCH and is pending; or
a PDCCH indicating a new transmission addressed to the C-RNTI of the MAC entity has not been received after successful reception of a random access response for the random access preamble not selected by the MAC entity among the contention-based random access preamble.

DRX-related timers such as drx-onDurationTimer, drx-Inactivity Timer, drx-Retransmi ssionTimerDL, drx-RetransmissionTimerUL, ra-ContentionResolutionTimer, and the like are timers, the values of which are configured by the base station, and have a function of configuring the UE to monitor the PDCCH in a situation in which a predetermined condition is satisfied.

drx-onDurationTimer 1015 is a parameter for configuring a minimum time for which the UE is awake in a DRX cycle. drx-InactivityTimer 1020 is a parameter for additionally configuring a wake-up time when the UE receives a PDCCH indicating a new UL transmission or DL transmission (indicated by reference numeral 1030). drx-RetransmissionTimerDL is a parameter for configuring a maximum time for which the UE is awake so as to receive DL retransmission in a DL HARQ procedure. The drx-RetransmissionTimerUL is a parameter for configuring a maximum time for which the UE is awake so as to receive an UL retransmission grant in an UL HARQ procedure. drx-onDurationTimer, drx-InactivityTimer, drx-RetransmissionTimerDL, and drx-RetransmissionTimerDL may be configured as, for example, the time, the number of subframes, the number of slots, and the like. ra-ContentionResolutionTimer is a parameter for monitoring the PDCCH in a random access procedure.

inActive time 1010 is a time configured not to monitor the PDCCH during the DRX operation and/or a time configured not to receive the PDCCH, and the remaining time excluding the active time 1005 from the entire time of performing the DRX operation may become the inActive time 1010. When the PDCCH is not monitored for the active time 1005, the UE may enter a sleep or inActive state to reduce power consumption.

The DRX cycle refers to a cycle in which the UE wakes up and monitors the PDCCH. That is, the DRX cycle refers to on duration occurrence period or a time interval until the UE monitors the PDCCH and then monitors the next PDCCH. There are two types of the DRX cycle, that is, short DRX cycle and long DRX cycle. The short DRX cycle may be optionally applied.

A long DRX cycle 1025 is a longer cycle between the two DRX cycles configured in the UE. The UE starts the drx-onDurationTimer 1015 again at a time point at which the long DRX cycle 1025 has elapsed from the start point (e.g., start symbol) of the drx-onDurationTimer 1015 while operating in long DRX. When operating in the long DRX cycle 1025, the UE may start the drx-onDurationTimer 1015 in a slot after drx-SlotOffset in a subframe satisfying Equation 2 below. The drx-SlotOffset refers to a delay before the start of the drx-onDurationTimer 1015. The drx-SlotOffset may be configured as, for example, the time, the number of slots, and the like.

[(SFN×10)+subframe number]modulo(drx-Long-Cycle)=drx-StartOffset     [Equation 2]

Here, the drx-LongCycleStartOffset may include the long DRX cycle 1025 and drx-StartOffset and may be used to define a subframe to start the long DRX cycle 1025. The drx-LongCycleStartOffset may be configured as, for example, the time, the number of subframes, the number of slots, and the like.

The short DRX cycle is a shorter cycle between the two DRX cycles defined in the UE. When a predetermined event, for example, reception of a PDCCH indicating new UL transmission or DL transmission (indicated by reference numeral 1030), occurs in the active time 1005 while the UE is operating in the long DRX cycle 1025, the UE starts or restarts the drx-InactivityTimer 1020, and if the drx-InactivityTimer 1020 has expired or a DRX command MAC CE is received, the UE may operate in the short DRX cycle. For example, in FIG. 10, the UE may start drx-ShortCycleTimer at the time when the previous drx-onDurationTimer 1015 or drx-InactivityTimer 1020 expires, and may operate in the short DRX cycle until drx-ShortCycleTimer expires. When the UE receives the PDCCH indicating the new UL transmission or DL transmission (indicated by reference numeral 1030), the UE may expect additional UL transmission or DL transmission in the future and may extend the active time 1005 or delay the arrival of the InActive Time 1010. The UE starts the drx-onDurationTimer 1015 again when the time has elapsed from the start point of the previous on duration by the short DRX cycle while operating in short DRX cycle. Thereafter, when the drx-ShortCycleTimer expires, the UE operates again in the long DRX cycle 1025.

When operating in the short DRX cycle, the UE may start the drx-onDurationTimer 1015 after drx-SlotOffset in a subframe satisfying [Equation 3] below. Here, the drx-SlotOffset refers to a delay before the start of the drx-onDurationTimer 1015. The drx-SlotOffset may be configured as, for example, the time, the number of slots, and the like.

[(SFN×10)+subframe number]modulo(drx-Short-Cycle)=(dry-StartOffset)modulo(drx-ShortCycle)     [Equation 3]

Here, the drx-ShortCycle and the drx-StartOffset may be used to define a subframe to start the short DRX cycle. The drx-ShortCycle and the drx-StartOffset may be configured as, for example, the time, the number of subframes, the number of slots, and the like.

The DRX operation has been described with reference to FIG. 10. According to an embodiment, the UE may reduce power consumption of the UE by performing the DRX operation. However, even when the UE performs the DRX operation, the UE does not always receive the PDCCH associated with the UE in the active time 1005. Therefore, in an embodiment of the disclosure, a signal for controlling the operation of the UE may be provided so as to more effectively save power of the UE.

Hereinafter, a carrier aggregation and scheduling method in a 5G communication system will be described in detail.

A UE may access a primary cell through initial access, and a base station may additionally configure one or multiple secondary cells in the UE. The UE may perform communication through serving cells including a primary cell and a secondary cell configured by the base station.

The base station may be additionally configured with whether cross-carrier scheduling is performed on the cells configured in the UE. For convenience of explanation, when cross-carrier scheduling is configured, a cell in which scheduling is performed (i.e., a cell for reception of downlink control information corresponding to downlink allocation or uplink grant) is collectively referred to as a "first cell," and a cell in which scheduling is performed (i.e., a cell in which downlink or uplink data is actually scheduled and transmitted/received based on downlink control information) is called a "second cell." If the UE is configured with cross-carrier scheduling for a specific cell A (a scheduled cell) (here, cell A corresponds to a "second cell"), the UE may not perform, in cell A, PDCCH monitoring for cell A. The UE may perform PDCCH monitoring for cell A in another cell B (that is, scheduling cell) indicated by the cross-carrier scheduling (here, cell B corresponds to "first cell"). For the purpose of configuring the cross-carrier scheduling for the UE, the base station may configure information on the "first cell" performing scheduling for the "second cell" (e.g., the cell index of the cell corresponding to the "first cell"), a carrier indicator field (CIF) value for the "second cell," and the like. For example, pieces of configuration information of Table 14 below may be notified from the base station to the UE via higher layer signaling (e.g., RRC signaling).

TABLE 14

| CrossCarrierSchedulingConfig ::= | SEQUENCE { |
|---|---|
| schedulingCellInfo | CHOICE { |
| own (self carrier scheduling) | SEQUENCE { - |
| - No cross carrier scheduling | |
| cif-Presence | BOOLEAN |
| }, | |
| other (cross carrier scheduling) | SEQUENCE { - |
| - Cross carrier scheduling | |
| schedulingCellId | ServCellIndex, |
| (scheduling cell index) | |
| cif-InSchedulingCell | INTEGER (1..7) |
| (CIF value) | |
| } | |
| }, | |
| ... | |
| } | |

The UE may perform PDCCH monitoring for a cell, which is configured by cross-carrier scheduling, in a cell corresponding to the "first cell." The UE may determine the index of the cell scheduled by the DCI received from the carrier indicator field value in the DCI format for scheduling data, and may transmit/receive data in the cell indicated by the carrier indicator based on the determined index.

Meanwhile, the scheduled cell (Cell A) and the scheduling cell (Cell B) may be configured with different numerologies. Here, the numerology may include a subcarrier spacing, a cyclic prefix, and the like. When the numerologies of cell A and cell B are different from each other, the following minimum scheduling offset may be additionally considered between the PDCCH and the PDSCH when the PDCCH of cell B schedules the PDSCH of cell A.

[Cross-Carrier Scheduling Method]

(1) When a subcarrier spacing (μB) of cell B is less than a subcarrier spacing (μA) of cell A, the PDSCH may be scheduled from a next PDSCH slot that corresponds to X symbols after the last symbol of the PDCCH received in cell B. Here, X may be different according to μB. X=4 symbols may be defined when μB=15 kHz, X=4 symbols may be defined when μB=30 kHz, and X=8 symbols may be defined when μB=60 kHz.

(2) When a sub carrier spacing (μB) of cell B is greater than a sub carrier spacing (μA) of cell A, the PDSCH may be scheduled from the time point that corresponds to X symbols after the last symbol of the PDCCH received in cell B. Here, X may be different according to μB. X=4 symbols may be defined when μB=30 kHz, X=8 symbols may be defined when μB=60 kHz, and X=12 symbols may be defined when μB=120 kHz.

Hereinafter, a method of configuration a transmission configuration indication (TCI) state, which is a means for indicating or exchanging quasi co-location (QCL) information between a UE and a base station in a 5G communication system, will be described in detail.

The base station may configure and indicate a TCI state between two different RSs or channels through appropriate signaling, and thus may provide notification of the QCL relationship between the different reference signals (RSs) or channels. In addition, the base station may configure and indicate a TCI state for a PDCCH (or PDCCH DMRS) through appropriate signaling. The TCI state may be aimed to notify of a QCL relationship between a PDCCH (PDCCH DMRS) and different RSs or channels. That a predetermined reference RS antenna port A (RS #A) is QCLed with another target antenna port B (target RS #B) may be understood as that applying, by a UE, the entire or a part of large-scale channel parameters estimated from the antenna port A to channel measurement from the antenna port B is allowed. QCL may need to associate different parameters according to situations as following: 1) time tracking influenced by average delay and delay spread, 2) frequency tracking influenced by Doppler shift and Doppler spread, 3) radio resource management (RRM) influenced by an average gain, and 4) beam management (BM) influenced by a spatial parameter. Accordingly, NR may support four types of QCL relationships as shown in Table 15 below.

TABLE 15

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

A spatial RX parameter is a generic term for the entire or a part of various parameters, such as angle of arrival (AoA), power angular spectrum (PAS) of AoA, angle of departure (AoD), PAS of AoD, transmit/receive channel correlation, transmit/receive beamforming, and spatial channel correlation.

QCL relationship may be configured for a UE through RRC parameter TCI-State and QCL-Info, as shown in Table 16 below. Referring to Table 16, a base station may configure at least one TCI state for a UE to notify of a maximum of two QCL relationships (qcl-Type1 and qcl-Type2) for a RS (that is, a target RS) referring to an ID of the TCI state. QCL information (QCL-Info) included in each TCL state may include a serving cell index and a BWP index of a reference RS that is indicated by the corresponding QCL information, a type and ID of the reference RS, and a QCL type as shown in Table 15.

TABLE 16

```
TCI-State ::=                              SEQUENCE {
    tci-StateId                            TCI-StateId,
    (ID of the corresponding TCI state)
    qcl-Type1                              QCL-Info,
    (QCL information of the first reference RS of RS (target RS) referring
to the corresponding TCI state ID)
    qcl-Type2                              QCL-Info
                OPTIONAL,        -- Need R
    (QCL information of the second reference RS of the RS (target RS)
referring to the corresponding TCI state ID)
    ...
}
QCL-Info ::=                               SEQUENCE {
    cell                                   ServCellIndex
            OPTIONAL,  -- Need R
    (the serving cell index of the reference RS indicated by the corresponding
QCL information)
    bwp-Id                                 BWP-Id
                OPTIONAL, -- Cond CSI-RS-Indicated
    (BWP index of reference RS indicated by the corresponding QCL information)
    referenceSignal                        CHOICE {
        csi-rs                             NZP-CSI-RS-
ResourceId,
        ssb                                SSB-
Index
        (one of the CSI-RS ID or SSB ID indicated by the corresponding QCL
information)
    },
    qcl-Type                               ENUMERATED {typeA,
typeB, typeC, typeD},
    ...
}
```

Hereinafter, a paging method in a 5G communication system will be described in detail.

Figure 11:
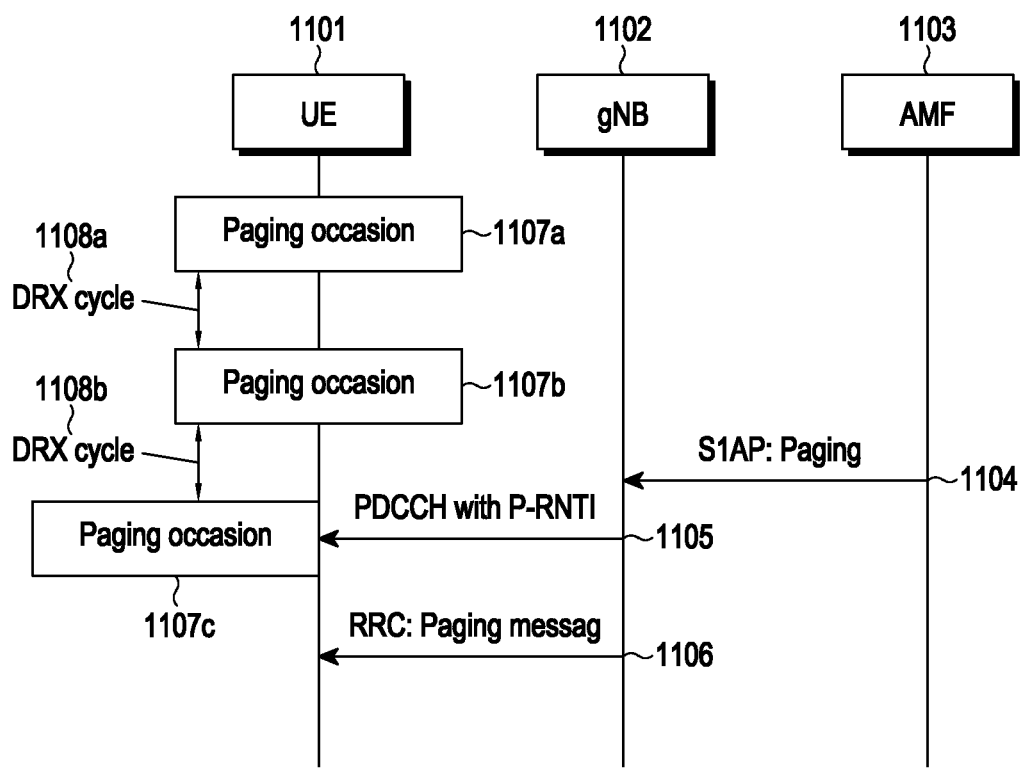
FIG. 11 illustrates a paging process in a wireless communication system according to various embodiments of the disclosure.

FIG. 11 illustrates a paging process in a wireless communication system according to various embodiments of the disclosure.

Specifically, FIG. 11 illustrates a paging procedure of a 5G communication system. The paging procedure may be used to notify of, when an incoming call to a UE in the IDLE or INACTIVE state occurs and to initiate network access to the UEs, or to notify the UEs in the CONNECTED state that system information has been changed. An access and mobility management function (AMF) may be configured to perform paging control and the paging message may be transmitted across multiple cells in the tracking area (TA). Referring to FIG. 11, paging is initiated from an AMF 1103 and is transmitted to a UE 1101 via a base station 1102. More specifically, the paging is initiated from the AMF 1103 and transmitted (indicated by reference numeral 1104) to the base station 1102 via S1 AP signaling 1104, and then is transmitted to the UE 1101 via RRC signaling 1106. Here, the UE 1101 may know whether the paging message exists by monitoring a PDCCH 1105 configured by P-RNTI on paging occasions 1107a, 1107b, and 1107c. The paging occasions 1107a, 1107b, and 1107c may be determined based on DRX cycles 1108a and 1108b configured in the UE by the base station. Upon receiving the PDCCH 1105 configured by the P-RNTI, the UE may receive a paging message 1106 through the PDSCH scheduled through the PDCCH 1105. The paging message 1106 may include UE ID information of a UE to be awakened by the base station.

The efficient paging procedure may be able to wake up only at a predetermined time interval in order to observe the paging information from the network while allowing the UE 1101 to rest without performing receiving operation for most of the time. To this end, NR defines paging occasion (PO) and paging frame (PF). The PO is defined as a time point or subframe in which a PDCCH configured by a P-RNTI exists for reception of a paging message. APF is defined as a radio frame including one or multiple POs. According to an embodiment of FIG. 11, the UE 1101 may observe one PO per discontinuous reception (DRX) cycle 1108a or 1108b.

Figure 12:
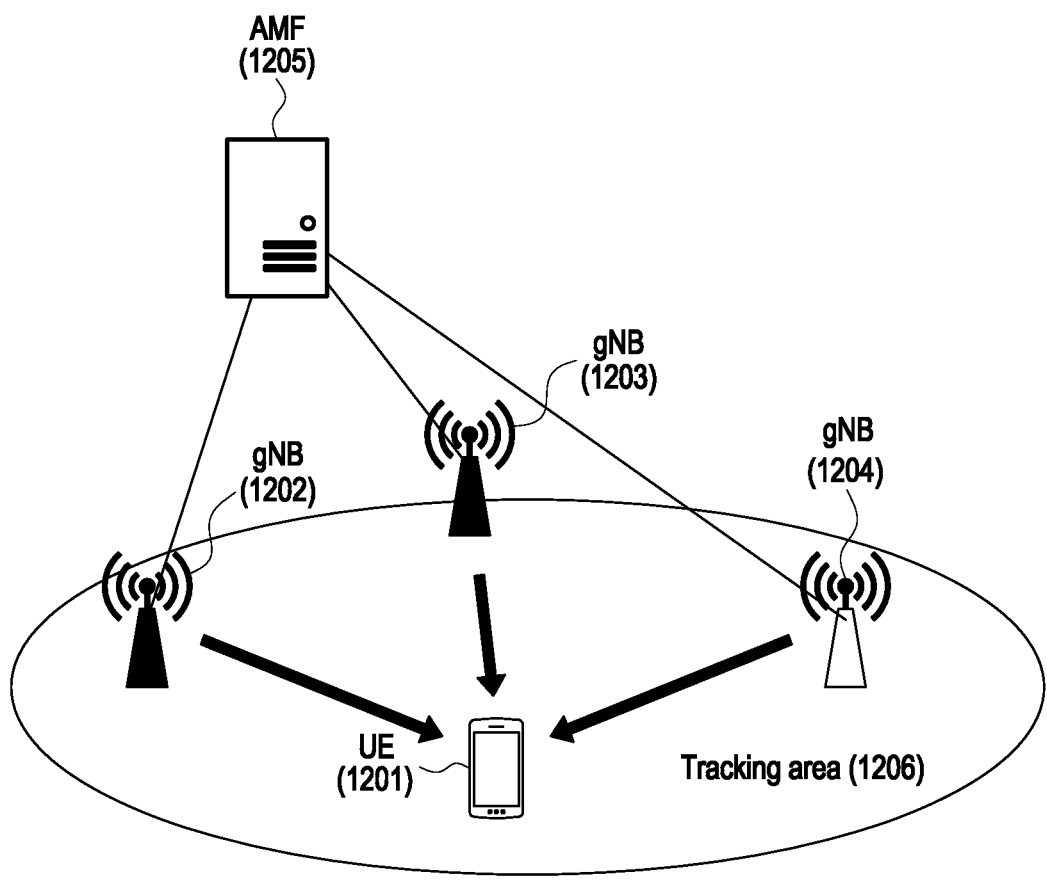
FIG. 12 illustrates a paging process in a wireless communication system according to various embodiments of the disclosure.

FIG. 12 illustrates a paging operation in a wireless communication system according to various embodiments of the disclosure.

Specifically, FIG. 12 shows an example of paging in a 5G communication system. Referring to FIG. 12, when a UE 1201 is in the RRC IDLE state, the NR network knows the location of the UE 1201 in units of tracking area (TA) 1206 instead of in units of cells. When accessing the NR network, the UE is allocated with a tracking area identity (TAI) list from an access and mobility management function (AMF) 1205. The UE 1201 may freely move within the cell in the TAI list without updating the AMF 1205. When an incoming call to the UE 1201 occurs, the AMF 1205 transmits the same paging message to all the cells 1202, 1203, and 1204 in the TA 1206 currently configured for the UE 1201, and each of the cells 1202, 1203, and 1204 transmits the paging message to the corresponding UE 1201. The UE 1201 may acquire the tracking area code (TAC) of the corresponding cell through system information (e.g., SIB1) when (re) selecting a predetermined cell, and may identify whether the corresponding cell matches a cell in its own TAI list from acquired TAC. If the TAC of the selected cell is not included in the TAI list, the UE transmits a tracking area update (TAU) message to the AMF 1205. Further, when transmitting TAU accept, which is a response to the TAU message, to the UE, the AMF 1205 may perform TAI list transmission together with the TAU accept, and thus the TAI list may be updated in the UE, matching the movement of the location of the UE.

Hereinafter, a UE operation of PDCCH monitoring for paging reception will be described in detail.

The UE may monitor one paging occasion (PO) per DRX cycle. One PO may be configured as a set of a plurality of PDCCH monitoring occasions, and a slot/resource in which DCI for paging can be transmitted may be configured as a plurality of time slots/resources (e.g., subframes or OFDM symbols). One paging frame (PF) corresponds to one radio frame and may include one or multiple POs or a starting point of a random PO.

In multi-beam operation, the UE may assume that the same paging message or the same short message is repeated in all transmission beams. Here, the selection of the beam(s) for the reception of the paging message or short message is up to UE implementation. The paging message is the same with respect to both radio access network (RAN)-initiated paging and core network (CN)-initiated paging.

The UE initiates RRC connection resume procedure upon receiving RAN-initiated paging. If the UE receives CN-initiated paging in RRC INACTIVE state, the UE moves to the RRC IDLE mode and informs a network attached storage (NAS).

A paging frame (PF) and a paging occasion (PO) for paging may be determined by the following equations.

A system frame number (SFN) corresponding to a paging frame may be determined by [Equation 4] below. In [Equation 4] below, A mod B may denote a modulo operation that outputs a remainder obtained by dividing A by B.

$$(SFN+PF\_offset) \bmod T = (T \operatorname{div} N)*(UE\_ID \bmod N) \quad \text{[Equation 4]}$$

The index (i_s) indicating the paging occasion PO may be determined by [Equation 5] below.

$$i\_s = \operatorname{floor}(UE\_ID/N) \bmod Ns \quad \text{[Equation 5]}$$

Respective parameters of [Equation 4] and [Equation 5] for determining the above-described paging frame and paging occasion may be defined as follows:

T: DRX cycle configured for the UE (DRX cycle may be configured via higher layer signaling (e.g., RRC signaling, system information block (SIB), and the like);

N: number of total paging frames in T;

Ns: number of paging occasions for one paging frame;

PF_offset: offset vale used for determining a time point of paging frame; and

UE_ID: UE ID for determining a paging frame and a paging occasion, and may be determined as in [Equation 6] below.

$$UE\_ID = 5G\text{-}S\text{-}TMSI \bmod 1024 \quad \text{[Equation 6]}$$

5G S-Temporary Mobile Subscription Identifier (5G-S-TMSI) is a temporary UE identifier provided by a core network to uniquely identify a UE within a tracking area (TA). 5G-S-TMSI may be provided, for example, to the UE via higher layer signaling. If the UE has not yet registered onto the network, the UE may assume that UE_ID is 0. Alternatively, the UE ID for paging may correspond to a parameter determined by the international mobile subscriber identity (IMSI). In the disclosure, the UE ID for paging is generalized and used as the UE_ID. Here, the UE_ID may include both a value that can be configured based on 5G-S-TMSI and a value that can be derived from an IMSI value.

PDCCH (or PDCCH scrambled by P-RNTI) monitoring occasions for paging may be determined by: search space configuration for paging (e.g., a search space indicated by higher layer signaling parameter pagingSearchSpace); configuration information (e.g., higher layer signaling parameter firstPDCCH-MonitoringOccasionOfPO) about the first PDCCH monitoring occasion of paging occasion; and the number of PDCCH monitoring occasions per SS/PBCH block (SSB) in paging occasion (e.g., higher layer signaling parameter nrofPDCCH-MonitoringOccasionPerSSB-InPO). The pagingSearchSpace, firstPDCCH-MonitoringOccasionOfPO, and nrofPDCCH-MonitoringOccasionPerSSB-InPO may be defined in Table 17 below.

TABLE 17 pagingSearchSpace
ID of the Search space for paging (see TS 38.213 [13], clause 10.1). If the field is absent, the UE does hot receive paging in this BWP (see TS 38.213 [13], clause 10).
firstPDCCH-MonitoringOccasionOfPO
Points out the first PDCCH monitoring occasion for paging of each PO of the PF, see TS 38.304 [20].
nrofPDCCHMonitoringOccasionPerSSB-InPO
The number of PDCCH monitoring occasions corresponding to an SSB far paging, see TS 38.304 [20], clause 7.1.

In case that the paging search space is configured as a search space in which the search space ID is 0, if the number (Ns) of paging occasions for one paging frame is equal to 1 (Ns=1), one paging occasion may exist in the paging frame, if Ns=2, two paging occasions may exist in the paging frame, the first paging occasion (i_s=0) may exist in the first half frame in the paging frame, and the second paging occasion (i_s=1) may exist in the second half frame in the paging frame. Here, a search space having a search space ID of 0 may correspond to a search space configured through a master information block (MIB).

If the paging search space is configured as a search space in which the search space ID is not 0, the UE may monitor the (i_s+1)-th paging occasion. One paging occasion may include a set of "S*X" consecutive PDCCH monitoring occasions, where "S" may correspond to the number of actually transmitted SS/PBCH blocks (SSB), and the corresponding information is a specific parameter (e.g., ssb-PositionsInBurst) value of a system information block (SIB) may be transmitted from the base station to the UE. In addition, "X" may correspond to the number of PDCCH monitoring occasions per SS/PBCH block within the paging occasion (e.g., higher layer signaling parameter nrofPDCCH-MonitoringOccasionPerSSB-InPO) configured in the UE from the base station, and if there is no corresponding configuration information, the UE may assume that X=1. [x*S+K]th (where x=0, 1, 2, . . . , X−1 and may be defined as K=1, 2, 3, . . . , S) PDCCH monitoring occasion in a paging occasion may correspond to the K-th transmission SS/PBCH block. PDCCH monitoring occasions that do not overlap with uplink (UL) symbols, starting with the first PDCCH monitoring occasion in the paging frame, may be sequentially numbered from 0. Here, if the firstPDCCH-MonitoringOccasionOfPO is configured via higher layer signaling, the start PDCCH monitoring occasion number of the (i_s+1)-th paging occasion may correspond to the (i_s+1)-th value in the firstPDCCH-MonitoringOccasionOfPO parameter. If the firstPDCCH-MonitoringOccasionOfPO is not configured via higher layer signaling, the start PDCCH monitoring occasion number of the (i_s+1)th paging occasion may be equal to i_s*S*X. If X>1, when the UE detects a PDCCH corresponding to the P-RNTI in a predetermined paging occasion, the UE does not need to monitor the remaining or subsequent PDCCH monitoring occasions in the corresponding paging occasion.

One paging occasion associated with a paging frame may be started within the paging frame or after the paging frame.

PDCCH monitoring occasions for a random paging occasion may span multiple radio frames. When a search space for paging is configured as a search space having a search space ID of a value other than 0, PDCCH monitoring occasions for one paging occasion may span multiple periods of the paging search space.

Hereinafter, referring to the TS 38.304 standard, discontinuous reception for paging is defined as shown in Table 18a and Table 18b below.

TABLE 18a

7 Paging
7.1 Discontinuous Reception for paging
The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]).
One Paging Frame (PF) is one Radio Frame and may contain one or multiple PO(s) or starting point of a PO.
In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.
The UE initiates RRC Connection Resume procedure upon receiving RAN initiated paging. If the UE receives a CN initiated paging in RRC_INACTIVE state, the UE moves to RRC_IDLE and informs NAS.
The PF and PO for paging are determined by the following formulae:
    SFN for the PF is determined by:
        (SFN + PF_offset) mod T = (T div N)*(UE_ID mod N)
    Index (i_s), indicating the index of the PO is determined by:
        i_s = floor (UE_ID/N) mod Ns
The PDCCH monitoring occasions for paging are determined according to pagingSearchSpace as specified in TS 38.213 [4] and firstPDCCH-MonitoringOccasionOfPO and nrofPDCCH-MonitoringOccasionPerSSB-InPO if configured as specified in TS 38.331 [3]. When SearchSpaceId = 0 is configured for pagingSearchSpace, the PDCCH monitoring occasions for paging are same as for RMSI as defined in clause 13 in TS 38.213 [4]. When SearchSpaceId = 0 is configured for pagingSearchSpace, Ns is either 1 or 2. For Ns = 1, there is only one PO which starts from the first PDCCH TABLE 18a-continued monitoring occasion for paging in the PF. For Ns = 2, PO is either in the
first half frame (i_s = 0) or the second half frame (i_s = 1) of the PF.
the UE monitors the (i_s + 1)$^{th}$ PO. A PO is a set of 'S*X' consecutive
PDCCH monitoring occasions where 'S' is the number of actual transmitted
SSBs determined according to ssb-PositionsInBurst in SIB1 and X is the
nrofPDCCH-MonitoringOccasionPerSSB-InPO if configured or is equal to
1 otherwise. The [x*S + K]$^{th}$ PDCCH monitoring occasion for paging in the
PO corresponds to the K$^{th}$ transmitted SSB, where x = 0, 1, . . . , X − 1,
K = 1, 2, . . . , S. The PDCCH monitoring occasions for paging which do not
overlap with UL symbols (determined according to tdd-UL-DL-
ConfigurationCommon) are sequentially numbered from zero starting from
the first PDCCH monitoring occasion for paging in the PF. When
firstPDCCH-MonitoringOccasionOfPO is present, the starting PDCCH
monitoring occasion number of (i_s + 1)$^{th}$ PO is the (i_s + 1)$^{th}$ value of the
firstPDCCH-MonitoringOccasionOfPO parameter; otherwise, it is equal to
i_s * S*X. If X > 1, when the UE detects a PDCCH transmission addressed
to P-RNTI within its PO, the UE is not required to monitor the subsequent
PDCCH monitoring occasions for this PO.
NOTE 1: A PO associated with a PF may start in the PF or after the PF.
NOTE 2: The PDCCH monitoring occasions for a PO can span multiple
radio frames. When SearchSpaceId other than 0 is configured
for paging-SearchSpace the PDCCH monitoring occasions
for a PO can span multiple periods of the paging search space.

TABLE 18b

The following parameters are used for the calculation of PF and i_s above:
T: DRX cycle of the UE (T is determined by the shortest of the UE
specific DRX value(s), if configured by RRC and/or upper layers,
and a default DRX value broadcast in system information. In
RRC_IDLE state, if UE specific DRX is not configured by upper
layers, the default value is applied).
N: number of total paging frames in T
Ns: number of paging occasions for a PF
PF_offset: offset used for PF determination
UE_ID: 5G-S-TMSI mod 1024
Parameters Ns, nAndPagingFrameOffset, nrofPDCCH-
MonitoringOccasionPerSSB-InPO, and the length of default DRX Cycle are
signaled in SIB1. The values of N and PF_offset are derived from the
parameter nAndPagingFrameOffset as defined in TS 38.331 [3]. The
parameter first-PDCCH-MonitoringOccasionOfPO is signalled in SIB1 for
paging in initial DL BWP. For paging in a DL BWP other than the initial DL
BWP, the parameter first-PDCCH-MonitoringOccasionOfPO is signaled in
the corresponding BWP configuration.
If the UE has no 5G-S-TMSI, for instance when the UE has not yet
registered onto the network, the UE shall use as default identity UE_ID = 0
in the PF and i_s formulas above.
5G-S-TMSI is a 48 bit long bit string as defined in TS 23.501 [10]. 5G-S-
TMSI shall in the formulae above be interpreted as a binary number where
the left most bit represents the most significant bit.

The base station may transmit a PDCCH for paging to the UE, and the corresponding PDCCH may include scheduling information regarding a PDSCH including a paging message. The paging message may include ID information of one or multiple UEs to be awakened by the base station. More specifically, the paging message may include information exemplified in Table 19 below.

TABLE 19

| Paging message |
|---|
| -- ASN1START |
| -- TAG-PAGING-START |
| Paging ::=              SEQUENCE { |
|     pagingRecordList           PagingRecordList           OPTIONAL, |
| -- Need N |
|     (paging record list) |
|     lateNonCriticalExtension   OCTET STRING               OPTIONAL, |
|     nonCriticalExtension       SEQUENCE{ }                OPTIONAL |
| } |
| PagingRecordList ::=    SEQUENCE (SIZE (1..maxNrofPageRec)) OF PagingRecord |
| PagingRecord ::=        SEQUENCE { |
|     ue-Identity               PagingUE-Identity, |
|     (ue identity(ID)) |
|     accessType                ENUMERATED {non3GPP}   OPTIONAL,   -- Need N |
|     (access type) |

TABLE 19-continued

Paging message

```
    ...
}
PagingUE-Identity ::= CHOICE {
    ng-5G-S-TMSI          NG-5G-S-TMSI,
    fullI-RNTI            I-RNTI-Value,
    ...
}
```

After reception the PDCCH for paging from the base station, the UE may receive a PDSCH scheduled by the corresponding PDCCH. UEs matching the UE_ID indicated from the paging message transmitted through the received PDSCH may wake up and perform subsequent operation procedures (e.g., random access, RRC connection, etc.).

Hereinafter, information of the DCI format scrambled by P-RNTI in the 5G communication system will be described in detail. The DCI format scrambled by P-RNTI may include, for example, the following fields:

Short messages indicator—2 bits;

Short Message—8 bits according to Clause 6.5 of [9, TS38.331]. If only scheduling information for paging is transferred, this field is reserved;

Frequency domain resource allocation information— $\lceil \log_2(N_{RB}^{DLBWP}(N_{RB}^{DLBWP}+1)/2) \rceil$ bit, and if only a short message is transferred, this field is reserved. NDL, BWPRB is defined as the number of RBs in the downlink bandwidth part;

Time domain resource allocation information—4 bits, and if only a short message is transferred, this field is reserved;

VRB-to-PRB mapping—1 bit according to Table 7.3.1.2.2-5. If only short messages are transferred, this field is reserved;

Modulation and coding scheme—5 bits, and if only a short message is transferred, this field is reserved;

TB scaling—2 bits as defined in Clause 5.1.3.2 of [6, TS38.214]. If only short messages are transferred, this field is reserved; and/or Reserved bits—8 bits for operation in a cell with shared spectrum channel access; 6 bits otherwise.

TABLE 20

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 20 shows a short message indicator in the DCI format scrambled by P-RNTI.

Referring to [Table 20], the short message indicator is reserved when the bit field is 00, indicates that only scheduling information for paging exists in the DCI when the bit field is 01, indicates that only short message exists in the DCI when the bit field is 10, and indicates that both scheduling information for paging and short message exist in the DCI when the bit field is 11.

A method for configuring a TCI state for a PDCCH (or PDCCH DMRS) in a 5G communication system is the same as that described in Table 15 and Table 16 above.

Figure 13:
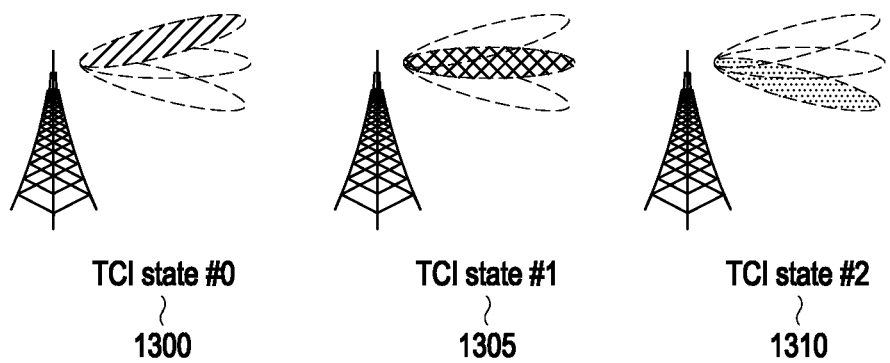
FIG. 13 illustrates base station beam allocation according to TCI state configuration in a wireless communication system according to various embodiments of the disclosure.

FIG. 13 illustrates base station beam allocation according to TCI state configuration in a wireless communication system according to various embodiments of the disclosure.

Specifically, FIG. 13 shows an example of base station beam allocation according to TCI state configuration. Referring to FIG. 13, a base station may transfer pieces of information about N different beams to a UE through N different TCI states. For example, as illustrated in FIG. 13, if N is 3, the base station may allow a qcl-Type 2 parameter included in each of three TCI states 1300, 1305, and 1310 to be associated with a CSI-RS or SSB corresponding to different beams and to be configured to be of QCL type D, so as to notify that antenna ports referring to the different TCI states 1300, 1305, and 1310 are associated with different spatial Rx parameters, that is, different beams. Specifically, a combination of TCI states applicable to a PDCCH DMRS antenna port is as shown in Table 21 below. In Table 21, a combination in the fourth row is assumed by the UE before RRC configuration, and is unable to be configured after RRC.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 14:
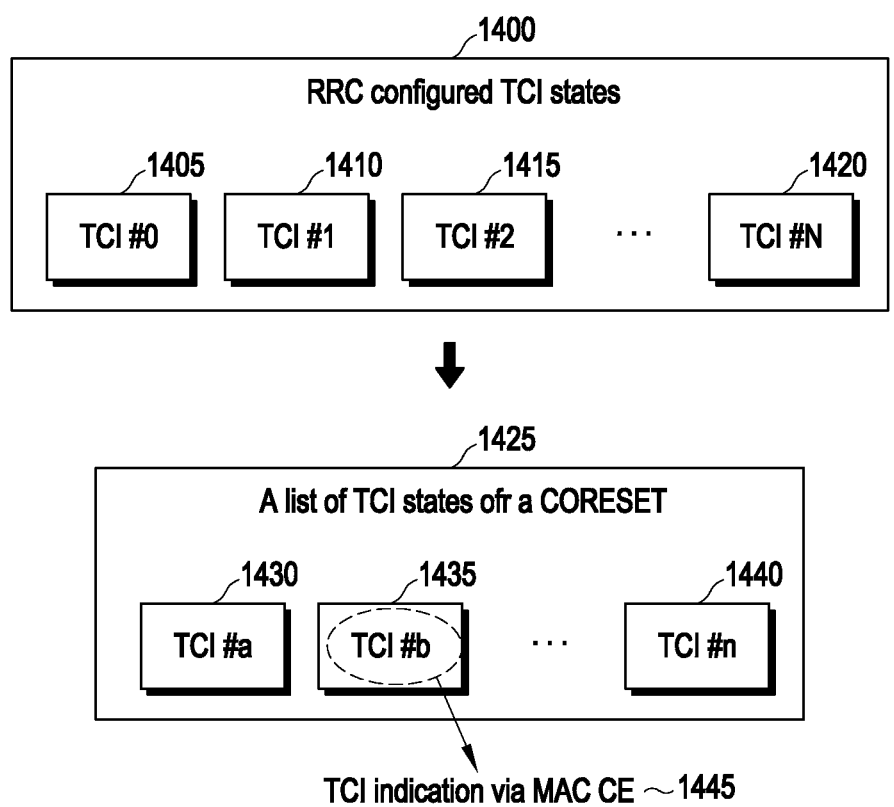
FIG. 14 illustrates a process of hierarchical signaling in a wireless communication system according to various embodiments of the disclosure.

FIG. 14 illustrates a process of hierarchical signaling in a wireless communication system according to various embodiments of the disclosure.

An embodiment of the disclosure supports a hierarchical signaling method as shown in FIG. 14 for dynamic allocation of PDCCH beams. Referring to FIG. 14, a base station may configure N TCI states 1405, 1410, 1415, . . . , and 1420 for a UE via RRC signaling 1400, and may configure some of the TCI states as TCI states for a CORESET (indicated by reference numeral 1425). Thereafter, the base station may indicate one of the TCI states 1430, 1435, . . . , and 1440 for the CORESET to the UE via MAC CE signaling (indicated by reference numeral 1445). Thereafter, the UE may receive DCI through a PDCCH based on beam information included in a TCI state indicated by the MAC CE signaling.

Figure 15:
FIG. 15 illustrates an example of a signaling structure in a wireless communication system according to various embodiments of the disclosure.

FIG. 15 illustrates an example of a signaling structure in a wireless communication system according to various embodiments of the disclosure.

Specifically, FIG. 15 illustrates a TCI indication MAC CE signaling structure for a PDCCH DMRS. Referring to FIG. 15, the TCI indication MAC CE signaling for the PDCCH DMRS is configured by 2 bytes (16 bits), and includes a reserved bit 1510 formed of 1 bit, a serving cell ID 1515 formed of 5 bits, a BWP ID 1520 formed of two bits, a CORESET ID 1525 formed of 2 bits, and a TCI state ID 1530 formed of 6 bits.

A base station may configure, for a UE, one or multiple TCI states with respect to a particular control resource set (CORESET), and may activate one of the configured TCI states through an MAC CE activation command. For example, {TCI state #0, TCI state #1, TCI state #2} as TCI states are configured for control resource set #1, and the base station may transmit a command of activating to assume TCI state #0 as a TCI state relating to control resource set #1 to the UE through the TCI indication MAC CE. Based on the activation command relating to a TCI state, received through the TCI indication MAC CE, the UE may correctly receive a DMRS in the corresponding control resource set, based on QCL information in the activated TCI state.

If the UE has failed to receive TCI state configuration indicating QCL information about the DMRS antenna port for PDCCH reception of a control resource set configured in the MIB (or the control resource set or control resource set #0 having the control resource set ID (or index) of 0), the UE may assume that the following physical layer channels are QCLed in terms of average gain, QCL-TypeA, and QCL-TypeD characteristics:

- DMRS (or DMRS antenna port) associated with the PDCCH received though the control resource set configured in the MIB (or the control resource set or control resource set #0 having the control resource set ID (or index) of 0);
- DMRS antenna port associated with reception of a PDSCH (or PDSCH scheduled by the PDCCH transmitted through control resource set #0) corresponding thereto; and/or
- SS/PBCH block (or SS/PBCH block associated with control resource set #0, or SS/PBCH block for transmission of MIB for configuring the corresponding control resource set #0) corresponding thereto.

A part of the TS 38.213 standard related to the above is shown in Table 22 below.

TABLE 22

The UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, QCL-TypeA, and QCL-TypeD properties, when applicable [6, TS 38.214], if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB.

If the UE is configured with a search space having a search space ID of 0 with respect to a common search space set for monitoring SI-RNTI/P-RNTI (or in case that a common search space set for monitoring SI-RNTI/P-RNTI is a search space set configured in the MIB or is search space #0), the UE may monitor the PDCCH at a monitoring occasion associated with the SS/PBCH block A, and here, the SS/PBCH block A may be determined as follows:

The UE may receive a command for activating a specific TCI state with respect to control region #0 through the TCI indication MAC CE, and here, the corresponding TCI state may include CSI-RS associated with an SS/PBCH. An SS/PBCH, which is associated with the CSI-RS of the TCI state activated through the TCI indication MAC CE most recently received by the UE, may correspond to SS/PBCH block A; and When performing random access, the UE may transmit a preamble (or physical random access channel (PRACH)) associated with a specific SS/PBCH to the base station. An SS/PBCH, which is identified through the random access procedure most recently performed by the UE, may correspond to the SS/PBCH block A.

A part of the TS 38.213 standard related to the above is shown in Table 23 below.

TABLE 23

If a UE is provided a zero value for searchSPACEID in PDCCH-ConfigCommon for a Type0/0A/2-PDCCH CSS set, the UE determines monitoring occasions or PDCCH candidates of the Type0/0A/2-PDCCH CSS set as described in Clause 13, and the UE is provided a C-RNTI, the UE monitors PDCCH candidates only at monitoring occasions associated with a SS/PBCH block, where the SS/PBCH block is determined by the most recent of
- a MAC CE activation command indicating a TCI state of the active BWP that includes a CORESET with index 0, as described in [6, TS 38.214], where the TCI-state includes a CSI-RS which is quasi-co-located with the SS/PBCH block, or
- a random access procedure that is not initiated by a PDCCH order that triggers a contention-free random access procedure With respect to a control resource set (control resource set #X) configured to have an index of a value rather than zero:

if a TCI state relating to control resource set #X is failed to be configured for the UE, or if one or more TCI states are configured for the UE, but the UE has failed to receive a TCI indication MAC CE activation command of activating one of the TCI states, the UE may assume that a DMRS transmitted in control resource set #X is QCLed with an SS/PBCH block identified in an initial access process; and/or if one or more TCI states are configured for the UE as a part of the handover procedure (or as a part of reconfiguration with synch procedure), but the UE has failed to receive a TCI indication MAC CE activation command of activating one of the TCI states, the UE may assume that a DMRS transmitted in control resource set #X is QCLed with a CSI-RS resource or an SS/PBCH identified during the random access procedure initiated by the handover procedure (or reconfiguration with synch procedure).

A part of the TS 38.213 standard related to the above is shown in Table 24 below.

TABLE 24

For a CORESET other than a CORESET with index 0,
if a UE has not been provided a configuration of TCI state(s) by tci-StatesPDCCH-ToAddList and tci-StatesPDCCH-ToReleaseList for the CORESET, or has been provided initial configuration of more than one TCI states TABLE 24-continued for the CORESET by tci-StatesPDCCH-ToAddList and tci-StatesPDCCH-ToReleaseList but has not received a MAC
CE activation command for one of the TCI states as described in [11, TS 38.321], the UE assumes that the DM-RS antenna
port associated with PDCCH receptions is quasi co-located with the SS/PBCH block the UE identified during the initial
access procedure:
if a UE has been provided a configuration of more than one TCI states by tci-StatesPDCCH-ToAddList and
tci-StatesPDCCH-ToReleaseList for the CORESET as part of Reconfiguration with sync procedure as described in [12,
TS 38.331] but has not received a MAC CE activation command for one of the TCI states as described in [11, TS 38.321],
the UE assumes that the DM-RS antenna port associated with PDCCH receptions is quasi co-located with the SS/PBCH
block or the CSI-RS resource the UE identified during the random access procedure initiated by the Reconfiguration with
sync procedure as described in [12, TS 38.331].

With respect to a control resource set having an index of 0 (control resource set #0), the UE may assume that a DMRS antenna port of the PDCCH received through the control resource set #0 is QCLed with the following physical resource:

A downlink reference signal included in the TCI state activated by the TCI indication MAC CE activation command; or If the UE has failed to receive the TCI indication MAC CE activation command for the TCI state, an SS/PBCH block identified by the UE through the most recent random access procedure (which is a random access not initiated by a PDCCH order that triggers contention free-based random access).

A part of the above-mentioned related TS 38.213 standard is shown in [Table 25] below.

information about the location (S) of a start symbol for which a PDSCH or a PUSCH is scheduled in a slot and the length (L) of the scheduled symbol(s), a PDSCH or PUSCH mapping type, and the like. For example, pieces of information shown in the following Table 7 to Table 9 above may be notified from the base station to the UE by using a method such as at least one of Table 26 to Table 34 exemplified below.

According to an embodiment of the disclosure, the base station may notify the UE of one of the entries in the table for the time domain resource allocation information via L1 signaling (e.g., DCI) or higher layer signaling (for example, RRC signaling). For example, in a case of providing a notification through DCI, this may be indicated by a "time domain resource allocation" field in the DCI. The UE may obtain the time domain resource allocation information for

TABLE 25 for a CORESET with index 0, the UE assumes that a DM-RS antenna port for PDCCH receptions in the CORESET is
quasi co-located with
the one or more DL RS configured by a TCI state, where the TCI state is indicated by a MAC CE activation
command for the CORESET. if any, or
a SS/PBCH block the UE identified during a most recent random access procedure not initiated by a PDCCH
order that triggers a contention-free random access procedure, if no MAC CF activation command indicating a
TCI state for the CORESET is received after the most recent random access procedure.

Hereinafter, a method for time domain resource allocation to a data channel in a next-generation mobile communication system (5G or NR system) according to various embodiments of the disclosure will be described with reference to the drawings.

Figure 16:
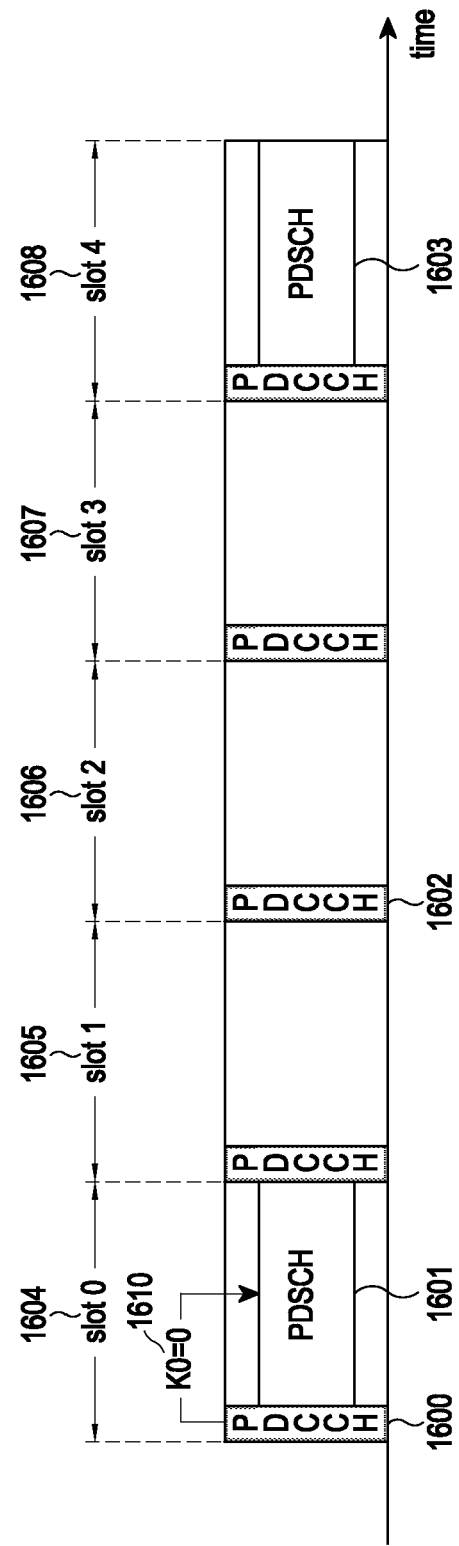
FIG. 16 illustrates an example of a method for time domain resource allocation to a data channel in a wireless communication system according to various embodiments of the disclosure.

FIG. 16 illustrates an example of a method for time domain resource allocation to a data channel in a wireless communication system according to an embodiment of the disclosure.

A base station may configure, for a UE, a table for time domain resource allocation (TDRA) information for a PDSCH, which is a downlink data channel, and/or a PUSCH, which is an uplink data channel via higher layer signaling (e.g., SIB or RRC signaling) or L1 signaling (e.g., DCI). With regard to the PDSCH, a table including up to 16 entries (maxNrofDL-Allocations=16) may be configured. With regard to the PUSCH, a table including up to 16 entries (maxNrofUL-Allocations=16) may be configured. The time domain resource allocation information may include, for example, a PDCCH-to-PDSCH slot timing (corresponding to a time interval in units of slots between a time point at which a PDCCH is received and a time point at which a PDSCH scheduled by the received PDCCH is transmitted, and represented by slot offset K0), a PDCCH-to-PUSCH slot timing (K2) (corresponding to a time interval in units of slots between a time point at which a PDCCH is received and a time point at which a PUSCH scheduled by the received PDCCH is transmitted, and represented by slot offset K2), the PDSCH or the PUSCH based on the DCI or RRC signaling received from the base station. Hereinafter, an example of transmitting time domain resource allocation information through DCI will be described for convenience.

If an entry having the slot offset K0 and/or K2 value of 0 is indicated, this may denote that the PDCCH and the data channel are scheduled in the same slot. This may be referred to as "self-slot scheduling."

If an entry, having the slot offset K0 and/or K2 value greater than 0, is indicated, this may denote that the PDCCH and the data channel are scheduled in different slots. Hereinafter, this will be referred to as "cross-slot scheduling."

Referring to FIG. 16, an example in which a PDSCH 1601 scheduled by a PDCCH 1600 is scheduled in the same slot (slot 0 1604) as that of the PDCCH 1600 is shown. The example may correspond to a case in which K0 corresponding to the PDCCH-to-PDSCH scheduling offset value is indicated by K0=0 (indicated by reference numeral 1610), and thus may correspond to self-slot scheduling.

As another example, FIG. 16 shows an example in which a PDSCH 1603 scheduled by a PDCCH 1602 is scheduled after a slot in which the PDCCH 1602 is transmitted. In this example, the PDCCH 1602 is transmitted in slot 2 1606 among slots 1604 to 1608, and the PDSCH 1603 scheduled by the PDCCH 1602 is transmitted in slot 4 1608. Here, the example may correspond to a case in which K0 corresponding to the PDCCH-to-PDSCH scheduling offset value is indicated by K0=2 (indicated by reference numeral 1611), and thus may correspond to cross-slot scheduling.

In a wireless communication system to which the disclosure is applied, cross-slot scheduling may be utilized for the purpose of reducing power consumption of the UE. When cross-slot scheduling is supported, the UE may operate in a sleep mode between a time point at which the PDCCH is received and a time point at which data channel transmission/reception occurs, thereby reducing power consumption of the UE. In addition, when cross-slot scheduling is supported for the UE, the UE may take a longer processing time for the PDCCH compared to the self-slot scheduling, and accordingly may increase the operation speed to reduce power consumption. In addition, the UE may finally obtain time domain scheduling information such as time domain resource allocation (TDRA) information regarding the PDSCH when decoding is completed after reception of the PDCCH. Therefore, since the UE may not know whether the PDSCH is scheduled or not during a time duration for which the PDCCH is received and decoded, the UE needs to perform buffering on OFDM symbols in which the PDSCH can be scheduled, and this can greatly increase the power consumption of the UE. If the UE is able to know the time domain resource allocation information regarding the PDSCH before decoding the PDCCH, that is, the UE is able to know in advance that cross-slot scheduling is to be performed, and the UE can minimize unnecessary buffering for the PDSCH to thereby reduce power consumption.

In order to reduce power consumption of the UE, the base station may indicate the minimum value of the slot offset K0 and/or K2 to be used in scheduling for the data channel, to the UE, via higher layer signaling or L1 signaling. The UE may expect that the scheduling is performed with a slot offset value equal to or greater than the minimum value received from the base station. For convenience of description, the minimum values for K0 and/or K2 indicated by the base station to the UE are called "minimum scheduling offset."

The minimum scheduling offset value may be indicated from the base station to the UE through DCI scheduling the PDSCH or PUSCH (e.g., DCI format 1_1 or DCI format 0_1) or non-scheduling DCI (e.g., a new DCI format defined for the purpose of power reduction, or a new RNTI, DCI format 2_0, or DCI format 2_1 defined for the purpose of power reduction). The UE may separately receive, from the base station, the minimum scheduling offset value (K0min) for K0 and the minimum scheduling offset value (K2 min) for K2, in which K0min and K2 min have different values, or may receive one minimum scheduling offset value (Kmin) for K0 and K2.

In some embodiments of the disclosure, the UE may separately receive, from the base station, different values of the minimum scheduling offset value (K0min) for K0 and the minimum scheduling offset value (K2 min) for K2. That is, the UE may be configured with sets of candidate values for K0min and K2 min, respectively. The UE may be indicated with K0min in a DL DCI format (e.g., DCI format 1_1), and may be indicated with K2 min in a UL DCI format (e.g., DCI format 0_1). The UE may assume that the received K0min and K2 min have different application delay time #0 and application delay time #2, respectively. Here, the UE may relax the PDCCH processing time only within the application delay time #0, and may not relax the PDCCH processing time within the application delay time #2. Alternatively, the UE may assume one application delay time for the application delay times for the received K0min and K2 min, and here, the application delay time may be determined as a function of K0min.

In some embodiments of the disclosure, the UE may receive one minimum scheduling offset value (Kmin) for K0 and K2 from the base station. The UE may be configured with a set of candidate values for Kmin to be commonly applied to K0 and K2. The UE may be indicated with Kmin in a DL DCI format (e.g., DCI format 1_1) and/or a UL DCI format (e.g., DCI format 0_1).

In some embodiments of the disclosure, the UE may receive, from the base station, a configuration whether to receive the minimum scheduling offset values for K0 and K2 separately or as one value via higher layer signaling.

Hereinafter, in the disclosure, it is assumed that one minimum scheduling offset value Kmin is indicated. However, even when K0min and K2 min are separately indicated, the details of the disclosure may be equally applied.

According to an embodiment of the disclosure, the UE may expect, based on the minimum scheduling offset received from the base station, that scheduling is performed only with entries, in which the slot offset K0 and/or K2 value (hereinafter, K0/K2) has a value equal to or greater than the received minimum scheduling offset, from among preconfigured values in the time domain resource allocation table. For example, it is assumed that the base station configures, for the UE, a time domain resource allocation table for a PDSCH below.

TABLE 26

| Entry index | PDSCH mapping type | K0 | Starting symbol | Length |
|---|---|---|---|---|
| 1 | Type A | 0 | 2 | 8 |
| 2 | Type A | 0 | 2 | 10 |
| 3 | Type A | 1 | 2 | 9 |
| 4 | Type A | 1 | 2 | 7 |
| 5 | Type A | 2 | 2 | 5 |
| 6 | Type B | 2 | 9 | 4 |
| 7 | Type B | 3 | 4 | 4 |
| 8 | Type B | 4 | 5 | 7 |
| 9 | Type B | 5 | 5 | 2 |
| 10 | Type B | 7 | 9 | 2 |
| 11 | Type B | 8 | 12 | 1 |
| 12 | Type A | 9 | 1 | 10 |
| 13 | Type A | 10 | 1 | 6 |
| 14 | Type A | 21 | 2 | 4 |
| 15 | Type B | 30 | 4 | 7 |
| 16 | Type B | 32 | 8 | 4 |

If the minimum scheduling offset value of 3 is indicated from the base station to the UE, the UE may expect that the PDSCH will not be scheduled with entries having a slot offset K0 value less than 3, that is, entry indexes 1, 2, 3, 4, 5, and 6, and may expect the PDSCH will be scheduled with the remaining entries, that is, entry index 7, 8, . . . , and 16. For convenience of description, the following terms are defined:

Valid entry: is an entry, in which the K0/K2 value is equal to or greater than the minimum scheduling offset received from the base station, from among the preconfigured values in the time domain resource allocation table, and can be used for scheduling; and Invalid entry: is an entry, in which the K0/K2 value is smaller than the received minimum scheduling offset, from among the preconfigured values in the time domain resource allocation table, and cannot be used for scheduling.

According to an embodiment of the disclosure, the UE may be configured with a candidate value for N minimum scheduling offset values, for example, Kmin(0), Kmin(1), . . . , and Kmin(N−1) via higher layer signaling from the base station, and may be configured with one of the N minimum scheduling offset values configured via L1 signaling. As an example, two minimum scheduling offset values may be configured to be K-min(0)=2 and Kmin(1)=4, and the UE may be indicated with one of K-min(0) and Kmin(1) through a 1-bit indicator of L1 signaling (e.g., DCI, DCI format 0_1/1_1, etc.). For example, if the 1-bit indicator is "0," K-min(0) may be indicated, and if the 1-bit indicator is "1," Kmin(1) may be indicated. As another example, one of candidate values for multiple minimum scheduling offset values may be indicated to the UE through an n-bit indicator. As still another example, one minimum scheduling offset value Kmin(1)=4 may be configured, and here, Kmin(0)=0 or Kmin(0) may be considered as an operation that does not consider any restriction in the time domain resource allocation table (that is, it can be regarded as an operation in which all entries in the preconfigured time domain resource allocation table are assumed to be valid entries). In this case, the base station may indicate, to the UE, one of K-min(0) and Kmin(1) through 1 bit indicator of L1 signaling (e.g., DCI, DCI format 0_1/1_1, etc.).

According to an embodiment of the disclosure, the UE may receive, from the base station, the minimum scheduling offset value through DCI transmitted at a specific time point, and may apply the received minimum scheduling offset value from the time after a specific time point has elapsed when the minimum scheduling offset value is received. For example, the UE may be indicated with a scheduling offset value by DCI received through a PDCCH transmitted at a time T0 from the base station, and may apply the information of a newly acquired minimum scheduling offset value from a time point (Tapp) after a predetermined time (Tdelay) has elapsed. Here, Tapp may be expressed as a function for T0 and Tdelay. If the UE receives DCI indicating the minimum scheduling offset value at time T0 from the base station, the UE may not expect to apply the indicated minimum scheduling offset value before Tapp. Here, the applying of the minimum scheduling offset value may be understood as that the UE determines the entries of the time domain resource allocation table configured via higher layer signaling as valid or invalid entries based on the received minimum scheduling offset value and applies the same.

le;.5qHereinafter, the default time domain resource allocation table will be described. The UE may acquire scheduling information based on the default time domain resource allocation table predefined for a data channel scheduled by a DCI format scrambled by a specific RNTI or based on a case that the UE has not configured with the time domain resource allocation table via higher layer signaling. Here, one or multiple predefined default time domain resource allocation tables may exist. For example, in 5G NR, default time domain resource allocation table A, default time domain resource allocation table B, and default time domain resource allocation table C may be defined, and the default time domain resource allocation table A may be defined as two tables according to normal cyclic prefix (CP) or extended CP. More specifically, default domain resource allocation tables A, B, and C as shown in Table 27 to Table 30 below may be defined.

TABLE 27

Default PDSCH time domain resource allocation A for normal CP

| Row index | dmrs- TypeA- Position | PDSCH mapping type | $K_0$ | S | L |
|---|---|---|---|---|---|
| 1 | 2 | Type A | 0 | 2 | 12 |
|   | 3 | Type A | 0 | 3 | 11 |

TABLE 27-continued

Default PDSCH time domain resource allocation A for normal CP

| Row index | dmrs- TypeA- Position | PDSCH mapping type | $K_0$ | S | L |
|---|---|---|---|---|---|
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 28

Default PDSCH time domain resource allocation A for extended CP

| Row index | dmrs- TypeA- Position | PDSCH mapping type | $K_0$ | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

TABLE 29

Default PDSCH time domain resource allocatin B

| Row index | dmrs- TypeA- Position | PDSCH mapping type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |

TABLE 29-continued

Default PDSCH time domain resource allocatin B

| Row index | dmrs- TypeA- Position | PDSCH mapping type | $K_0$ | S | L |
|---|---|---|---|---|---|
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 | 2, 3 | Type B | 1 | 2 | 4 |
| 16 | Reserved |  |  |  |  |

(Note 1):
If the PDSCH was scheduled with SI- RNTI in PDCCH Type0 common search space, the UE may assume that this PDSCH resource allocation is not applied

TABLE 30

Default PDSCH time domain resource allocatin C

| Row index | dmrs- TypeA- Position | PDSCH mapping type | K0 | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |  | Reserved |  |  |  |
| 7 |  | Reserved |  |  |  |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 (Note 1) | 2, 3 | Type A | 0 | 0 | 6 |
| 16 (Note 1) | 2,3 | Type A | 0 | 2 | 6 |

(Note 1):
The UE may assume that this PDSCH resource allocation is not used, if the PDSCH was scheduled with SI- RNTI in PDCCH Type0 common search space Based on the above-described default time domain resource allocation table, the UE may obtain scheduling information regarding a data channel. The UE may consider/determine one default time domain resource allocation table among multiple default time domain resource allocation tables, based on information such as an RNTI, a search space type, a multiplexing pattern between SS/PBCH and CORESET, and may acquire scheduling information regarding the data channel. For example, with respect to the PDSCH scheduled by the DCI format scrambled by the P-RNTI for scheduling the paging message, the UE may selectively use different default time domain resource allocation tables according to a multiplexing pattern between an SS/PBCH block (SSB) and a CORESET (e.g., CORESET #0 or CORESET having a CORESET index of 0). Here, the multiplexing pattern between SS/PBCH and CORESET may include multiple patterns according to, for example, time domain multiplexing (TDM) and frequency domain multiplexing (FDM) methods. For example, 5G NR defines TDM multiplexing pattern 1 between SS/PBCH and CORESET, and defines FDM multiplexing pattern 2 and 3 between SS/PBCH and CORESET. In a case of multiplexing pattern 1 between SS/PBCH and CORESET, the UE may consider the default time domain resource allocation table A with respect to the PDSCH scheduled by the DCI format scrambled by P-RNTI; in a case of multiplexing pattern 2 between SS/PBCH and CORESET, the UE may consider the default time domain resource allocation table B with respect to the PDSCH scheduled by the DCI format scrambled by P-RNTI, and in a case of multiplexing pattern 3 between SS/PBCH and CORESET, the UE may consider the default time domain resource allocation table C with respect to the PDSCH scheduled by the DCI format scrambled by P-RNTI. As an example, the default time domain resource allocation table may be determined, based on Table 31 below, according to an RNTI, a search space type, a multiplexing pattern between SS/PBCH and CORESET, and the like.

TABLE 31

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationsList | PDSCH time domain resource allocation to apply |
|---|---|---|---|---|---|
| SI- RNTI | Type0 common | 1 | — | — | Default A for normal CP |
|  |  | 2 | — | — | Default B |
|  |  | 3 | — | — | Default C |
| SI- RNTI | Type0A common | 1 | No | — | Default A |
|  |  | 2 | No | — | Default B |
|  |  | 3 | No | — | Default C |
|  |  | 1, 2, 3 | Yes | — | pdsch-TimeDomainAllocationList provided in pdsch-ConfigCommon |
| RA- RNTI, MsgB- RNTI, TC- RNTI | Type1 common | 1, 2, 3 | No | — | Default A |
|  |  | 1, 2, 3 | Yes | — | pdsch-TimeDomainAllocationList provided in pdsch-ConfigCommon |

TABLE 31-continued

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationsList | PDSCH time domain resource allocation to apply |
|---|---|---|---|---|---|
| P- RNTI | Type2 common | 1 | No | — | Default A |
| | | 2 | No | — | Default B |
| | | 3 | No | — | Default C |
| | | 1, 2, 3 | Yes | — | pdsch-TimeDomainAllocationList provided in pdsch-ConfigCommon |

According to the above description, the UE in the IDLE/INACTIVE state may acquire scheduling information regarding the PDSCH through which a paging message is transmitted through the DCI format scrambled by the P-RNTI, and here, the UE may assume the default time domain resource allocation table. In this case, since the default time domain resource allocation table supports only self-slot scheduling (K0 value of all entries is 0) or the minimum value of the slot offset value in the default time domain resource allocation table is 0, the UE may expect self-slot scheduling for a data channel scheduled by the corresponding DCI. Accordingly, the UE needs to perform buffering in advance on symbols for which a data channel can be scheduled in a slot in which the PDCCH is received, and this may increase the amount of power consumption of the UE.

In this disclosure, in order to reduce power consumption of the UE in IDLE/INACTIVE mode, a method for supporting cross-slot scheduling for data transmission/reception (e.g., transmission/reception of a paging message) in the IDLE/INACTIVE mode is provided. Through the disclosure, the UE can more effectively reduce power consumption in the IDLE/INACTIVE mode.

Hereinafter, terms such as paging PDCCH, PDCCH for paging, PDCCH corresponding to paging, PDCCH scrambled by P-RNTI, and PDCCH configured with P-RNTI may be used with the same meaning. In addition, in the above-described paging-related PDCCH, PDCCH may be used in the same meaning as DCI.

Hereinafter, terms such as a paging PDSCH, a PDSCH for paging, a PDSCH through which a paging message is transmitted, a PDSCH scrambled by a P-RNTI, a PDSCH configured with a P-RNTI, etc. may be used with the same meaning.

Hereinafter, the IDLE or INACTIVE state is collectively referred to as an idle mode (IDLE mode), and the CONNECTED state is referred to as a CONNECTED mode.

Hereinafter, higher layer signaling may be signaling corresponding to at least one or a combination of one or more of the following signaling:
  Master Information Block (MIB);
  System Information Block (SIB) or SIB X (X=1, 2, . . . );
  Radio resource control (RRC);
  Medium access control (MAC) control element (CE);
  UE capability reporting; and/or
  UE assistance information or message.

In addition, L1 signaling may be signaling corresponding to at least one or a combination of one or more of the following physical layer channels or signaling methods:
  Physical downlink control channel (PDCCH);
  Downlink control information (DCI);
  UE-specific DCI;
  Group common DCI;
  Common DCI;
  Scheduling DCI (for example, DCI used for scheduling downlink or uplink data);
  Non-scheduling DCI (for example, DCI not for the purpose of scheduling downlink or uplink data);
  Physical uplink control channel (PUCCH); and/or
  Uplink control information (UCI).

Hereinafter, the definition of each mathematical operator is as follows:
  floor(X): A function that outputs the largest number among integers less than X;
  ceil(X): A function that outputs the smallest number among integers greater than X;
  A mod B: A function that outputs the remainder of dividing A by B (modulo operator);
  max(X,Y): A function that outputs the larger of X and Y; and/or
  min(X,Y): A function that outputs the smaller of X and Y.

Hereinafter, cross-slot scheduling methods according to first to fourth embodiments of the disclosure will be described. In the following first to fourth embodiments, cross-slot scheduling methods are exemplified in connection with paging, but the cross-slot scheduling methods according to the disclosure are not limited thereto. Alternatively, the same/similar method may be applied to SIB reception, RMSI reception, and RRC information reception through the PDSCH, or PDSCH reception in the connected state. Therefore, it should be noted that embodiments of the disclosure are not limited to cross-slot scheduling for paging. In addition, the method for allocating time domain resources for the data channel PDSCH described in the example of FIG. 16 is an operation related to the following first to fourth embodiments, and thus the method may be implemented in combination with the first to fourth embodiments.

A first embodiment of the disclosure provides a method of supporting cross-slot scheduling for a paging message in order to reduce power consumption of a UE.

In an embodiment of the disclosure, in order for the cross-slot scheduling for the PDSCH including the paging message to be guaranteed to the UE, the base station may provide, to the UE, information on the "minimum scheduling offset," which is the minimum value of the slot offset value by which the corresponding paging PDSCH can be scheduled. The UE may determine scheduling information regarding the paging PDSCH based on the acquired "minimum scheduling offset (K0min)" value. For example, in this embodiment, the UE may expect that the slot offset value of the paging PDSCH (e.g., the slot offset value may correspond to the K0 value) is scheduled to be equal to or greater than the "minimum scheduling offset (K0min)" value.

In the first embodiment of the disclosure, as in Method 1 to Method 7 exemplified below, various embodiments relating to a method of transferring the minimum scheduling offset value for the paging PDSCH to the UE, a method of acquiring information about the minimum scheduling offset value by the UE, or a method of applying a minimum scheduling offset value are provided.

[Method 1]

In an embodiment of the disclosure, the base station may configure, for the UE, the minimum scheduling offset value via higher layer signaling (e.g., MIB, SIB, or RRC information).

[Method 2]

In an embodiment of the disclosure, the base station may indicate the minimum scheduling offset value to the UE via L1 signaling (e.g., paging PDCCH, DCI format scrambled by P-RNTI, etc.).

[Method 3]

In an embodiment of the disclosure, the base station may configure, for the UE, the minimum scheduling offset value via higher layer signaling (e.g., MIB or SIB or RRC information, etc.), and whether the minimum scheduling offset value is applied may be additionally indicated via higher layer signaling (e.g., MIB or SIB or RRC information) or L1 signaling (e.g., paging PDCCH, DCI format scrambled by P-RNTI, etc.). In other words, the UE may be configured with information for the minimum scheduling offset value, may receive configuration information or indication information for indicating to apply the minimum scheduling offset value, and then may determine the paging PDSCH scheduling information based on the corresponding minimum scheduling offset value.

[Method 4]

In an embodiment of the disclosure, the base station may configure, for the UE, the minimum scheduling offset value via higher layer signaling (e.g., MIB or SIB or RRC information, etc.), and whether the minimum scheduling offset value is applied (e.g., 1-bit indicator indicating whether to apply the minimum scheduling offset value) may be inherently determined by another system parameter (e.g., configuration information related to paging monitoring). For example, the base station may configure, for the UE, the minimum scheduling offset value to be K0min=X via higher layer signaling. When a specific [condition A] for paging monitoring is satisfied, the UE may determine scheduling information regarding the paging PDSCH based on the received minimum scheduling offset value K0min=X. The specific [condition A] for paging monitoring may correspond to a case, for example, in which at least one of the following conditions a) to c) is satisfied.

[Condition A]

a) This may correspond to a case in which a control resource set for monitoring the paging PDCCH is configured as a "second control resource set." The "second control resource set" may correspond to a case, for example, in which the UE is configured with another control resource set #X instead of the control resource set #0 (or the control resource set configured through MIB), as a control resource set for monitoring the paging PDCCH. As another example, the second control resource set may correspond to a case in which the UE is configured with a specific control resource set #X defined for the purpose of reducing power consumption of the UE (or defined for paging monitoring of UEs after a specific 3GPP standard release), as a control resource set for monitoring the paging PDCCH (here, the control resource set #X may be configured through SIB 1). As still another example, the second control resource set may correspond to a case in which the UE is configured with the control resource set #X for monitoring the paging PDCCH through another SIB Y (Y≠1) instead of SIB1.

b) This may correspond to a case in which a control resource set for monitoring the paging PDCCH is configured as a "second search space set." The "second search space set" may correspond to a case, for example, in which the UE is configured with another search space set #X instead of the search space set #0 (or the search space set configured through MIB), as a search space set for monitoring the paging PDCCH. As another example, the second search space set may correspond to a case in which the UE is configured with a specific search space set #X defined for the purpose of reducing power consumption of the UE (or defined for paging monitoring of UEs after a specific release), as a search space set for monitoring the paging PDCCH (here, the search space set #X may be configured through SIB1). As still another example, the second search space set may correspond to a case in which the UE is configured with the search space set #X for monitoring the paging PDCCH through another SIB Y (Y≠1) instead of SIB1.

c) This may correspond to a case of, if a plurality of P-RNTIs, for example, P-RNTI, P-RNTI #2, P-RNTI #3, . . . , and P-RNTI #M exist, monitoring DCI format scrambled by other RNTIs (P-RNTI #2, P-RNTI #3, . . . , and P-RNTI #M) instead of the existing P-RNTI.

[Method 5]

In an embodiment of the disclosure, the minimum scheduling offset value may be predefined or may be inherently determined by other system parameters, and whether the minimum scheduling offset value is applied (e.g., 1-bit indicator indicating whether the minimum scheduling offset value is applied or not) indicator) may be notified from the base station to the UE via higher layer signaling (MIB or SIB or RRC information, etc.) or L1 signaling (e.g., paging PDCCH, DCI format scrambled by P-RNTI, etc.). For example, the minimum scheduling offset value may be predefined as K0min=X (e.g., X=1), and whether to determine the scheduling information regarding the paging PDSCH by considering the K0min value may additionally notified of to the UE via higher layer signaling or L1 signaling. Here, the predefined minimum scheduling offset value may be defined to be different values according to a subcarrier spacing. For example, it may be determined as that K0min=A for the subcarrier spacing of 15 kHz, K0min=B for the subcarrier spacing of 30 kHz, K0min=C for the subcarrier spacing of 60 kHz, and K0min=D for the subcarrier spacing of 120 kHz.

[Method 6]

In an embodiment of the disclosure, the minimum scheduling offset value may be predefined or may be inherently determined by other system parameters, and whether the minimum scheduling offset value is applied (e.g., 1-bit indicator indication whether the minimum scheduling offset value is applied or not) indicator) may be inherently determined by other system parameters (e.g., configuration information related to paging monitoring). For example, the minimum scheduling offset value may be predefined as K0min=X (e.g., X=1), and whether to determine the scheduling information regarding the paging PDSCH by considering the K0min value may additionally notified of to the UE via higher layer signaling or L1 signaling. Here, the predefined minimum scheduling offset value may be defined to be different values according to a subcarrier spacing. For example, it may be determined as that K0min=A for the subcarrier spacing of 15 kHz, K0min=B for the subcarrier spacing of 30 kHz, K0min=C for the subcarrier spacing of 60 kHz, and K0min=D for the subcarrier spacing of 120 kHz. If the specific [condition A] for paging monitoring is satisfied, the UE knowing the information about the minimum scheduling offset value may determine scheduling information regarding the paging PDSCH based on the corresponding minimum scheduling offset value K0min=X. The specific [Condition A] may correspond to the condition described in Method 4 above.

[Method 7]

In an embodiment of the disclosure, the base station may configure, for the UE, the minimum scheduling offset value via higher layer signaling (e.g., MIB or SIB or RRC information, etc.), and whether the minimum scheduling offset value is applied (e.g., A 1-bit indicator indicating whether the minimum offset value is applied or not) may be additionally configured via higher layer signaling or L1 signaling. The UE may control the monitoring operation for the paging PDCCH according to the indication on whether to apply the minimum scheduling offset value. For example, if the UE receives configuration information indicating that the minimum scheduling offset value is applied, the paging PDCCH may be monitored in the above described "second control resource set" or "second search space set," and if the UE receives configuration information indicating not to apply the minimum scheduling offset value, the UE may monitor the paging PDCCH in the existing control resource set and search space set (e.g., a control resource set and a search space set that can be configured as MIB or SIB1)).

Method 1, method 2, method 3, method 4, method 5, method 6, and method 7 described above may be performed individually or by combining at least one method. In another embodiment, it is possible to selectively apply at least one of the above methods according to the UE state (connected state, idle state, or inactive state), the performance of the UE, or the 3GPP standard release supported by the UE.

According to the method described above, in a network in which existing UEs (or UEs before a specific release, or legacy UEs, or UEs that do not support a paging operation based on cross-slot scheduling) and new UEs (or UEs after a specific release, new UEs, or UEs supporting a paging operation based on cross-slot scheduling) coexist, a paging message can be effectively transmitted. In other words, the base station may transmit the paging PDSCH to existing UEs still based on the conventional scheduling method (or paging PDSCH scheduling based on self-slot scheduling, or paging PDSCH scheduling based on the default time domain resource allocation table), and the base station may transmit, to new UEs, a paging PDSCH based on the above described cross-slot scheduling method. Similarly, existing UEs may receive the paging PDSCH still based on the conventional scheduling method, and new UEs may receive the paging PDSCH based on the above described cross-slot scheduling method, to thereby obtain a power consumption reduction benefit.

In the second embodiment of the disclosure, provided is a detailed embodiment in which the UE acquires information on the minimum scheduling offset value for the paging PDSCH, and then determines the scheduling information for the paging PDSCH based on the acquired minimum scheduling offset value.

In the disclosure, the UE may acquire information on the minimum scheduling offset value for the paging PDSCH by using at least one of the various methods illustrated in the above-described first embodiment.

In addition, as described in Table 31, the idle mode UE in the idle state may acquire the time domain resource allocation information, with regard to P-RNTI (i.e., scheduling information for paging PDSCH), based on the default time domain resource allocation table (i.e., the default time domain resource allocation tables A, B, or C exemplified in Table 27 to Table 30). In a method for interpreting information of a time domain resource allocation field indicated by a DCI format scrambled by a P-RNTI for scheduling a paging PDSCH, a UE that has obtained a minimum scheduling offset value may determine a slot offset value based on the information of the acquired minimum scheduling offset value. For example, a slot offset value for the paging PDSCH may be determined based on a method corresponding to at least one of the following Method 8 to Method 11 or a combination thereof

[Method 8]

According to an embodiment of the disclosure, the UE may expect that, based on the acquired minimum scheduling offset value, scheduling is performed only with an entry, the slot offset value K0 of which is equal to or greater than the minimum scheduling offset value, in entries in a default time domain resource allocation table defined for paging scheduling (or for P-RNTI).

In a case of method 8, depending on the slot offset values defined in the default time domain table, in some cases, all entries may have smaller values than the minimum scheduling offset value and thus scheduling may not be possible. Accordingly, the following methods can be considered.

[Method 9]

According to an embodiment of the disclosure, the UE may reinterpret, based on the acquired minimum scheduling offset value, the slot offset (K0) value defined in a default time domain resource allocation table defined for paging scheduling (or defined for P-RNTI in the same manner). For example, the UE may perform reinterpretation such that values, which the slot offset (K0) has, smaller than the minimum scheduling offset (K0min) value, among values defined in the default time domain resource allocation table, are changed to and reinterpreted as the corresponding minimum scheduling offset (K0min) value. In other words, the UE may reinterpret the K0 value in the default time domain resource allocation table as K0', and here, the K0' value may be defined as follows:

$$K0'=\min(K0, K0\min).$$

As an example, with regard to the default time domain resource allocation table of [Table 29], if K0min=1 is notified of to the UE, the UE may reinterpret the slot offset values of the corresponding default time domain resource allocation table as the K0' values in Table 32 below. The K0 values in the default time domain resource allocation tables exemplified in Table 27, Table 28, and Table 30 may be reinterpreted in the same manner.

TABLE 32

| Default PDSCH time domain resource allocation B ||||||
|---|---|---|---|---|---|
| Row index | dmrs- TypeA- Position | PDSCH mapping type | $K_0$ | $K_0'$ | S | L |
| 1 | 2, 3 | Type B | 0 | 1 | 2 | 2 |
| 2 | 2, 3 | Type B | 0 | 1 | 4 | 2 |
| 3 | 2, 3 | Type B | 0 | 1 | 6 | 2 |
| 4 | 2, 3 | Type B | 0 | 1 | 8 | 2 |
| 5 | 2, 3 | Type B | 0 | 1 | 10 | 2 |
| 6 | 2, 3 | Type B | 1 | 1 | 2 | 2 |

TABLE 32-continued

Default PDSCH time domain resource allocation B

| Row index | dmrs- TypeA- Position | PDSCH mapping type | $K_0$ | $K_0'$ | S | L |
|---|---|---|---|---|---|---|
| 7 | 2, 3 | Type B | 1 | 1 | 4 | 2 |
| 8 | 2, 3 | Type B | 0 | 1 | 2 | 4 |
| 9 | 2, 3 | Type B | 0 | 1 | 4 | 4 |
| 10 | 2, 3 | Type B | 0 | 1 | 6 | 4 |
| 11 | 2, 3 | Type B | 0 | 1 | 8 | 4 |
| 12 (Note 1) | 2, 3 | Type B | 0 | 1 | 10 | 4 |
| 13 (Note 1) | 2, 3 | Type B | 0 | 1 | 2 | 7 |
| 14 (Note 1) | 2 | Type A | 0 | 1 | 2 | 12 |
|  | 3 | Type A | 0 | 1 | 3 | 11 |
| 15 | 2, 3 | Type B | 1 | 1 | 2 | 4 |
| 16 |  | Reserved |  |  |  |  |

(Note 1):
If the PDSCH was scheduled with SI- RNTI in PDCCH Type0 common search space, the UE may assume that this PDSCH resource allocation is not applied

[Method 10]

According to an embodiment of the disclosure, the UE may reinterpret, based on the acquired minimum scheduling offset value, the slot offset (K0) value defined in a default time domain resource allocation table defined for paging scheduling (or defined for P-RNTI in the same manner). As an example, the UE may add a minimum scheduling offset (K0min) to the slot offset (K0) value of the default time domain resource allocation table such that the same is changed to and reinterpreted as the minimum scheduling offset (K0min). In other words, the UE may reinterpret the K0 value in the default time domain resource allocation table as K0', and here, the K0' value may be defined as follows:

$K0'=K0+K0\text{min}.$

As an example, with regard to the default time domain resource allocation table of [Table 29], if K0min=1 is notified of to the UE, the UE may reinterpret the slot offset values of the corresponding default time domain resource allocation table as the K0' values in Table 33 below. The K0 values in the default time domain resource allocation tables exemplified in Table 27, Table 28, and Table 30 may be reinterpreted in the same manner.

TABLE 33

Default PDSCH time domain resource allocation B

| Row index | dmrs- TypeA- Position | PDSCH mapping type | $K_0$ | $K_0'$ | S | L |
|---|---|---|---|---|---|---|
| 1 | 2, 3 | Type B | 0 | 1 | 2 | 2 |
| 2 | 2, 3 | Type B | 0 | 1 | 4 | 2 |
| 3 | 2, 3 | Type B | 0 | 1 | 6 | 2 |
| 4 | 2, 3 | Type B | 0 | 1 | 8 | 2 |
| 5 | 2, 3 | Type B | 0 | 1 | 10 | 2 |
| 6 | 2, 3 | Type B | 1 | 2 | 2 | 2 |
| 7 | 2, 3 | Type B | 1 | 2 | 4 | 2 |
| 8 | 2, 3 | Type B | 0 | 1 | 2 | 4 |
| 9 | 2, 3 | Type B | 0 | 1 | 4 | 4 |
| 10 | 2, 3 | Type B | 0 | 1 | 6 | 4 |
| 11 | 2, 3 | Type B | 0 | 1 | 8 | 4 |
| 12 (Note 1) | 2, 3 | Type B | 0 | 1 | 10 | 4 |
| 13 (Note 1) | 2, 3 | Type B | 0 | 1 | 2 | 7 |
| 14 (Note 1) | 2 | Type A | 0 | 1 | 2 | 12 |
|  | 3 | Type A | 0 | 1 | 3 | 11 |
| 15 | 2, 3 | Type B | 1 | 2 | 2 | 4 |
| 16 |  | Reserved |  |  |  |  |

(Note 1):
If the PDSCH was scheduled with SI- RNTI in PDCCH Type0 common search space, the UE may assume that this PDSCH resource allocation is not applied

[Method 11]

According to an embodiment of the disclosure, the UE may reinterpret, based on the acquired minimum scheduling offset value, the slot offset (K0) value defined in a default time domain resource allocation table defined for paging scheduling (or for P-RNTI). As an example, the UE may perform reinterpretation by replacing the slot offset (K0) of the default time domain resource allocation table by the minimum scheduling offset (K0min). In other words, the UE may reinterpret the K0 value in the default time domain resource allocation table as K0', and here, the K0' value may be defined as follows:

$K0'=K0\text{min}.$

As an example, in connection with the default time domain resource allocation table of [Table 29], if K0min=1 is notified of to the UE, the UE may reinterpret the slot offset values of the corresponding default time domain resource allocation table as the K0' values in Table 34 below. The K0 values in the default time domain resource allocation tables exemplified in Table 27, Table 28, and Table 30 may be reinterpreted in the same manner.

TABLE 34

Default PDSCH time domain resource allocation B

| Row index | dmrs- TypeA- Position | PDSCH mapping type | $K_0$ | $K_0'$ | S | L |
|---|---|---|---|---|---|---|
| 1 | 2, 3 | Type B | 0 | 1 | 2 | 2 |
| 2 | 2, 3 | Type B | 0 | 1 | 4 | 2 |
| 3 | 2, 3 | Type B | 0 | 1 | 6 | 2 |
| 4 | 2, 3 | Type B | 0 | 1 | 8 | 2 |
| 5 | 2, 3 | Type B | 0 | 1 | 10 | 2 |
| 6 | 2, 3 | Type B | 1 | 1 | 2 | 2 |
| 7 | 2, 3 | Type B | 1 | 1 | 4 | 2 |
| 8 | 2, 3 | Type B | 0 | 1 | 2 | 4 |
| 9 | 2, 3 | Type B | 0 | 1 | 4 | 4 |
| 10 | 2, 3 | Type B | 0 | 1 | 6 | 4 |
| 11 | 2, 3 | Type B | 0 | 1 | 8 | 4 |
| 12 (Note 1) | 2, 3 | Type B | 0 | 1 | 10 | 4 |
| 13 (Note 1) | 2, 3 | Type B | 0 | 1 | 2 | 7 |
| 14 (Note 1) | 2 | Type A | 0 | 1 | 2 | 12 |
|  | 3 | Type A | 0 | 1 | 3 | 11 |
| 15 | 2, 3 | Type B | 1 | 1 | 2 | 4 |
| 16 |  | Reserved |  |  |  |  |

(Note 1):
If the PDSCH was scheduled with SI- RNTI in PDCCH Type0 common search space, the UE may assume that this PDSCH resource allocation is not applied A third embodiment of the disclosure provides a method in which an idle mode UE differently controls PDSCH reception based on the above described cross-slot scheduling according to an RNTI or a search space.

In the disclosure, the UE may obtain information on the minimum scheduling offset value and whether to apply the minimum scheduling offset, by using at least one of the various methods illustrated in the first embodiment described above in various ways. The UE may acquire scheduling information regarding the PDSCH based on the acquired minimum scheduling offset value. Here, the UE may determine whether to apply the acquired minimum scheduling offset value according to the RNTI or the search space type. For example, at least one of the following method 12 to method 14 or a combination thereof may be considered.

[Method 12]

The UE may apply the acquired minimum scheduling offset value only to scheduling for the paging message in a limited manner. More specifically, the UE may acquire time domain resource allocation information by taking into account the minimum scheduling offset value obtained with regard to a PDSCH scheduled by a DCI format scrambled by a P-RNTI (or DCI format received in Type2 common search space). In other words, the UE may expect cross-slot scheduling based on the minimum scheduling offset value obtained with regard to the paging PDSCH. The UE may not apply the minimum scheduling offset value to DCI formats scrambled by the remaining RNTIs (e.g., SI-RNTI, RA-RNTI, MsgB-RNTI, ort TC-RNTI) except for the P-RNTI or DCI formats of the Type0, Type0A, and Type1 common search space. Accordingly, the UE can reduce power consumption for the periodic paging monitoring operation, and can minimize a delay time in other operations, such as receiving system information or performing random access.

[Method 13]

The UE may apply the acquired minimum scheduling offset value only to scheduling for other SIB X (or may also referred to as other system information (OSI) or remaining system information (RMSI)) except for SIB1 in a limited manner. More specifically, the minimum scheduling offset value may be applied in the following case:

DCI format scrambled by P-RNTI monitored in Type2 common search space; and/or

DCI format scrambled by SI-RNTI monitored by Type0A common search space.

The UE may obtain time domain resource allocation information by taking into account the minimum scheduling offset value obtained for the PDSCH scheduled in the above case. The UE may not apply the minimum scheduling offset value to PDSCH scheduled by the remaining RNTIs except for the above case, for example:

DCI format scrambled by SI-RNTI monitored in Type0 common search space; and

DCI format scrambled by RA-RNTI, MsgB-RNTI, and TC-RNTI monitored in Type1 common search space. Accordingly, the UE can reduce power consumption in a periodic paging monitoring operation and an operation of receiving intermittent system information such as SIB X, the delay time of which is not very important. The UE can minimize a delay time in other operations, such as receiving SIB1 or performing random access.

[Method 14]

The UE may apply the acquired minimum scheduling offset value to scheduling of all PDSCHs that can be received in the idle mode. More specifically, the UE may obtain time domain resource allocation information by applying the minimum offset value obtained for PDSCH scheduled in DCI formats of RNTIs (SI-RNTI, RA-RNTI, MsgB-RNTI, TC-RNTI, and P-RNTI) monitored in the idle mode or all common search spaces (Type0, Type0A, Type1, and Type2 common search space). In other words, the UE can expect cross-slot scheduling based on the acquired minimum offset values for all PDSCHs that can be received in the idle mode, thereby maximizing power consumption reduction.

A fourth embodiment of the disclosure provides a method for supporting cross-slot scheduling for paging using a plurality of default time domain resource allocation tables.

In an embodiment of the disclosure, the base station may provide configuration or indication, to the UE, of whether to support cross-slot scheduling for paging via higher layer signaling (e.g., MIB, SIB, or RRC information) or L1 signaling (e.g., paging PDCCH, or DCI format scrambled by P-RNTI). The UE may be configured or indicated with whether to support cross-slot scheduling for paging from the base station, and here, the UE may assume a "second default time domain resource allocation table." The "second default time domain resource allocation table" may correspond to a table in which the minimum slot offset value (K0) in the corresponding table has a value greater than 0 or a table in which the slot offset values of all entries have values 4 greater than 0. The "second default time domain resource allocation table" may correspond to a table, which is configured for the UE by the base station via higher layer signaling, or may correspond to a predefined fixed table. In other words, the UE configured to support cross-slot scheduling for paging may interpret scheduling information by assuming default time domain table A' instead of the conventional default time domain table A, default time domain table B' instead of the conventional default time domain table B, default time domain table C' instead of the conventional default time domain table C, respectively.

In an embodiment of the disclosure, the UE, which has not received configuration information related to cross-slot scheduling for paging (configuration information about the minimum scheduling offset value, configuration information about whether to apply the minimum scheduling offset value, and configuration information about whether to apply cross-slot scheduling, etc.), may receive a paging message or the like based on the conventional default time domain resource allocation table (see Table 27 to Table 30).

Figure 17:
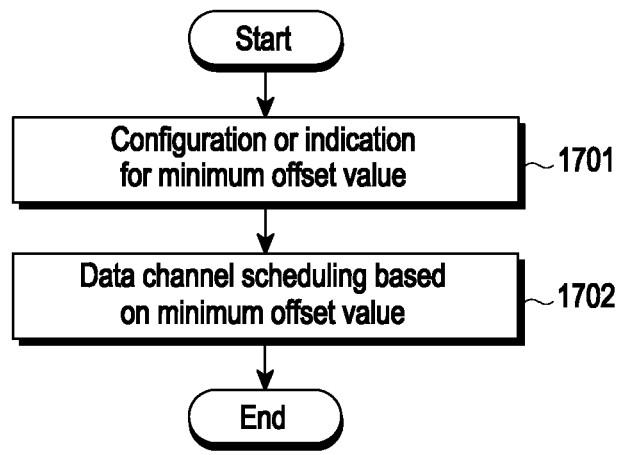
FIG. 17 illustrates an operation of a base station according to an embodiment of the disclosure.

FIG. 17 illustrates an operation of a base station according to an embodiment of the disclosure.

Referring to FIG. 17, in operation 1701, the base station may transmit configuration information and/or indication information related to the minimum scheduling offset to the UE according to at least one of the methods described in the first to fourth embodiments or a combination thereof. When all or part of the configuration information and/or indication information related to the minimum scheduling offset is predefined or is inherently determinable, a transmission operation in which all or a part of the configuration information and/or indication information is transmitted to the UE may be omitted.

In operation 1702, the base station schedules the PDSCH transmission to the UE based on the minimum scheduling offset value configured, indicated, predefined, or inherently determined for the UE. The scheduling information of the PDSCH transmission is transferred to the UE through DCI transmitted through the PDCCH. When the minimum scheduling offset value for the UE is predefined or inherently determined, the base station may know the minimum scheduling offset value for the UE in the same manner. Through the scheduled PDSCH, the base station may transmit a paging message, SIB, RMSI, or data for the UE.

Figure 18:
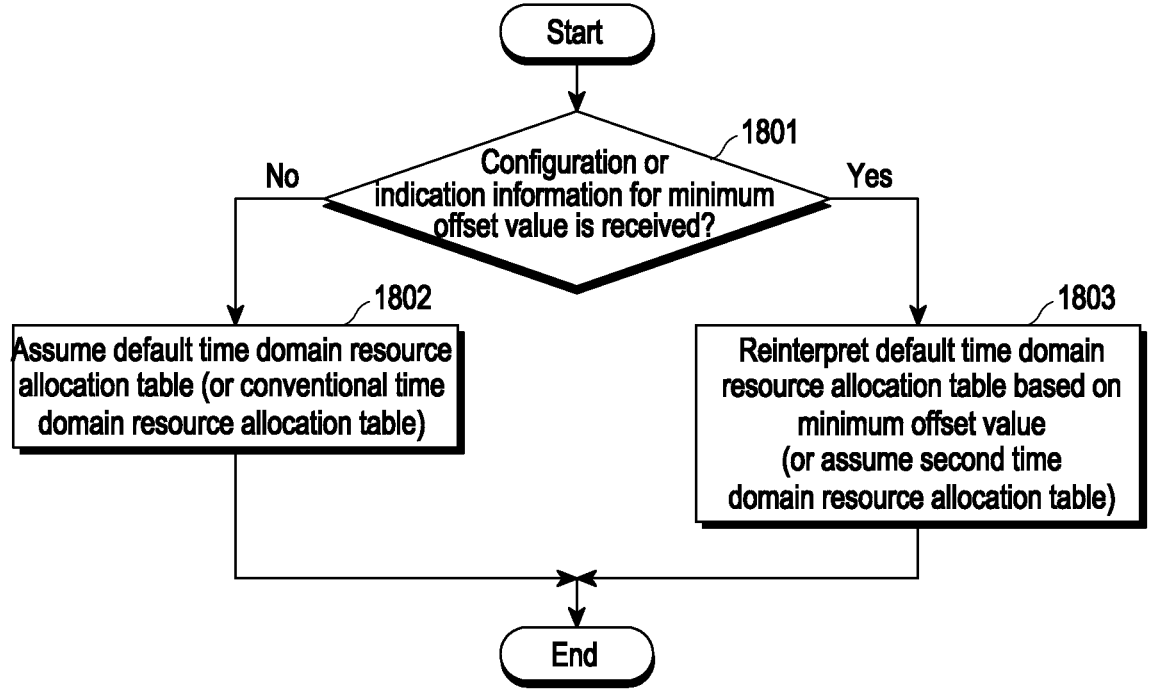
FIG. 18 illustrates an operation of a UE according to an embodiment of the disclosure.

FIG. 18 illustrates an operation of a UE according to an embodiment of the disclosure.

Referring to FIG. 18, in operation 1801, the UE identifies whether configuration information and/or indication information related to the minimum scheduling offset is received from the base station according to at least one of the methods described in the first to fourth embodiments or a combination thereof. When all or a part of the configuration information and/or indication information related to the minimum scheduling offset is predefined or is inherently determinable, the operation of receiving all or a part of the configuration information and/or indication information from the base station may be omitted.

If it is identified that the configuration information and/or indication information related to the minimum scheduling offset is received in operation 1801, the UE may interpret a time domain allocation table based on the identified minimum scheduling offset value and receive information such as a paging message, SIB, RMSI, or data through the PDSCH scheduled to the UE, in operation 1803. If operation 1803 is described with an example of the second embodiment, the UE may receive paging message, SIB, RMSI, data, and the like through the PDSCH scheduled to the UE, based on the identified minimum scheduling offset, by using a time domain allocation table in which a slot offset (K0) is changed by reinterpreting the default time domain allocation table as that described in Table 32 to Table 34 in at least one of the methods described in the second embodiment or a combination thereof, or by using a second time domain allocation table predefined or determined in a predetermined manner. In other words, the UE may determine a slot offset to be applied to the default time domain resource allocation table related to the cross-slot scheduling based on the acquired information on the minimum scheduling offset.

If there is no reception of configuration information and/or indication information related to the minimum scheduling offset in operation 1801, the UE proceeds to operation 1802 and may receive a paging message, SIB, RMSI, or data through the PDSCH scheduled to the UE by using the default time domain allocation table exemplified in Table 27 to Table 30. The UE may acquire scheduling information based on a default time domain resource allocation table predefined for a data channel scheduled by a DCI format scrambled by a specific RNTI or based on that the time domain resource allocation table is not configured via higher layer signaling. Here, one or a plurality of predefined basic time domain resource allocation tables may exist.

Meanwhile, the base station may configure for the UE whether to implement the above-described embodiments. The UE may receive configuration information about whether to implement the above-described embodiments from the base station, and may differently control operations of respective embodiments based on the configuration information.

Enablement of the above-described embodiments can be notified of from a UE to a base station based on UE capability reporting. The base station may obtain whether the functions of the above-described embodiments are supported through the capability report from the UE, and based on this, the base station may appropriately perform operation control on the corresponding UE based on the above-described embodiments.

The above-described embodiments may be operated in combination with each other.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) for a time-domain resource allocation in a wireless communication system, the method comprising:
receiving, from a base station, configuration information for a time domain resource allocation table that is applicable to a physical downlink shared channel (PDSCH), configuration information indicating a minimum scheduling offset for scheduling a PDSCH on which a paging message for the UE is to be received, and configuration information for a specific control resource set for monitoring a physical downlink control channel (PDCCH) for a paging;
monitoring the PDCCH for the paging based on the specific control resource set;
receiving, from the base station, downlink control information (DCI) on the PDCCH for the paging, the DCI including time domain resource allocation information for the PDSCH and information indicating whether to configure the minimum scheduling offset, wherein the DCI includes a cyclic redundancy check (CRC) scrambled by a paging-radio network temporary identifier (P-RNTI) for the paging;
in case that the minimum scheduling offset is configured for the paging, identifying a first slot offset for scheduling of the PDSCH, based on the minimum scheduling offset, the time domain resource allocation table, and the time domain resource allocation information; and
receiving a paging message on the PDSCH for the paging based on the first slot offset,
wherein the UE operates in a sleep mode between a time point at which the DCI on the PDCCH is received and a time point at which reception on the PDSCH occurs.

2. The method of claim 1, wherein the time domain resource allocation table includes position information of a start symbol in a slot in which the PDSCH for the paging is scheduled, symbol length information, and a second slot offset that is configured as a default slot offset, and wherein the first slot offset is determined based on at least one of the minimum scheduling offset or the second slot offset.

3. The method of claim 2, wherein the first slot offset is determined based on one of:

an operation that the first slot offset is determined in a range equal to or greater than the minimum scheduling offset, an operation that the first slot offset is determined as a smaller value among the minimum scheduling offset and the second slot offset, an operation that the first slot offset is determined based on a sum of the minimum scheduling offset and the second slot offset, or an operation that the first slot offset is determined by replacing the second slot offset by the minimum scheduling offset.

4. A user equipment (UE) in a wireless communication system, the UE comprising:

a transceiver; and a processor configured to:

receive, from a base station through the transceiver, configuration information for a time domain resource allocation table that is applicable to a physical downlink shared channel (PDSCH), configuration information indicating a minimum scheduling offset for scheduling a PDSCH on which a paging message for the UE is to be received, and configuration information for a specific control resource set for monitoring a physical downlink control channel (PDCCH) for a paging, monitor the PDCCH for the paging based on the specific control resource set, receive, from the base station through the transceiver, downlink control information (DCI) on the PDCCH for the paging, the DCI including time domain resource allocation information for the PDSCH and information indicating whether to configure the minimum scheduling offset, wherein the DCI includes a cyclic redundancy check (CRC) scrambled by a paging-radio network temporary identifier (P-RNTI) for the paging, in case that the minimum scheduling offset is configured for the paging, identify a first slot offset for scheduling of the PDSCH, based on the minimum scheduling offset, the time domain resource allocation table, and the time domain resource allocation information, receive, from the base station through the transceiver, a paging message on the PDSCH for the paging based on the first slot offset, and control an operation in a sleep mode between a time point at which the DCI on the PDCCH is received and a time point at which reception on the PDSCH occurs.

5. The UE of claim 4, wherein the time domain resource allocation table includes position information of a start symbol in a slot in which the PDSCH for the paging is scheduled, symbol length information, and a second slot offset that is configured as a default slot offset, and wherein the first slot offset is determined based on at least one of the minimum scheduling offset or the second slot offset.

6. The UE of claim 5, wherein the processor is further configured to determine the first slot offset based on one of:

an operation that the first slot offset is determined in a range equal to or greater than the minimum scheduling offset, an operation that the first slot offset is determined as a smaller value among the minimum scheduling offset and the second slot offset, an operation that the first slot offset is determined based on a sum of the minimum scheduling offset and the second slot offset, or an operation that the first slot offset is determined by replacing the second slot offset by the minimum scheduling offset.

7. A method performed by a base station for a time domain resource allocation in a wireless communication system, the method comprising:

transmitting, to a user equipment (UE), configuration information for a time domain resource allocation table that is applicable to a physical downlink shared channel (PDSCH) configuration information indicating a minimum scheduling offset for scheduling a PDSCH on which a paging message for the UE is to be transmitted, and configuration information for a specific control resource set for monitoring a physical downlink control channel (PDCCH) for a paging;

transmitting, to the UE, downlink control information (DCI) on the PDCCH for the paging, the DCI including time domain resource allocation information for the PDSCH and information indicating whether to configure the minimum scheduling offset, wherein the DCI includes a cyclic redundancy check (CRC) scrambled by a paging-radio network temporary identifier (P-RNTI) for the paging;

in case that the minimum scheduling offset is configured for the paging, identifying a first slot offset for scheduling of the PDSCH based on the minimum scheduling offset, the time domain resource allocation table, and the time domain resource allocation information; and transmitting a paging message on the PDSCH for the paging based on the first slot offset.

8. The method of claim 7, wherein the time domain resource allocation table includes position information of a start symbol in a slot in which the PDSCH for the paging is scheduled, symbol length information, and a second slot offset that is configured as a default slot offset, and wherein the first slot offset is determined based on at least one of the minimum scheduling offset or the second slot offset.

9. The method of claim 8, wherein the first slot offset is determined based on one of:

an operation that the first slot offset is determined in a range equal to or greater than the minimum scheduling offset, an operation that the first slot offset is determined as a smaller value among the minimum scheduling offset and the second slot offset, an operation that the first slot offset is determined based on a sum of the minimum scheduling offset and the second slot offset, or an operation that the first slot offset is determined by replacing the second slot offset by the minimum scheduling offset.

10. A base station in a wireless communication system, the base station comprising:
- a transceiver; and
- a processor configured to:
  - transmit, to a user equipment (UE) through the transceiver, configuration information for a time domain resource allocation table that is applicable to a physical downlink shared channel (PDSCH) configuration information indicating a minimum scheduling offset for scheduling a PDSCH on which a paging message for the UE is to be transmitted, and configuration information for a specific control resource set for monitoring a physical downlink control channel (PDCCH) for a paging,
  - transmit, to the UE through the transceiver, downlink control information (DCI) on the PDCCH for the paging, the DCI including time domain resource allocation information for the PDSCH and information indicating whether to configure the minimum scheduling offset, wherein the DCI includes a cyclic redundancy check (CRC) scrambled by a paging-radio network temporary identifier (P-RNTI) for the paging,
  - in case that the minimum scheduling offset is configured for the paging, identify a first slot offset for scheduling of the PDSCH based on the minimum scheduling offset, the time domain resource allocation table, and the time domain resource allocation information, and
  - transmit, to the UE through the transceiver, a paging message on the PDSCH for the paging based on the first slot offset.

11. The base station of claim 10, wherein the time domain resource allocation table includes position information of a start symbol in a slot in which the PDSCH for the paging is scheduled, symbol length information, and a second slot offset that is configured as a default slot offset,
- wherein the first slot offset is determined based on at least one of the minimum scheduling offset or the second slot offset, and
- wherein the first slot offset is determined based on one of:
  - an operation that the first slot offset is determined in a range equal to or greater than the minimum scheduling offset,
  - an operation that the first slot offset is determined as a smaller value among the minimum scheduling offset and the second slot offset,
  - an operation that the first slot offset is determined based on a sum of the minimum scheduling offset and the second slot offset, or
  - an operation that the first slot offset is determined by replacing the second slot offset by the minimum scheduling offset.

* * * * *